MEMORY SHARING BETWEEN COMPUTER AND PERIPHERAL UNITS

Filed April 16, 1964 16 Sheets-Sheet 1

Inventors.
Robert O. Gunderson
Sidney L. Valentine
George L. Foster

By: Louis A Kline
John J. Matlago
Nathan Cass
Their Attorneys.

Inventors.
Robert O. Gunderson
Sidney L. Valentine
George L. Foster

By: Louis A. Kline
John J. Matlago
Nathan Cass
Their Attorneys

Inventors
Robert O. Gunderson
Sidney L. Valentine
George L. Foster

By: Louis A. Kline
John J. Matlago
Nathan Cass
Their Attorneys

Aug. 1, 1967 R. O. GUNDERSON ET AL 3,334,333

MEMORY SHARING BETWEEN COMPUTER AND PERIPHERAL UNITS

Filed April 16, 1964 16 Sheets-Sheet 4

Inventors.
Robert O. Gunderson
Sidney L. Valentine
George L. Foster

By: Louis A. Kline
John J. Maclago
Nathan Cass
Their Attorneys.

Inventors.
Robert O. Gunderson
Sidney L. Valentine
George L. Foster

By: Louis A Kline
John J. Matlago
Nathan Cass
Their Attorneys.

Inventors.
Robert O. Gunderson
Sidney L. Valentine
George L. Foster

By: Louis A. Kline
John J. Motlago
Nathan Cass
Their Attorneys.

Aug. 1, 1967 R. O. GUNDERSON ET AL 3,334,333

MEMORY SHARING BETWEEN COMPUTER AND PERIPHERAL UNITS

Filed April 16, 1964 16 Sheets-Sheet 7

Inventors.
Robert O. Gunderson
Sidney L. Valentine
George L. Foster

By: Louis A. Kline
John J. Matlago
Nathan Cass
Their Attorneys.

Inventors.
Robert O. Gunderson
Sidney L. Valentine
George L. Foster

By: Louis A. Kline
John J. Matlago
Nathan Cass
Their Attorneys.

Inventors.
Robert O. Gunderson
Sidney L. Valentine
George L. Foster
By: Louis A. Kline
John J. Matlago
Nathan Cass
Their Attorneys.

FIG. 10

| | | | Instruction Register F/F | | | | | Program Counter F/F | |
|---|---|---|---|---|---|---|---|---|---|
| | Column | Command | N11 | N10 | N9 | N8 | N7 | N6 | N5 |
| Single Stage Commands | 13 | Divide | 0 | 1 | 0 | 1 | 1 | 0 | 0<br>1 |
| | 01- | Load | 0 | 0 | 0 | 0 | 1 | 0 | 0 |
| | 02- | Store | 0 | 0 | 0 | 1 | 0 | 0 | 0 |
| | 03- | Add | 0 | 0 | 0 | 1 | 1 | 0 | 0 |
| | 04- | Subtract | 0 | 0 | 1 | 0 | 0 | 0 | 0 |
| | 05- | Multiply | 0 | 0 | 1 | 0 | 1 | 0<br>1 | 0<br>1 |
| Double Stage Commands | 21- | Count | 1 | 0 | 0 | 0 | 1 | 0 | 0 |
| | 22- | Modify | 1 | 0 | 0 | 1 | 0 | 0 | 0<br>1 |
| | 23- | Move | 1 | 0 | 0 | 1 | 1 | 0 | 0 |
| | 24- | Scan | 1 | 0 | 1 | 0 | 0 | 0 | 0<br>1 |
| | 36- | Inquiry | 1 | 1 | 1 | 1 | 0 | 0<br>1 | 0<br>1 |

FIG. 11

| | | Program Counter F/F | | | | | |
|---|---|---|---|---|---|---|---|
| | Row | N6 | N5 | N4 | N3 | N2 | N1 |
| Command Level (Array 153) | -00- | 0<br>1 | 0<br>1 | 0 | 0 | 0 | 0 |
| | -01- | 0<br>1 | 0<br>1 | 0 | 0 | 0 | 1 |
| | -02- | 0<br>1 | 0<br>1 | 0 | 0 | 1 | 0 |
| | -03- | 0<br>1 | 0<br>1 | 0 | 0 | 1 | 1 |
| Individual Commands by Columns (Array 152) | -04- | 0<br>1 | 0<br>1 | 0 | 1 | 0 | 0 |
| | -05- | 0<br>1 | 0<br>1 | 0 | 1 | 0 | 1 |
| | -06- | 0<br>1 | 0<br>1 | 0 | 1 | 1 | 0 |
| | -07- | 0<br>1 | 0<br>1 | 0 | 1 | 1 | 1 |
| | -10- | 0<br>1 | 0<br>1 | 1 | 0 | 0 | 0 |
| | -11- | 0<br>1 | 0<br>1 | 1 | 0 | 0 | 1 |
| | -12- | 0<br>1 | 0<br>1 | 1 | 0 | 1 | 0 |
| | -13- | 0<br>1 | 0<br>1 | 1 | 0 | 1 | 1 |
| | -14- | 0<br>1 | 0<br>1 | 1 | 1 | 0 | 0 |
| | -15- | 0<br>1 | 0<br>1 | 1 | 1 | 0 | 1 |
| | -16- | 0<br>1 | 0<br>1 | 1 | 1 | 1 | 0 |
| | -17- | 0<br>1 | 0<br>1 | 1 | 1 | 1 | 1 |

Inventors.
Robert O. Gunderson
Sidney L. Valentine
George L. Foster

By: Louis A. Kline
John T. Matlago
Nathan Cass
Their Attorneys.

FIG. 12

| | Operation Block | Instruction Register F/F N11 | N10 | N9 | N8 | N7 | Program Counter F/F N6 | N5 | N4 | N3 | N2 | N1 |
|---|---|---|---|---|---|---|---|---|---|---|---|---|
| Set up all Commands | XX-00-0 | 0 | 0 | 0 | 0 | 0 | 0 | 0 | 0 | 0 | 0 | 0 |
| | XX-01-0 | 0 | 0 | 0 | 0 | 1 | 0 | 0 | 0 | 0 | 0 | 1 |
| Set up Single Stage Commands | XX-02-0 | 0 | 0 | 0 | 0 | 1 | 0 | 0 | 0 | 0 | 1 | 0 |
| | XX-03-0 | 0 | 0 | 0 | 0 | 1 | 0 | 0 | 0 | 0 | 1 | 1 |
| "Load" Command | 01-04-0 | 0 | 0 | 0 | 0 | 1 | 0 | 0 | 0 | 1 | 0 | 0 |
| | 01-05-0 | 0 | 0 | 0 | 0 | 1 | 0 | 0 | 0 | 1 | 0 | 1 |
| | 01-06-0 | 0 | 0 | 0 | 0 | 1 | 0 | 0 | 0 | 1 | 1 | 1 |
| Skips | XX-00-3 | 0 | 0 | 0 | 0 | 0 | 1 | 1 | 0 | 0 | 0 | 0 |
| "Move" Command | XX-00-1 | 1 | 0 | 0 | 1 | 1 | 0 | 1 | 0 | 0 | 0 | 0 |

FIG. 13

| | Operation Block | Instruction Register F/F N11 | N10 | N9 | N8 | N7 | Program Counter F/F N6 | N5 | N4 | N3 | N2 | N1 |
|---|---|---|---|---|---|---|---|---|---|---|---|---|
| Set up all Commands | XX-00-0 | 0 | 0 | 0 | 0 | 1 | 0 | 0 | 0 | 0 | 0 | 0 |
| | XX-01-0 | 1 | 0 | 0 | 1 | 1 | 0 | 1 | 0 | 0 | 0 | 1 |
| Set up Double Stage Commands | XX-00-1 | 1 | 0 | 0 | 1 | 1 | 0 | 1 | 0 | 0 | 0 | 0 |
| | XX-01-1 | 1 | 0 | 0 | 1 | 1 | 0 | 1 | 0 | 0 | 0 | 1 |
| | XX-02-1 | 1 | 0 | 0 | 1 | 1 | 0 | 1 | 0 | 0 | 1 | 0 |
| | XX-03-1 | 1 | 0 | 0 | 1 | 1 | 0 | 1 | 0 | 0 | 1 | 1 |
| "Move" Commands | 23-04-0 | 1 | 0 | 0 | 1 | 1 | 0 | 0 | 0 | 1 | 0 | 0 |
| | 23-05-0 | 1 | 0 | 0 | 1 | 1 | 0 | 0 | 0 | 1 | 0 | 1 |
| | 23-06-0 | 1 | 0 | 0 | 1 | 1 | 0 | 0 | 0 | 1 | 1 | 0 |
| | 23-07-0 | 1 | 0 | 0 | 1 | 1 | 0 | 0 | 0 | 1 | 1 | 1 |
| | 23-10-0 | 1 | 0 | 0 | 1 | 1 | 0 | 0 | 1 | 0 | 0 | 0 |
| | 23-11-0 | 1 | 0 | 0 | 1 | 1 | 0 | 0 | 1 | 0 | 0 | 1 |
| | 23-12-0 | 1 | 0 | 0 | 1 | 1 | 0 | 0 | 1 | 0 | 1 | 0 |
| | 23-13-0 | 1 | 0 | 0 | 1 | 1 | 0 | 0 | 1 | 0 | 1 | 1 |
| | 23-14-0 | 1 | 0 | 0 | 1 | 1 | 0 | 0 | 1 | 1 | 0 | 0 |
| | 23-15-0 | 1 | 0 | 0 | 1 | 1 | 0 | 0 | 1 | 1 | 0 | 1 |
| | 23-16-0 | 1 | 0 | 0 | 1 | 1 | 0 | 0 | 1 | 1 | 1 | 0 |

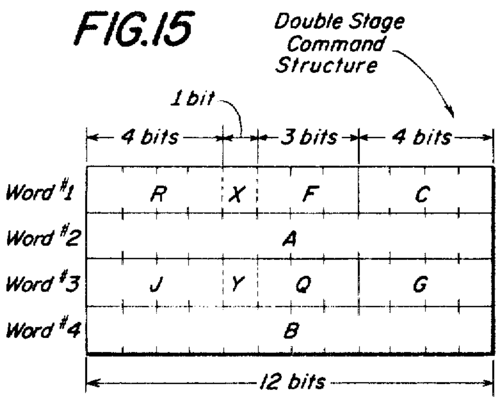

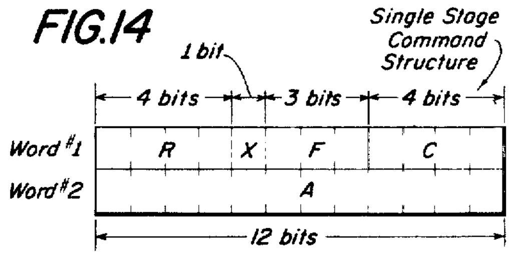

Inventors
Robert O. Gunderson
Sidney L. Valentine
George L. Foster
By: Louis A. Kline
John J. Matlago
Nathan Cass
Their Attorneys Inventors.
Robert O. Gunderson
Sidney L. Valentine
George L. Foster By: Louis A. Kline
John J. Matlago
Nathan Cass
Their Attorneys.

Inventors.
Robert O. Gunderson
Sidney L. Valentine
George L. Foster

By: Louis A. Kline
John J. Matlago
Nathan Cass
Their Attorneys.

Inventors.
Robert O. Gunderson
Sidney L. Valentine
George L. Foster

By: Louis A. Kline
John J. Matlago
Nathan Cass
Their Attorneys.

Inventors.
Robert O. Gunderson
Sidney L. Valentine
George L. Foster
By: Louis A Kline
John J. Matlago
Nathan Cass
Their Attorneys.

Inventors
Robert O. Gunderson
Sidney L. Valentine
George L. Foster
By: Louis A. Kline
John J. Matlago
Nathan Cass
Their Attorneys.

United States Patent Office 3,334,333
Patented Aug. 1, 1967

3,334,333
MEMORY SHARING BETWEEN COMPUTER AND PERIPHERAL UNITS

Robert O. Gunderson and Sidney L. Valentine, Torrance, and George L. Foster, Hawthorne, Calif., assignors to The National Cash Register Company, Dayton, Ohio, a corporation of Maryland Filed Apr. 16, 1964, Ser. No. 360,271
11 Claims. (Cl. 340—172.5)

This invention relates generally to electronic digital computers, and more particularly to improved means and methods for controlling the operation thereof.

In recent years considerable effort has been expended in the computer art towards improving the flexibility and speed capabilities of computers. The present invention has similar aims, and it is accordingly one object to provide improved means and methods in a computer system which will improve the flexibility and speed capabilities thereof.

The present invention also has as its object the provision of improved means and methods for coordinating the operation of a data processor with one or more peripheral units (such as a tape handler, or a random access unit).

Another and more specific object of the invention is to provide improved means and methods whereby the utilization of a main memory of a data processor may be shared between the data processor and one or more peripheral units in a manner so as to permit the processing of data to occur at a significantly faster rate than would otherwise be possible.

A further object of the invention is to povide improved means and methods whereby a peripheral unit may cooperate directly with the memory of a data processor while the data processor is performing other data processing operations which do not require use of the memory.

Still another object of the invention is to provide means and methods in a computer system whereby a priority is set up with respect to the use of the memory of a data processor so that the data processor and one or more peripheral units may share the memory in a manner which permits the most expeditious utilization thereof.

Yet another object of the invention is to provide improved means and methods for controlling the initiation of cycles and control signals in a data processor so as to facilitate the cooperation of the processor with one or more peripheral units.

A still further object of the invention is to provide improved means and methods for controlling the initiation of cycles in a data processor so as to facilitate the time sharing of the memory of the processor with one or more peripheral units.

An additional object of the invention is to provide means and methods for accomplishing the foregoing operations with a minimum of required circuitry and cost.

Yet a further object of the present invention is to provide improvements in the computer system disclosed in the commonly assigned copending patent application Ser. No. 107,109, filed May 2, 1961, now United States Patent No. 3,223,980, in accordance with any or all of the foregoing objects.

The specific nature of the invention as well as other features, advantages, uses and objects thereof will become apparent from the following detailed description of an exemplary embodiment in accordance with the invention and from the accompanying drawings in which.

Figure 1:
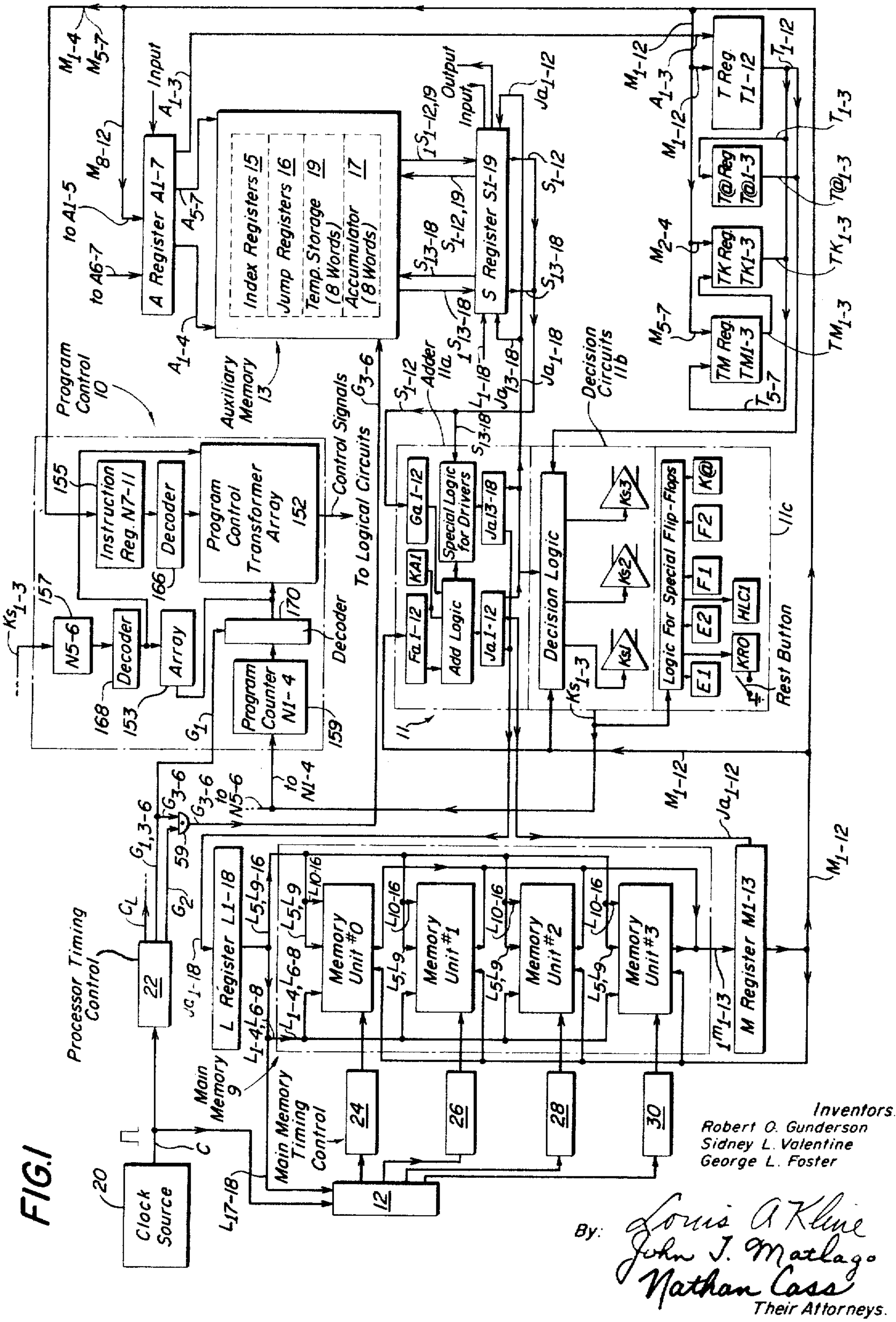
FIG. 1 is a schematic block diagram showing diagrammatically the general arrangement of the computer system disclosed in the aforementioned copending patent application Ser. No. 107,109, filed May 2, 1961, now United States Patent No. 3,223,980.
Figure 2:
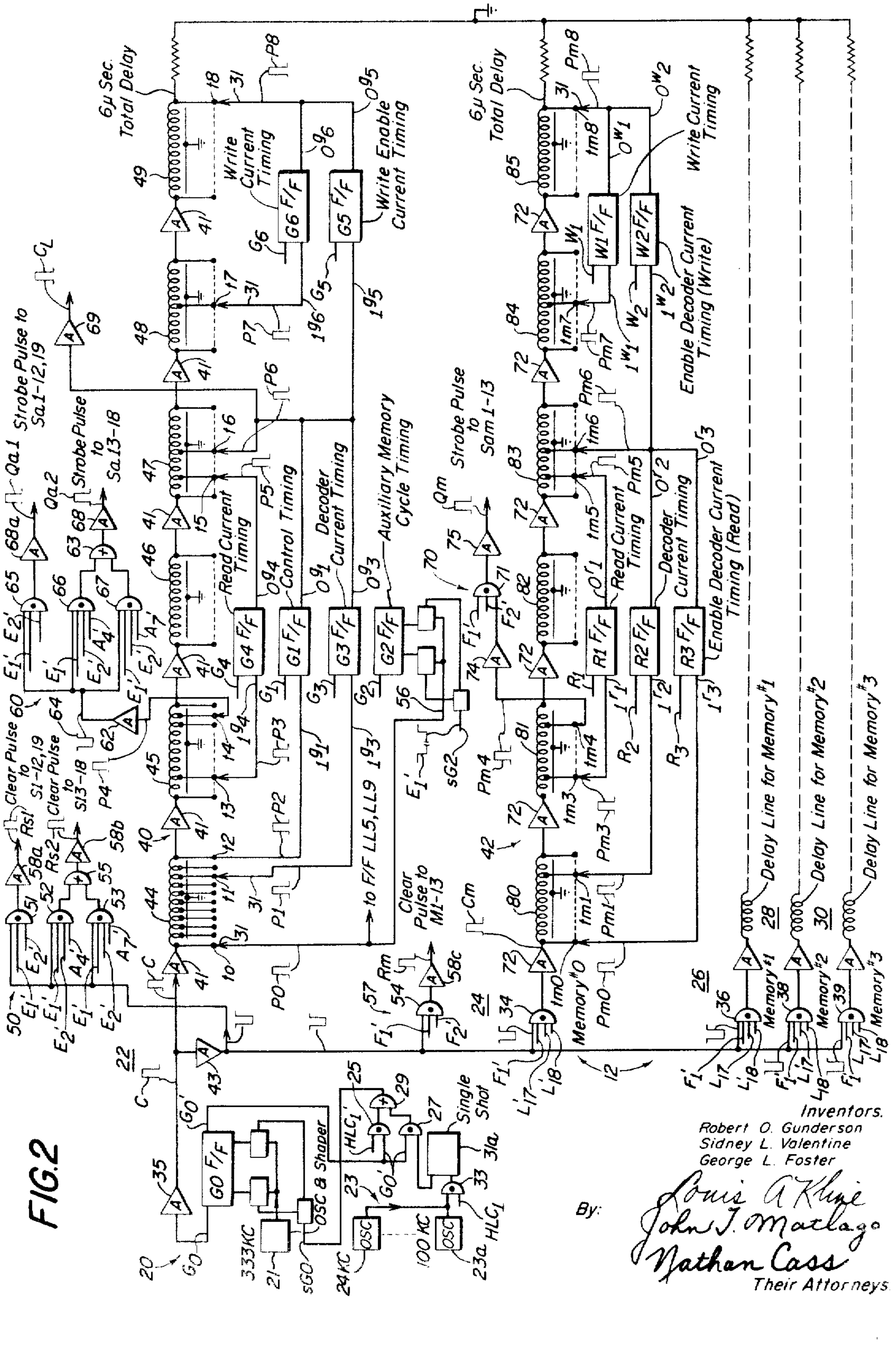
FIG. 2 is a schematic diagram illustrating the preferred timing control system providing a basic computer operating cycle for the computer system shown in FIG. 1.
Figure 5:
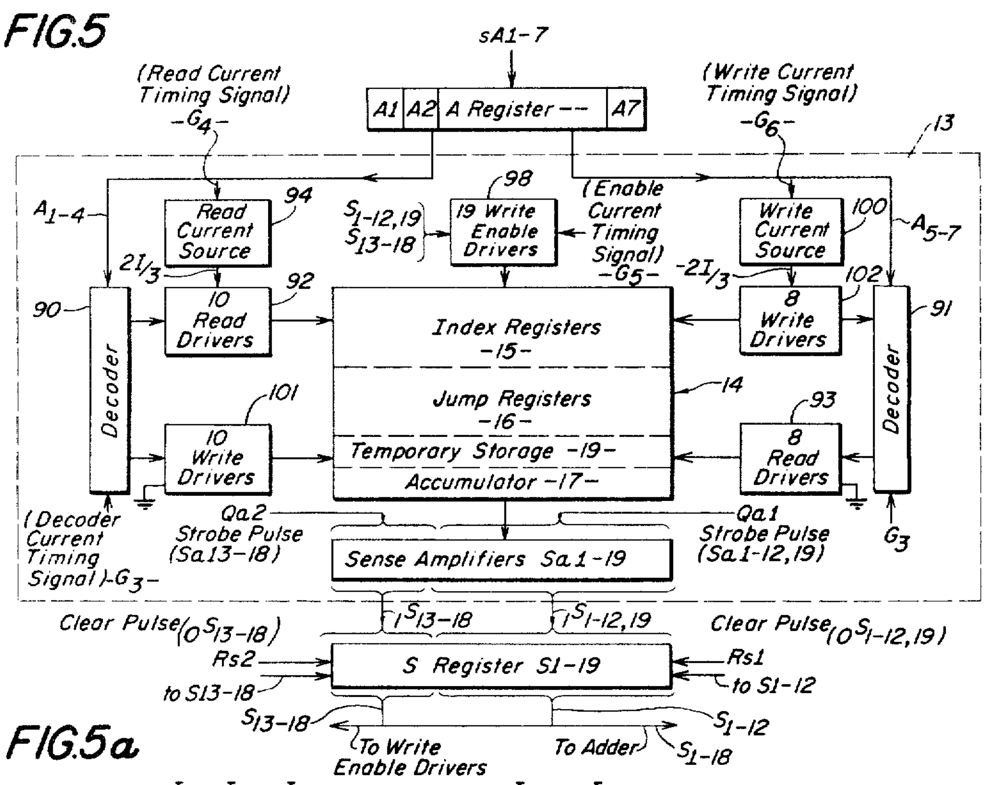
FIG. 5 is a schematic block diagram of the auxiliary memory illustrated more generally in FIG. 1.
Figure 6A:
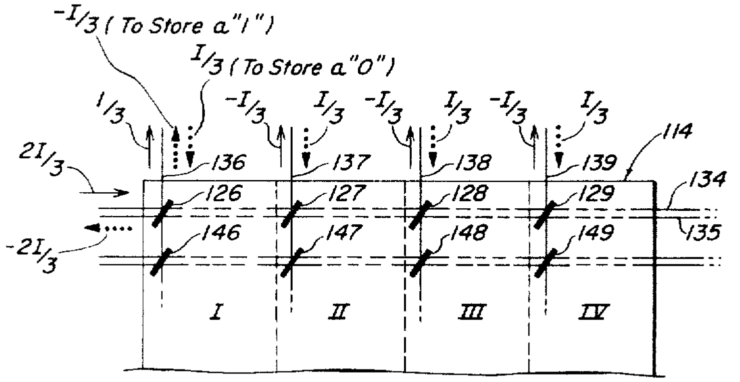
Figures 6, 8:
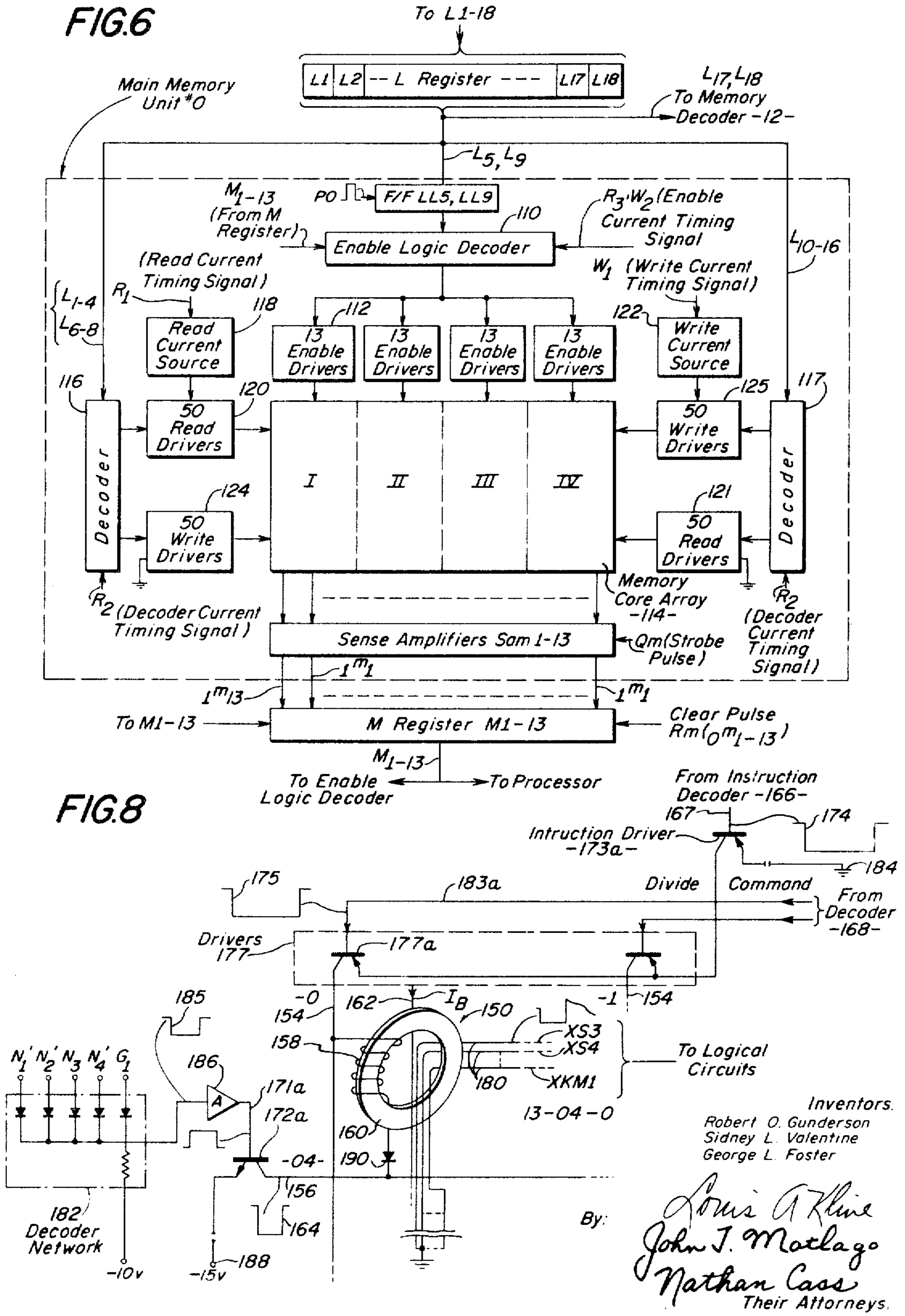
Figure 9:
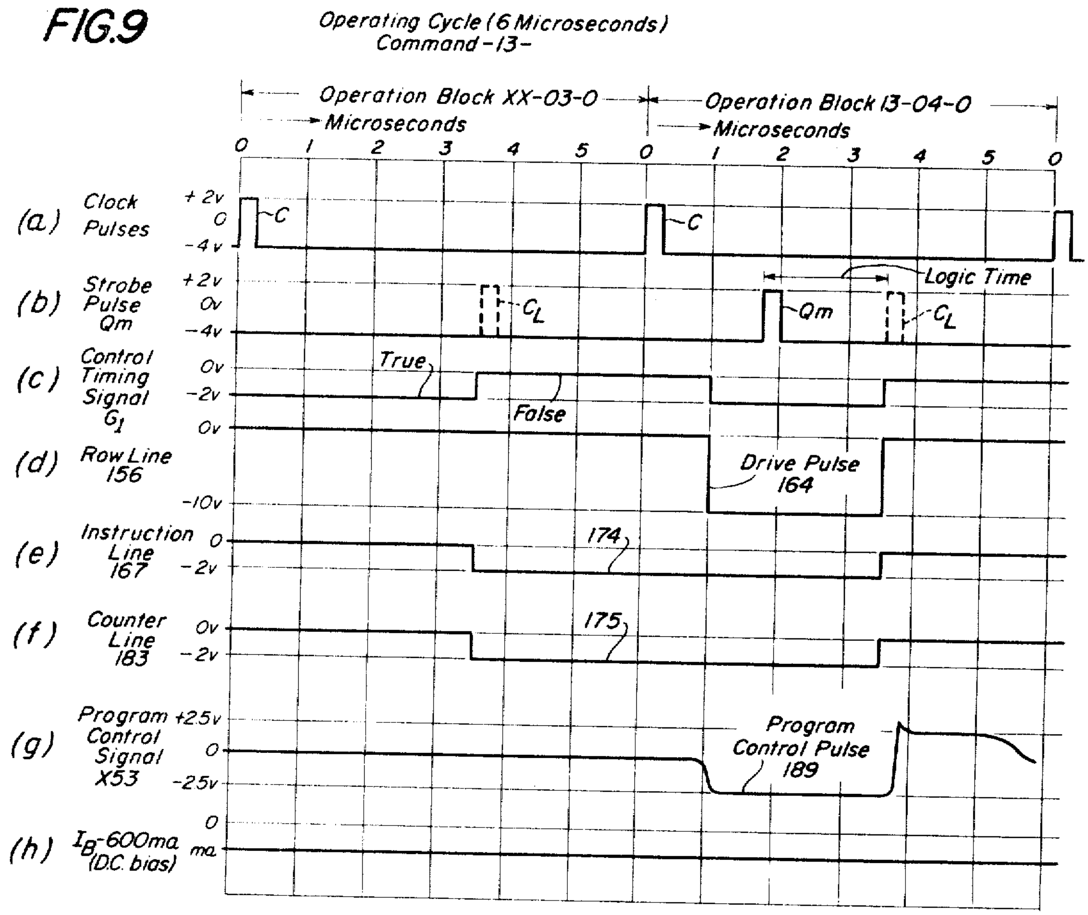
Figure 16:
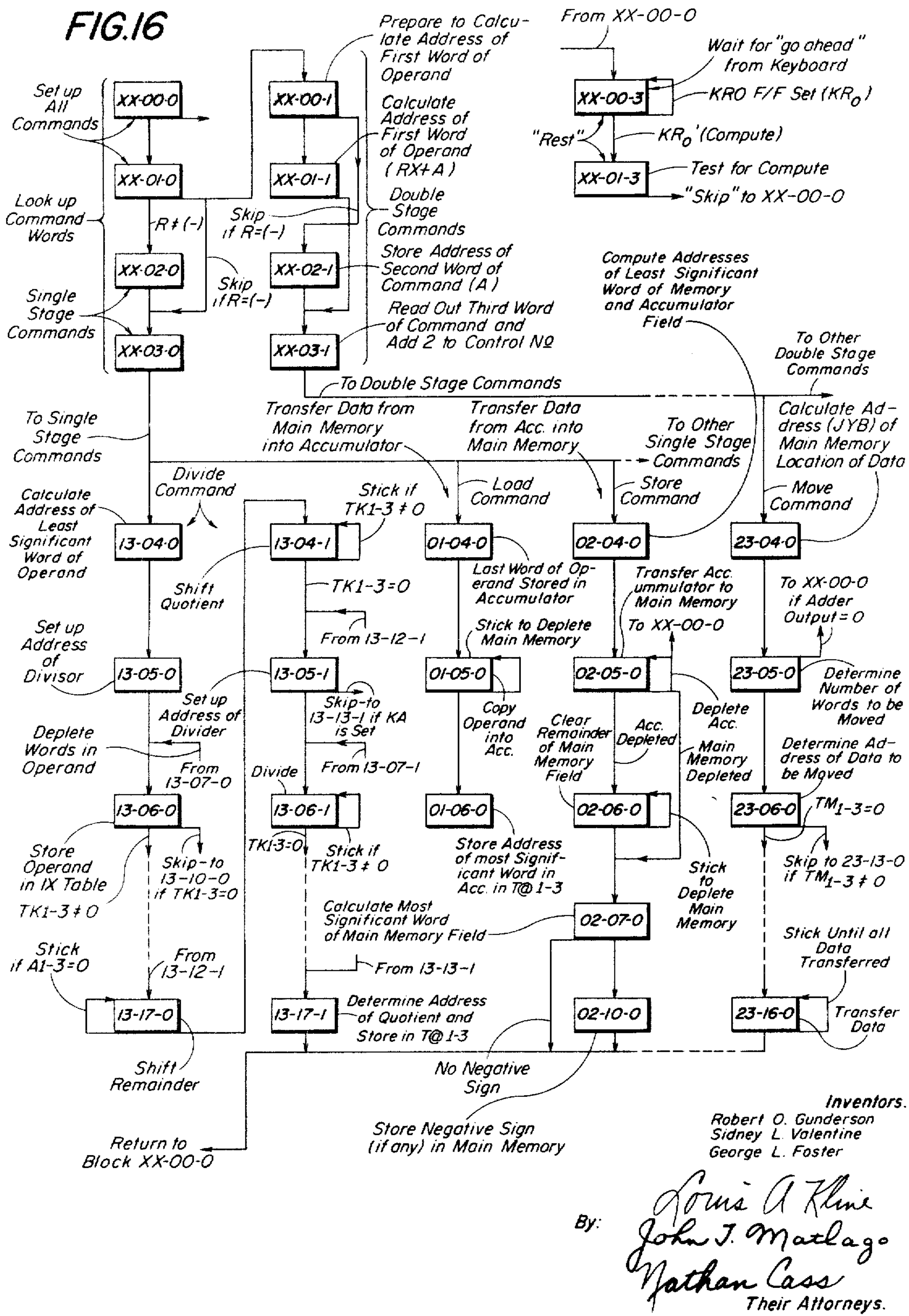
Figure 17:
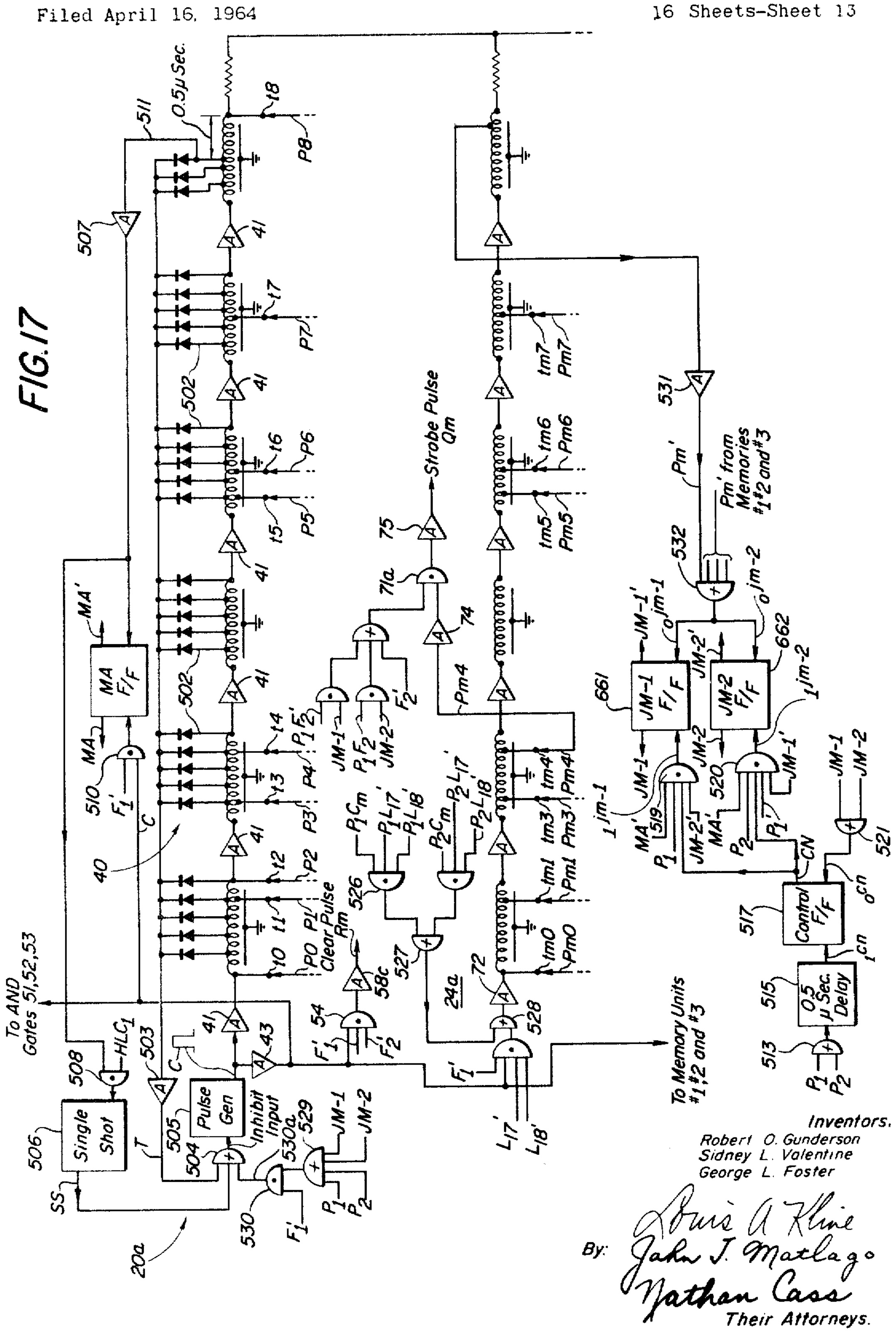
Figure 18:
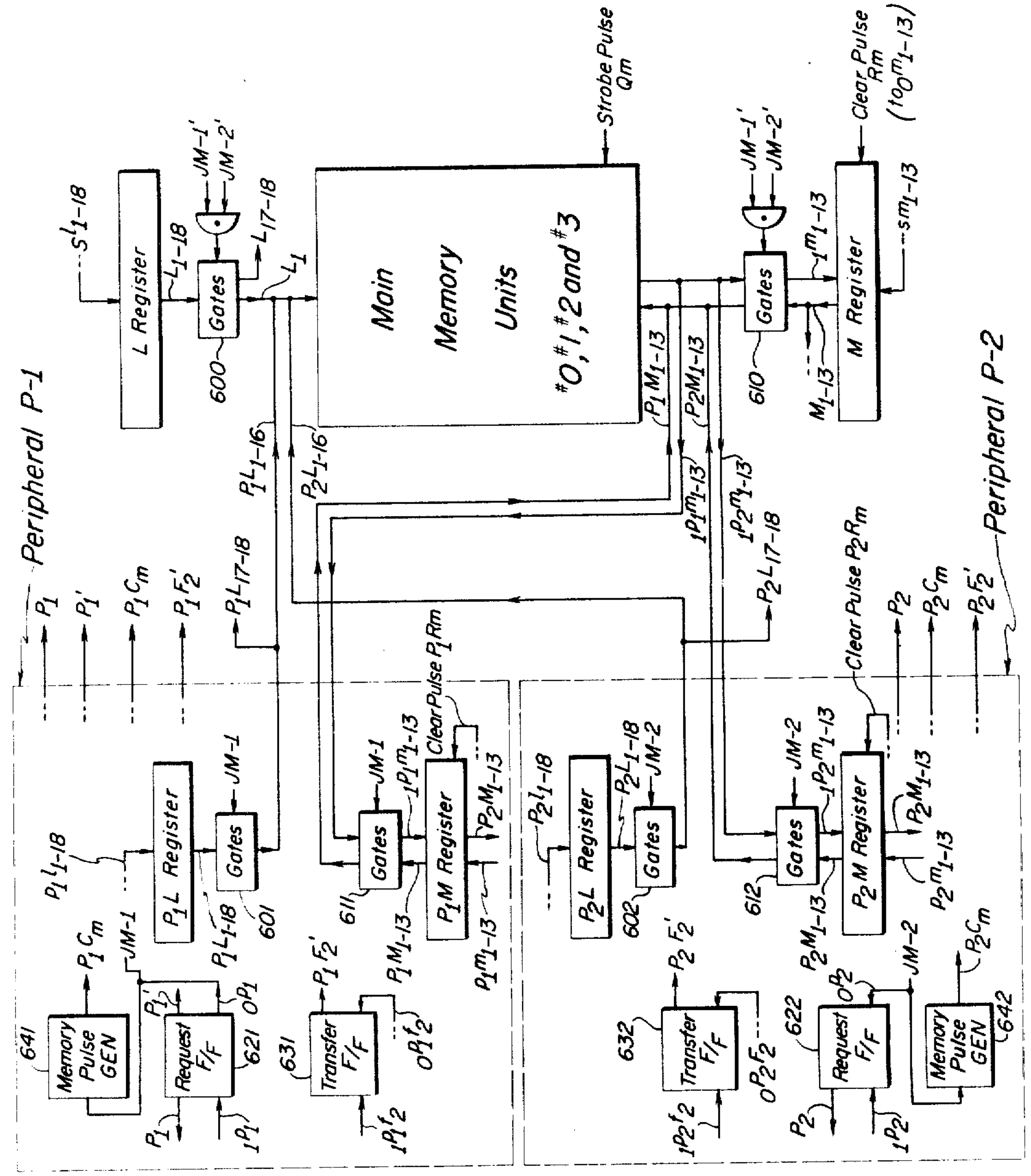
Figure 19:
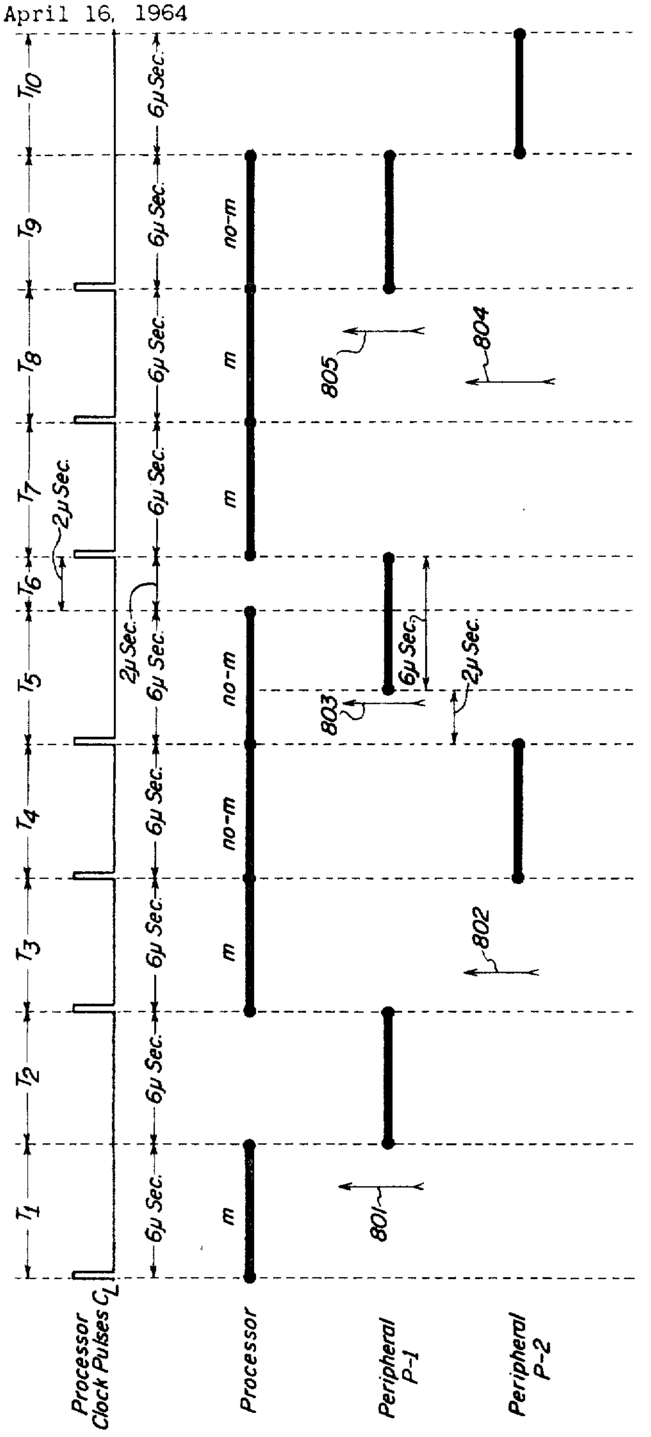
Figure 20:
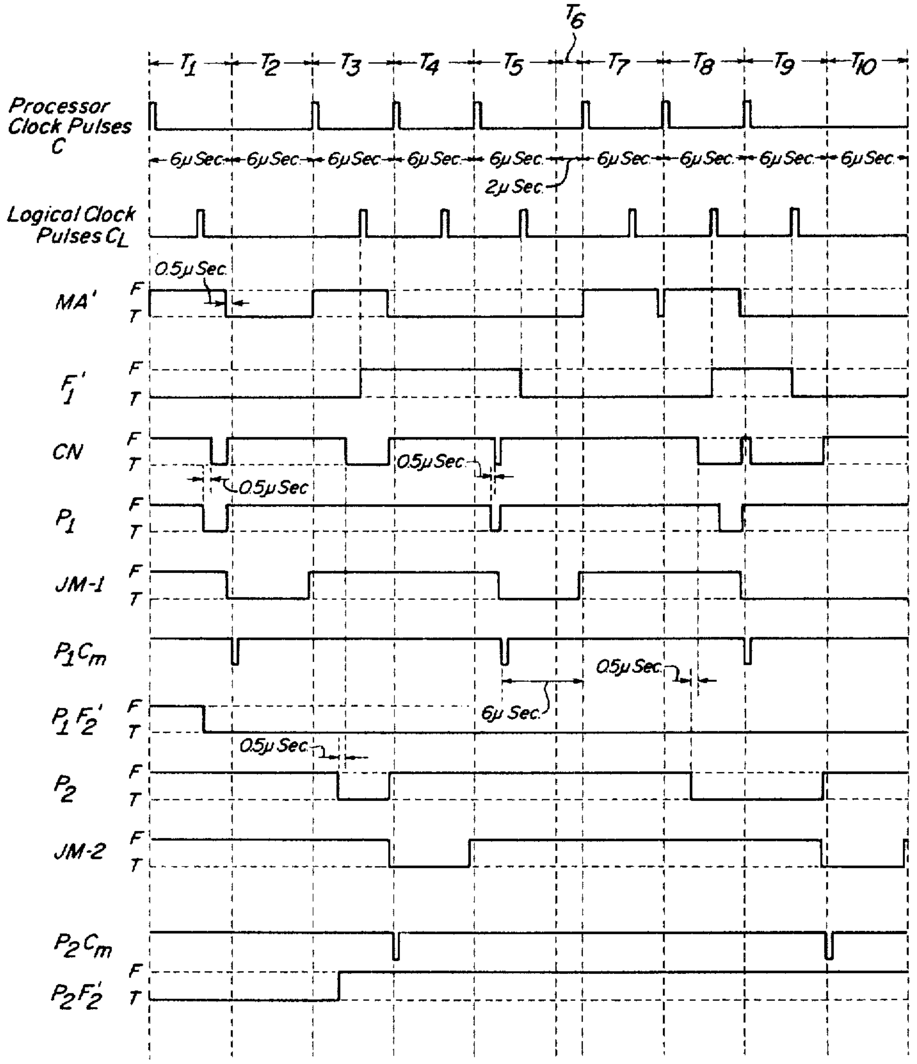

FIG. *5a* is a detailed diagram of a portion of the auxiliary memory shown in FIG. 5;

FIG. *5b* is a timing diagram for the auxiliary memory shown in FIG. 5;

FIG. 6 is a schematic block diagram of a typical main memory unit which is illustrated in FIG. 1;

FIG. *6a* is a detailed diagram of a portion of the main memory unit shown in FIG. 6;

FIGS. *7a* and *7b* taken together, are a schematic diagram, partially in block form and broken away in parts, showing the program control system which is illustrated more generally in the block diagram in FIG. 1;

FIG. 8 is a detailed wiring diagram of a selected portion of the program control system shown in FIG. *7b* for illustrating the operation of the program control system;

FIG. 9 is a timing diagram of selected signals which are produced in the operation of the program control system shown in FIGS. *7b* and 8;

FIG. 10 is a diagram showing portions of a table of the binary states of the flip-flops of the instruction register for the various processor commands;

FIG. 11 is a table showing the binary states of the flip-flops of the program counter;

FIG. 12 is a table showing the binary states of flip-flops of the instruction register and the program counter for a typical command, for illustrating typical operations of the processor;

FIG. 13 is a table showing the binary states of the flip-flops of the instruction register and the program counter for another typical command, for illustrating the operation of the processor;

FIG. 14 is a diagram illustrating the arrangement of data for a single stage command;

FIG. 15 is a diagram illustrating the arrangement of data for a double stage command;

FIG. 16 is a command flow diagram indicating exemplary commands controlled by corresponding groups of program control transformers of the program control transformer array shown in FIGS. *7a* and *7b*, for illustrating operation blocks common to all processor commands, single stage commands, and operation blocks specific to typical commands;

FIG. 17 is a schematic diagram illustrating how the preferred timing control system of FIG. 2 may be modified in accordance with the present invention;

FIG. 18 is a schematic diagram illustrating how, in accordance with the present invention, one or more peripheral units may be caused to cooperate with the computer system of FIGS. 1–16 using the modified timing control system of FIG. 17, so as to advantageously share the use of the main memory units of the computer system; and FIGS. 19 and 20 are graphs typically illustrating how the data processor may share the main memory with two peripheral units in accordance with the invention.

Like numerals designate like elements throughout the figures of the drawings.

The advantages and features of the present invention will be demonstrated as applied to a computer system of the type disclosed in the aforementioned commonly assigned copending patent application Ser. No. 107,109, filed May 2, 1961, now United States Patent No. 3,223,980. However, it is to be understood that the present invention is not limited to employment with such a system, but may be applied to any computer or like system where the features thereof can be used to advantage.

In order to permit the present invention to be clearly understood, the computer system disclosed in the aforementioned copending patent application will first be described with reference to FIGS. 1–16, and then it will be shown with reference to FIGS. 17–20 how the present invention may advantageously be applied thereto. If familiarity has already been gained with respect to this patent application, the reader may skip directly to column 36 which begins the description of the present invention with reference to FIGS. 17–20.

DESCRIPTION OF THE COMPUTER SYSTEM DISCLOSED IN PATENT APPLICATION SER. NO. 107,109, FILED MAY 2, 1961, NOW PATENT NO. 3,223,980

Referring now to the drawings, there is illustrated in FIG. 1, a simplified schematic diagram of a preferred embodiment of the computer system disclosed in the aforementioned copending patent application. The computer system includes: a main memory 9 having individual memory units #0, #1, #2, and #3 for storing information including programming data, working data and intermediate results in storage cells thereof, each storage cell having a one-word capacity; an auxiliary memory 13 containing various specially designated storage cells or registers; a program control system 10; and timing control apparatus including a clock source 20 which feeds clock signals to processor timing control circuit 22 and timing control circuits 24, 26, 28, and 30 for the respective memory units #0, #1, #2, and #3 of the main memory. As will be discussed, infra, in connection with FIG. 2, the timing control circuits are employed to define, during each basic operating cycle of the computer: (1) the timing of the operation of reading and writing data in the main memory 9 and the auxiliary memory 13, (2) the timing of the operation of the program control 10, and (3) the timing of the application of a logic clock pulse $C_L$ to the logical flip-flops in order to advance the logical sequencing of the computer.

Typically, each of the main memory units #0, #1, #2, and #3 in FIG. 1 has a storage capacity of 10,000 words providing a total storage capacity of 40,000 words. The basic information unit in the computer system is a word which consists of 12 bits plus a parity check bit. Each memory unit of main memory 9 provides an assigned address for each storage cell or stored word and each word is individually addressable by a common address register, the L register. The main memory 9 stores the program information, i.e., the commands, as well as the working data and intermediate results, and there is no restriction on the assignment of memory cells for the program or data. Information is transferred to, from, and between the various memories in the form of parallel information bits comprising one or more words which are also in parallel, i.e., each of the twelve bits of a single word as well as the words themselves are transferred simultaneously in parallel rather than in sequence, as in a series transfer. Arithmetic operations in the adder **11*a*** also process both complete words and their respective bits in parallel.

The auxiliary memory 13, which is included as a part of the processor, contains various special registers, including index registers 15, jump registers 16, temporary storage register 19, and an accumulator 17. The registers in the auxiliary memory 13 are accessible via the input-output lines to the S register by means of special commands or by a keyboard (not shown). The auxiliary memory 13 comprises eighty memory cells, sixty-four of which comprise the index and jump registers 15 and 16, in which each memory cell stores eighteen bits plus a parity check bit. The accumulator 17 comprises eight memory cells for storing eight words, each word containing twelve bits plus parity. The register for temporary storage 19 consists of eight memory cells for temporary internal storage which are used by the processor during the execution of certain commands.

In order to provide access to the 40,000 words stored in the main memory 9, an eighteen bit address is required. This address consists of four decimal coded binary digits of four bits each and an additional two bits for the most significant digit for individually addressing a particular one of the memory units #0, #1, #2, and #3. The auxiliary memory 13, on the other hand, is accessed by an address consisting of seven bits.

The flip-flop registers shown in block form in FIG. 1 include not only the flip-flop circuits, but also the logical networks associated therewith. In the adder **11*a***, blocks for input drivers F*a*1–12 and G*a*1–12 likewise include their respective logical input networks.

A brief discussion of each flip-flop register shown in FIG. 1 will now be presented in order to disclose the manner in which information is transferred or distributed in the computer system. Associated with the main memory 9 are the L register and the M register. The L register includes eighteen flip-flops, L1–18, and is used as the address register for the main memory 9. Flip-flops L1–16 are capable of designating an address ranging from 0000 to 9999 to provide access to each of 10,000 storage cells in any one of the four memory units #0–#4, and the particular memory unit is addressed by flip-flops L17–18. The M register, which comprises thirteen flip-flops, M1–13, and their associated logical networks, is employed as the input-output register for the main memory 9, including units #0, #1, #2, and #3, wherein flip-flops M1–12 store the word of information being transferred into or out of the particular unit of the main memory, and the flip-flop M13 stores the parity check bit.

The A register and the S register are provided for the auxiliary memory 13. The A register includes seven flip-flops A1–7 and is the address register for the auxiliary memory. The function of the A register is similar to the L register in that it determines which memory cell in the auxiliary memory 13 will be accessed during an auxiliary memory cycle. The S register includes nineteen flip-flops, S1–S19, and their associated logical input networks and is employed as the input-output register for the auxiliary memory. The function of the S register is similar to the M register in that any information which is read from or written into the auxiliary memory 13 passes through the S register. In addition, information transferred to and from the computer system passes through the S register, as indicated by the input and output lines to the S register in FIG. 1. Flip-flops S1–18 are used for storing information bits while flip-flop S19 stores the parity check bit during read out of either the index or jump registers. The eighteen bit storage capacity of the auxiliary memory and S register is required in order to handle the higher order addresses of cells in the main memory. During auxiliary memory cycles in which one of the cells for the accumulator 17 is accessed, only twelve bits of information, i.e., a word, is transferred from the accumulator cell and provision is made for utilizing only flip-flops S1–12 for storage of words being transferred during the memory cycle so that the remaining flip-flops S13–18 can then be conveniently utilized as a shift register. The operation of the auxiliary memory and the S register, in order to provide for variable length storage, will be discussed in detail later in the detailed descriptions of the timing control apparatus shown in FIG. 2 and the auxiliary memory 13 shown in FIG. 5.

The flip-flops N1–11 are used for individual selection of transformers in the program control transformer arrays 152 and 153 for controlling the operation of the computer system. Flip-flops N7–11 comprise the instruction register and are used for storing the command code or instruction while flip-flops N1–6, designated as the program counter flip-flops, complete the coordinate selection for the transformers in the program control transformer array 152. The T register including flip-flops T1–12 and the flip-flops of the remaining registers, TM, TK, and T@ provide temporary storage of certain information required and not otherwise immediately available for making decisions in the control of the sequence of operations of the computer system.

The adder 11*a*, in addition to its ordinary function of adding, provides for the transfer, without addition or subtraction, of information between the S and M registers and from the S register to the L register. The adder thus provides a convenient link between the S, L, and M registers and avoids the necessity of a direct line between these registers.

The jump register 16 is used primarily for the storage of the starting addresses of subroutines which will automatically be entered if, during the execution of certain double stage commands, certain abnormal conditions are encountered. These conditions relate to peripheral equipment and examples of these conditions comprise sensing a single indicative of the end of the paper on a high speed printer, the end of the tape on a magnetic tape handler, read or write errors detected on the magnetic tape handler, or a parity error detected while reading a punched paper tape. Any one of these conditions may occur during access to peripheral equipment and will cause predetermined subroutines while the starting addresses are stored in the jump register to take approximate action. The accumulator 17 is a register having a storage capacity of eight words of twelve bits each. Its primary function is to store intermediate and final results of arithmetic operations. The sign of a number is not stored in the accumulator itself, but is stored by the flip-flop K@ in the group of special flip-flops 11*a*. The effective length of the accumulator may vary from one to eighth words, depending upon the length of the information, e.g., number, it contains. The T@ register stores the effective length of the accumulator. If, for example, a four, five, or six digit number is in a memory field having a length of eight words, and the field is transferred from the main memory to the accumulator, the effective length of the accumulator will be two words corresponding to the number and the remaining words of the memory field which are zeroes will be ignored. Only information contained in the effective portion of the accumulator will be considered by the processor. In the above example, the six remaining words, e.g., the total length of eight words less the effective length of two words, are automatically ignored when the new sum in the accumulator is used for addition arithmetic operations, if the sum is to be stored in the main memory, or if it is to be used by a command to indicate quantity.

In transferring the number from the main memory 9 to the accumulator 17, the flip-flops A1–3 in the A register and the flip-flops T1–4 in the T register are set to 7. The words in the main memory 9 are transferred to the accumulator 17 through the adder 11*a*. As each word is transferred to the accumulator through the adder 11*a*, flip-flops A1–3 are decremented by one. If the word being transferred contains a significant digit, the flip-flops T1–4 are set by flip-flops A1–3. After the last word is transferred from the main memory to the accumulator and in the following operating cycle, the flip-flops T@1–3 of the T@ are set by the flip-flops T1–4.

Any memory cell in the index registers 15, jump registers 16, or the accumulator 17 may be accessed by certain commands or manually from the input keyboard (not shown) in order to store or change the number in the addressed register. Access to the registers in the auxiliary memory 13 is provided through the S register at the address placed in the A register. The foregoing is provided by lines connected directly from the input keyboard to logical networks in the respective A and S registers.

The details of the basic data structure employed in the computer system disclosed in the aforementioned copending patent application will next be considered. Hexadecimal and decimal digits and alpha-numeric characters are employed throughout the system and are represented by four bit and six bit configurations, respectively. Sixty-four alpha-numeric characters, comprising the upper case letters of the alphabet, some lower case letters of the alphabet, and certain symbols, are represented by a six bit configuration. The hexadecimal digits, or more simply, digits, lend themselves to binary configurations since four bits can be arranged in sixteen ways wherein 0, 1, 2, 3, 4, 5, 6, 7, 8, 9, @, (,), space, (&), (.), and (—) represent the sixteen different configurations of four binary digits or bits. The term "digit" refers to any of the sixteen possible configurations obtainable with four bits, while the term "character" will refer to any six bit configuration.

The binary configuration of each word consisting of twelve bits may be considered as either representing characters or digits. The following illustrations are examples of a word of information wherein a six bit configuration is employed to represent the letters B and R.

| B | R |
|---|---|
| 010010 | 101001 |

In the next example, the same word is used, but in this instance its binary configuration is considered as representing decimal digits in which a word is capable of storing three decimal digits instead of two characters as illustrated above.

| 4 | 10 | 9 |
|---|---|---|
| 0100 | 1010 | 1001 |

A unit of information commonly exceeds the capacity of one word; therefore, a main memory field consisting of as many as eight adjoining words may be used for storage of a unit of information, e.g., a command or operand. The main memory field is variable in length to accommodate units of information varying in length. The variable length utilizes the memory capacity more efficiently and provides for greater speed in the execution of commands in which shorter units of information or operands are being accessed. Since the maximum field length for a unit of information is eight words, the maximum length of a positive number is twenty-four digits. If the unit of information is a name or description employing characters (each word having a capacity of two characters) the eight words provide a maximum length of sixteen characters. In the storage of digits, the sign of a negative number is stored in the most significant digit position and the maximum length of a negative number, not including the minus sign, is twenty-three digits. The following is an illustration of a positive number 2398645 which is stored in a memory field of five words starting at the memory address 100.

| | Memory Field | | | | |
|---|---|---|---|---|---|
| Cell address | 100 | 101 | 102 | 103 | 104 |
| Positive number | 000 | 000 | 002 | 398 | 645 |

A negative sign would be stored in the most left digit position at the most significant end of the main memory field (e.g. memory address 100 in the illustration), and the absence of a negative sign indicates a positive number. It will be noted that the least significant word is located at the highest order address of the memory field, as illustrated in memory address 104. The address of the most significant word depends on the length of the number wherein the most significant digit is in the highest order address of a word in the field containing a significant digit, as illustrated at address 102. The lower order addresses of words in the memory field which are not significant digits and are all zeroes are provided, for example, for the storage of a larger number resulting from addition, etc., to the number in the memory field, and is to be stored in the same memory field. In the foregoing axample, the field could be limited to three words to store the significant digits of the number 2398645 with the sign stored in the most significant digit position of the word at address 102.

*Timing control system*

Figure 3:
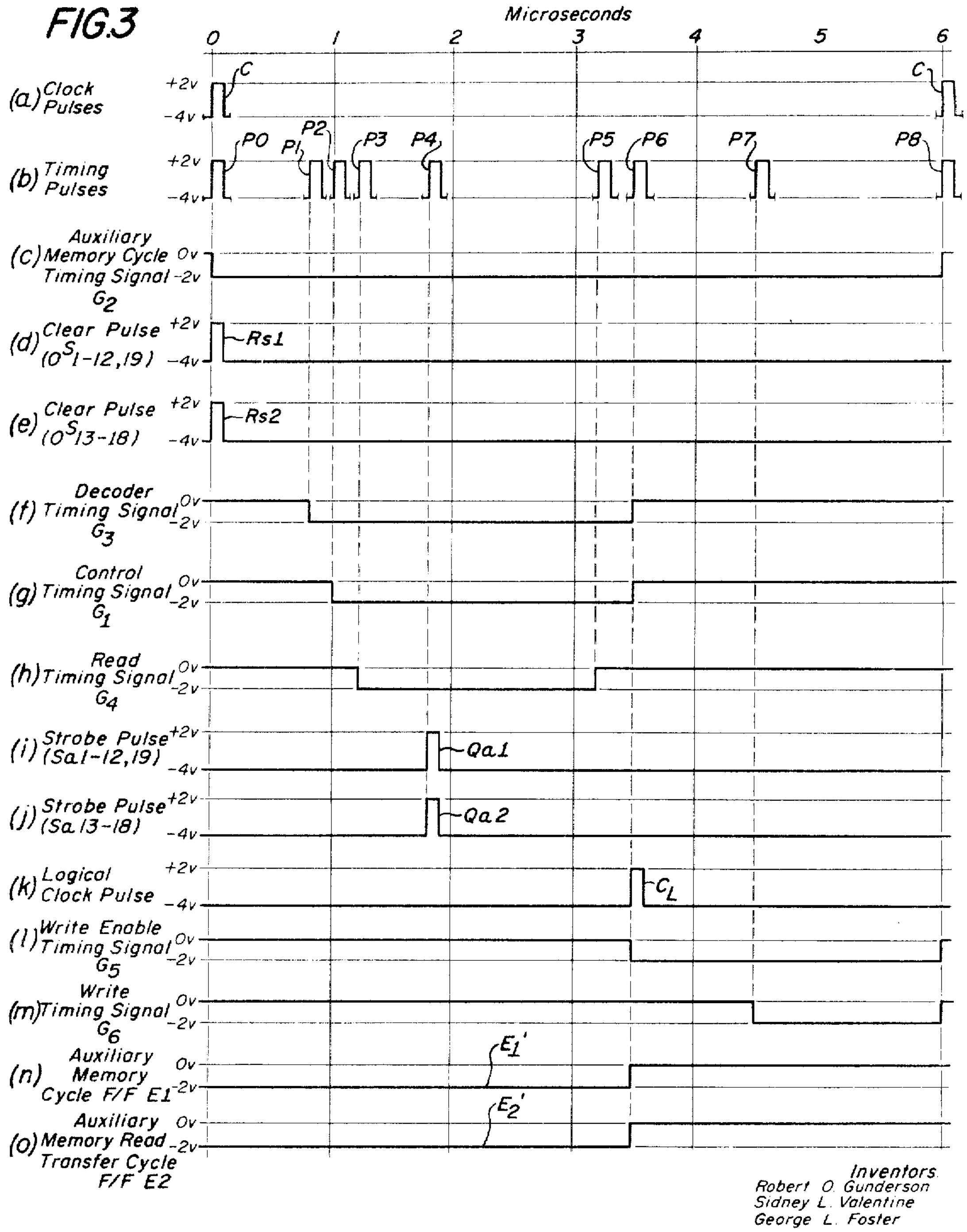
FIGS. 3 and 4 are timing diagrams for illustrating waveforms of the timing signals and other waveforms produced by or for the timing control system shown in FIG. 2 for controlling the timing of the basic operating cycle, wherein in FIG. 3, the waveforms are of timing signals for the processor, and in FIG. 4, the waveforms are of timing signals for the main memory.
Figure 4:
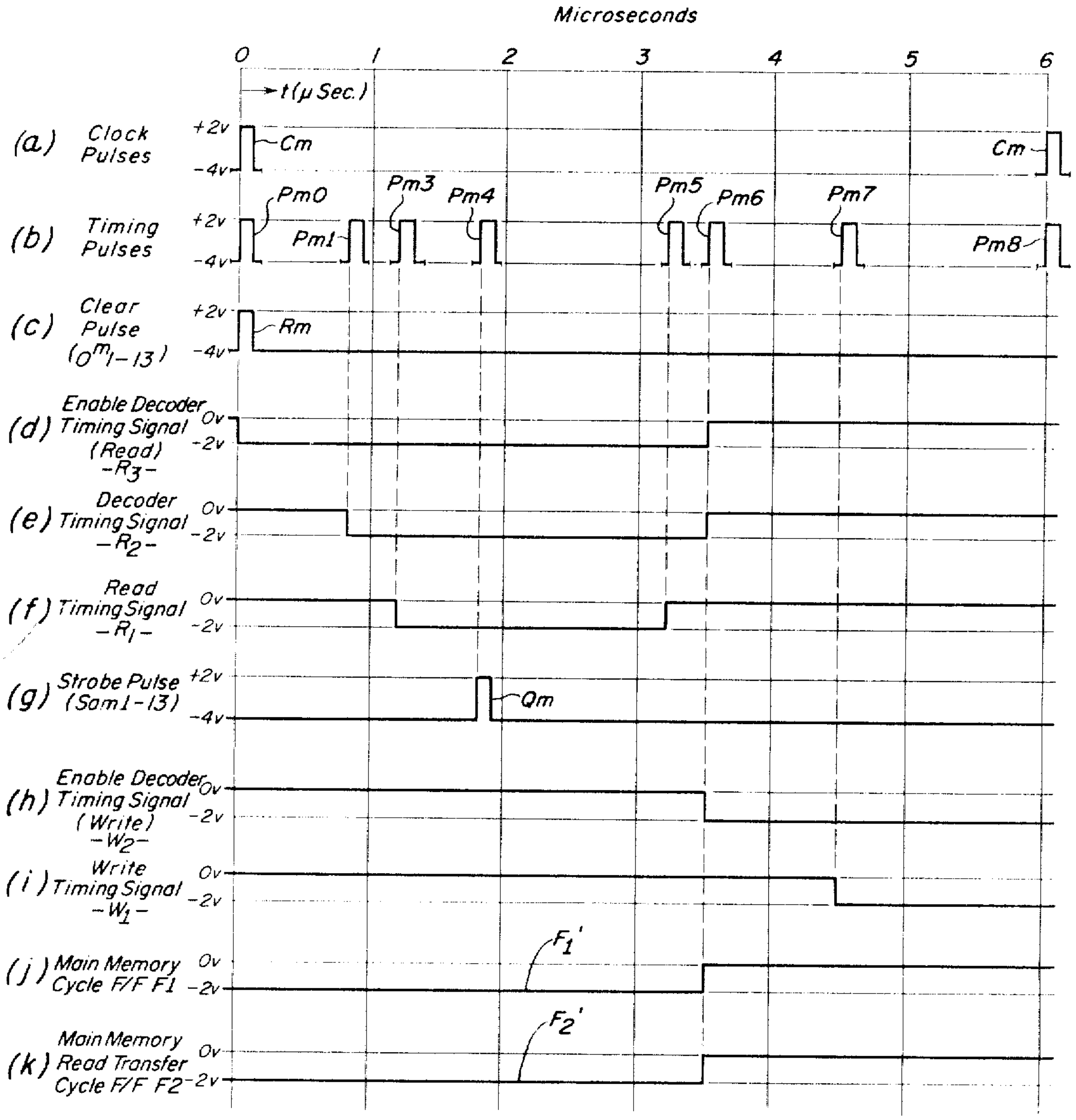

Referring now to FIG. 2 for a description of the timing of the computer system disclosed in the aforementioned copending patent application, a timing control system is shown diagrammatically which generates timing control signals for controlling the timing of the operations of the computer. The timing control system includes a clock source 20 for supplying clock pulses C to a group of timing control circuits including a timing control circuit 22 for the processor which includes the auxiliary memory; a timing control circuit 24 for the main memory unit #0; and timing control circuits 26, 28, and 30 for the respective main memory units #1, #2, and #3. The timing control circuits 26, 28, and 30 for main memory units #1, #2, and #3 have not been shown in detail since each of the circuits 26, 28, and 30 is the same as the timing control circuit 24. Clock pulses C and timing signals for a typical operating cycle including an auxiliary memory cycle and a main memory cycle are illustrated in FIGS. 3 and 4.

Each of the timing control circuits includes an electric delay line, e.g., low impedance lumped constant or distributed capacity delay lines 40 and 42, and each electric delay line has a total delay of six microseconds. The total time period of delay corresponds to the time interval of an operating cycle in order to derive timing pulses P from the delay line as required during the operating cycle. As shown, each of the delay lines is divided into six equal one microsecond delay line sections, for example the processor delay line 40 includes individual one microsecond delay line sections 44 to 49 inclusive. The first section 44 of the delay line 40 is connected to the clock source 20 through an amplifier-shaper circuit 41 for amplifying and shaping the clock pulses C. Adjacent sections of each delay line are also connected by respective amplifier-shaper circuits, e.g., amplifier-shaper circuits 41, which amplify and shape the clock pulses C after passing through a previous section of the delay line 40.

In the embodiment as shown in FIG. 2, each delay line section is capable of being tapped between ten .1 microsecond subsections. The taps *t*0 to *t*8, *tm*0, *tm*1, and *tm*3 to *tm*8, are selected taps for the present embodiment and are utilized for coupling timing pulses, such as P0, P1, etc. (FIG. 3(*b*)), to gates and timing flip-flops in the respective timing control circuits. All of the taps between subsections have not been shown in detail but are indicated in the drawing as available between .1 microsecond time intervals over the time interval of delay of the respective delay line section whereby selected timing pulses, such as P0, P1, etc. can be made available for the timing of the operations in an operating cycle. The connections to the taps on the delay lines 40 and 42 to pulse and timing signal circuits, i.e., the gating circuits and timing flip-flops, are indicated diagrammatically for delay line section 44 as adjustable connections or sliders 31 for varying the position of the connection to the delay line of taps *t*0 to *t*8, *tm*0, *tm*1, and *tm*3 to *tm*8 for varying the time interval of the timing pulses derived from the delay lines 40 and 42. If desired, the connections from the pulse and timing circuits to respective taps *t*0 to *t*8, *tm*0, *tm*1, and *tm*3 to *tm*8 may be fixed, e.g., solder connections.

The output of the clock source 20 is coupled to the timing control circuits to supply a clock pulse C to the delay line 40 and to a main memory decoder 12 including input gates 34, 36, 38, and 39.

Each of the timing control circuits 22, 24, 26, 28, and 30 includes a group of timing signal generating circuits, i.e., timing flip-flops, and each of the timing flip-flops produces a low potential level (−2 v.) timing signal output when in the true state for controlling the time period in which circuits coupled to the respective timing flip-flops are made operative during an operating cycle of the data processor. A first timing pulse coupled to a flip-flop in an operating cycle is coupled to its set input to set it into its true state while a second timing pulse coupled to the same flip-flop is coupled to its reset input to reset the flip-flop to its false state. The true state outputs of the timing flip-flops are referred to as timing signals rather than timing pulses, to distinguish from the latter.

In addition, each of the timing control circuits includes at least one strobe pulse forming circuit which is coupled to respective delay lines for passing a timing pulse which is amplified and shaped to produce strobe pulses, e.g., Q*a*1, Q*a*2, and Q*m* shown in FIGS. 3(*i*), 3(*j*), and 4(*g*), for strobing or gating the output of respective groups of memory sense amplifiers during memory cycles including a "read transfer" memory cycle, i.e., "reading out" an addressed cell in the respective memory and storing the data in the respective groups of flip-flops comprising the respective memory register. Also, the processor timing control circuit 22 includes a pulse shaping circuit 69 which is coupled to tap *t*6 of the delay line 40 to provide a logical clock pulse $C_L$ (FIG. 3(*k*)).

In addition to the timing control circuits 22, 24, 26, 28, and 30, the timing control system includes clear pulse forming circuits 50 and 57 which provide clear pulses for the auxiliary and main memory respectively. The clear pulse circuits are coupled to the clock source 20 through an amplifier-shaper circuit 43 to provide clear pulses R*s*1 and R*s*2 (FIGS. 3(*d*) and 3(*e*)) for clearing the S register (FIG. 5) prior to a "read transfer" memory cycle in the auxiliary memory; and clear pulse R*m* (FIG. 4(*c*)) for clearing the M register (FIG. 6) prior to a "read transfer" memory cycle in the main memory unit #0.

The nomenclature used employs combinations of upper case letters and numbers for designating flip-flops (e.g. S1) and combinations of upper case letters followed by lower case letters and numbers for drivers (e.g. K*s*1). The outputs of the flip-flops are characterized by corresponding upper case letters with the associated numbers shown as a subscript (e.g. $S_1$) and the outputs of drivers by corresponding upper case letters and lower case letters with the associated numbers shown as subscripts (e.g. $Ks_1$). In order to characterize the true state output of a flip-flop circuit or driver circuit from the false, the latter is distinguished from the former by an affixed prime. A single logical input to a flip-flop is designated by corresponding upper case letters and numbers preceded by the lower case letter *s* (e.g. *s*S1). The inputs for setting and resetting a flip-flop are distinguished by lower case letters corresponding to the flip-flops and from one another by subscripts 1 and 0, respectively, prefixing the lower case letters (see FIG. 22*a*), for example, ${}_0s_1$ and ${}_1s_1$.

In designating the timing pulses, the upper case letter P has been reserved which is followed by corresponding numbers, (e.g. P0, P1, etc.). The main memory timing pulses are distinguished from corresponding timing pulses P in the processor by the lower case letter *m* which follows (e.g. P*m*0, P*m*1, etc.). The upper case letter C is reserved for designation of clock pulses. The main clock pulses are designated by C, the logical clock pulses $C_L$, and the clock coupled to the main memory unit #0 to #3 is C*m*. Strobe and clear pulses have been designated by reserved upper case letter Q and R, respectively, followed by lower case letters *s* and *m* designating the registers S and M, affected by the pulses (e.g. Q*m*). Where necessary, numbers follow the lower case letters to distinguish the pulses. A single upper case letter X preceding other letters, designates program control signals (e.g. XL1). Successive upper case letters XX designate certain operation blocks. Throughout the specification, the upper case letter I has retained its conventional connotation referring to currents except when referring to inverter circuits for input logical networks which have been illustrated in block diagram having the upper case letter I notation. The combination of upper case letters KC retains its conventional connotation designating kilocycles.

*Clock source*

Referring again to FIG. 2, a detailed description of the timing control system and the operating cycle of the computer will now be given. Considering the clock source 20 first, it will be remembered that clock pulses C for the timing and operating cycle of the computer are normally provided at six microsecond intervals, that is, at a repetition rate of 166.7 kilocycles. However, it will be appreciated that this 166.7 kilocycle clock rate may not be appropriate for use with peripheral equipment for the computer system, i.e., various input-output devices which operate at different rates. In such a situation, therefore, it becomes necessary to synchronize the clock rate of the clock pulses C with the rate of operation or speed of the particular input-output device being employed. The clock source 20, schematically indicated in block form in FIG. 2, is thus constructed and arranged to provide clock pulses C both at the normal 166.7 kilocycle rate, and also, at a rate in synchronism with input-output devices having different operating rates.

This dual type of operation for the clock source 20 is made possible by feeding the false output $G_0'$ of flip-flop G0 to the logical input thereof by way of either AND gate 25 or AND gate 27, and then through OR gate 29 to the logical input. For normal operation of the clock source 20 at a 166.7 kilocycle repetition rate, a flip-flop HLC1 (FIG. 1) is in a false state and the signal $HLC_1'$ is thereby caused to be at the low potential, permitting the false output $G_0'$ of flip-flop G0 to pass through AND gate 25 and OR gate 29 to the logical input of flip-flop G0. Then, by feeding output pulses from a 333.3 kilocycle oscillator 21 to the clock input of flip-flop G0, it will be understood taht this flip-flop will switch at a 333.3 kilocycle rate; and upon amplifying and shaping the trailing edge of the square wave signal at the true output $G_0$ of flip-flop G0 by means of amplifier and shaper 35, clock signals C will be obtained at the desired 166.7 kilocycle repetition rate, that is, at intervals of six microseconds.

When peripheral equipment is coupled to the computer system of the aforementioned patent application illustrated in FIGS. 1 and 2, the clock signals C generated by the clock source 20 are synchronized with the operating rate of the equipment by providing oscillators, such as the 100 kilocycle oscillator 23*a*, having frequencies which correspond to input-output devices which may be employed with the computer. Means are provided (not shown) for activating a selected one of these oscillators, such as the 100 kilocycle oscillator 23*a*, when it is desired that an input-output device be operated in conjunction with the computer, the particular oscillator being chosen in accordance with the operating rate of the input-output device. At such time, the output $HLC_1'$ becomes high to disenable AND gate 25 and output $HLC_1$ becomes low to enable AND gate 33. As a result, the false output $G_0'$ of flip-flop G0 is no longer fed to the logical input of flip-flop G0 by way of AND gate 25. Instead, the false output $G_0'$ of flip-flop G0 is now fed by way of AND gate 27 which is enabled by a single shot 31*a* for a predetermined period in response to each cycle of the selected oscillator which triggers the single shot 31*a* by way of AND gate 33.

By choosing the "on" time of the single shot 31*a* to be of the order of 3.5 microseconds (slightly more than one-half of the normal six microsecond interval between clock pulses C) it will be understood that the false output $G_0'$ will be applied to the logical input of flip-flop G0 by way of gate 27 for only a 3.5 microsecond period during each cycle of the selected oscillator regardless of the repetition rate thereof, permitting only one clock pulse C to be generated for each cycle of the selected oscillator, thereby achieving the desired synchronization.

*Clearing circuits*

The clear pulse forming circuits 50 have been provided for generating clear pulses R*s*1 and R*s*2 (FIGS. 3(*d*) and 3(*e*) for the auxiliary memory 13 at the beginning of each operating cycle, including a "read transfer" auixilary memory cycle. The clear pulse forming circuit 57 likewise generates a clear pulse R*m* (FIG. 4(*c*) for the main memory at the beginning of each operating cycle including a "read transfer" main memory cycle, i.e. "reading out" and transferring words from an addressed cell in main memory unit #0 to the flip-flop M1-13 of the M register.

The clearing circuits 50 and 57 are connected to the output of the amplifier 43 to couple a clock pulse C, which has been inverted in the amplifier 43, to AND gates 51 to 54. The AND gate 51 has enabling inputs $E_1'$, $E_2'$ coupled from the respective false state outputs of flip-flops E1 and E2 shown in FIG. 1. The flip-flop outputs $E_1'$ and $E_2'$, shown in FIGS. 3(*n*) and 3(*o*), provide enabling inputs to the gate 51 when the respective flip-flops are reset, at the logical clock $C_L$ during the previous operating cycle, for the present operating cycle which includes a "read transfer" auxiliary memory cycle. The output of the AND gate 51 is shaped, amplified, and inverted in amplifier 58*a* to produce the clear pulse R*s*1 (FIG. 3(*d*)) which is coupled to the S register (FIG. 5) for resetting flip-flops S1–12 and S19. In order to clear all of the flip-flops S1–19 in the S register, an additional clear pulse R*s*2 (FIG. 3(*e*)) is produced along with clear pulse R*s*1 to clear flip-flops S13–18 in the S register prior to "reading out" the auxiliary memory. Flip-flops S13–18 are required to store words "readout" at an address in the index registers 15 or the jump registers 16 in the auxiliary memory 13 (FIG. 5) in which registers the word length storage capacity of a cell is eighteen bits plus a parity check bit as distinguished from the accumulator 17 in which the word length capacity of a cell is twelve bits plus a parity check bit. An address of a word in the index registers 15 or jump registers 16, which requires clearing of the flip-flops S13–18, is indicated by the "false" state of flip-flops A4 and/or A7 in the A address register providing inputs $A_4'$ and/or $A_7'$ to the AND gates 52 and 53, respectively. The outputs of the AND gates 52 and 53 are coupled to an OR gate 55 having an output which is inverted, amplified, and shaped in amplifier 58*b* to produce the clear pulse R*s*2. The clear pulses R*s*1 and R*s*2 are coupled to reset inputs of groups of flip-flops S1–12 and S19 and S13–18 respectively, of the S register prior to "reading out" a cell in the auxiliary memory and storing the output in the S register.

The AND gate 54, in the clear pulse forming circuit 57, produces a clear pulse R*m* (FIG. 4(*c*)) for clearing the M register by resetting flip-flops M1 to M13 at the beginning of the operating cycle including a "read transfer" main memory cycle. The enabling inputs for producing the clear pulse R*m* are the inputs $F_1'$ and $F_2'$ (FIGS. 4(*j*) and 4(*k*) coupled from the corresponding false state outputs of flip-flops F1 and F2 shown in FIG. 1.

Flip-flops F1 and F2 are reset to the false state at the logical clock pulse $C_L$ in the preceding operating cycle to provide the enabling inputs $F_1'$ and $F_2'$ to the AND gate 54 during the present operating cycle including a "read transfer" main memory cycle. The output of the gate 54 is amplified, inverted, and shaped in amplifier 58c to produce clear pulses R*m* which are coupled to the reset inputs of flip-flops M1–13 of the M register to reset the flip-flops prior to "reading out" a cell in a main memory unit and storing the output in the M register.

*Processor timing control*

The timing control circuit 22 for the processor generates timing pulses P0 to P8 for timing flip-flops G1 to G6, as indicated in FIG. 2, for producing timing signals $G_1$ to $G_6$ which are coupled to the processor including the auxiliary memory 13, and the program control 10. In FIG. 3(*b*), a timing diagram for timing control circuit 22 illustrates timing pulses P0 to P8 produced during a typical operating cycle, which pulses are available sequentially in time in the operating cycle at taps *t*0 to *t*8 as the clock pulse C (FIG. 3(*a*)) passes through the delay line 40 during a six microsecond time period. At the first tap on the delay line 40, tap *t*0 on the delay line section 44, the timing pulse P0 is coupled to the clock input 56 of the flip-flop G2 for placing the flip-flop into its true state to produce a timing signal $G_2$ indicating an operating cycle including an auxiliary memory cycle. The logical input to the flip-flop G2 is the false state output signal $E_1'$ of the flip-flop E1, which is set during the operating cycle, immediately preceding the typical operating cycle presently being considered, at the logical clock $C_L$. The signal $E_1'$ is coupled to the input *s*G2 to place the flip-flop G2 in its true state at the beginning of an operating cycle which indicates an auxiliary memory cycle is included in the present operating cycle. A true output (low potential level −2 v.) at $G_2$ provides an enabling input to output gates, shown schematically in FIG. 1 by a single AND gate 59, passing the timing signals $G_3$ to $G_6$ to respective auxiliary memory circuits. The outputs of the flip-flops G2 and E1 are indicated in FIGS. 3(*c*) and 3(*n*) by typical waveforms $G_2$ and $E_1'$, respectively.

The first operation in an operating cycle which includes an auxiliary memory cycle is the decoding of the address in the A register shown in FIG. 5. This operation is initiated by supplying the timing signal $G_3$ to address decoders 90 and 91 in the auxiliary memory 13 shown in FIG. 5. The timing of this operation is controlled by the flip-flop G3 (FIG. 2), having an output $G_3$ which is gated to the address decoders 90 and 91 for the auxilary memory cycle. The timing signal $G_3$ controls the current supplied to the decoders for decoding the outputs of the flip-flops A1–7 in the A register. The flip-flop G3 is set into its true state by the timing pulse P1 which is coupled to the set input $_1g_3$. The pulse P1 is obtained from the delay line section 44 at the tap *t*1. The tap *t*1 is located on section 44 to produce the pulse P1, .8 microsecond after the initiation of the operating cycle. The timing signal $G_3$ provided by flip-flop G3 is indicated in FIG. 3(*f*).

In considering the timing of the address decoders 90 and 91 (FIG. 5) controlled by timing signal $G_3$ from the flip-flop G3, it is noted that this operation precedes "reading" of the auxiliary memory by .4 microsecond which "reading" is initiated by a timing signal $G_4$, 1.2 microseconds after the beginning of the operating cycle. The .4 microsecond time interval between the timing signals $G_3$ and $G_4$ is an adequate time interval to provide a complete address of a cell in the auxiliary memory from the output of the decorders 90 and 91 and prior to initiation of read current in the auxiliary memory. The outputs of the decoders 90 and 91 are coupled to selected read drivers, one in each of the groups 92 and 93, to supply read current to the addressed cell in the auxiliary memory 13. A predetermined pair of read drivers are selected in accordance with the address in the A register whereby one read driver in each of the groups 92 and 93, selected by the output of decoders 90 and 91, respectively, will supply read current to the cores in the addressed cell of the auxiliary memory 13, during the read current time interval or read time interval, from a read current source 94 controlled by the timing signal $G_4$ supplied from a timing flip-flop G4.

Timing of the read current supplied from the read current source 94 to the selected drivers in groups of read drivers 92 and 93 is controlled by the flip-flop G4. The true state output of the flip-flop G4 providing the timing signal $G_4$, illustrated in FIG. 3 (*h*), is coupled to the read current source 94 to supply read current to the read current drivers in the groups 92 and 93. The flip-flop G4 is set into its true state at its set input $_1g_4$ by the timing pulse P3, which is derived from delay line section 45 at the tap *t*3. The tap *t*3 is located on the delay line section 45 to provide the timing pulse P3, 1.2 microseconds after the beginning of an operating cycle.

The logical and arithmetic circuits of the computer system disclosed in the aforementioned copending patent application, including those circuits in the arithmetic unit 11, are controlled by a program control system (FIGS. 7*a* and 7*b*) providing program control signals for gating selected logical and arithmetic circuits to perform logical operations during a period in an operating cycle which begins with a strobe pulse Q*a*1 and Q*a*2 and ends at the logical clock $C_L$. The program control circuit, shown in FIGS. 7*a* and 7*b*, and more particularly, a program counter decoder 170 coupled to program counter flip-flops N-1–4, is supplied a timing signal $G_1$ from the true output of flip-flop G1, illustrated in FIG. 3(*g*). The set input $_1g_1$, for setting the flip-flop G1 into its true state, is coupled to the tap *t*2 on the delay line section 44, which tap is located thereon to supply a timing pulse P2 to the set input $_1g_1$, one microsecond after the initiation of the operating cycle. The timing signal $G_1$ precedes the start of the performance of the logic which begins with the strobe pulses Q*a*1 and Q*a*2 at a time 1.8 microseconds after the initiation of the operating cycle. The time interval of .8 microsecond between the beginning of the timing signal $G_1$ and the strobe pulses Q*a*1 and Q*a*2 provides an adequate time interval for a program control signal to be induced on sense lines 180 coupled to a selected transformer 150 in either one of the transformer arrays 152 and 153 of the program control system, whereby the presence of the program control signal is assured at the start of the performance of the logic. The details of the program control system are set forth, infra in connection with the description of FIGS. 7*a* and 7*b*.

The next timing function of the timing control circuit 22, in the operating cycle including an auxiliary memory cycle, is to supply strobe pulses Q*a*1 and Q*a*2 to sense amplifiers S*a*1–12 and S*a*13–18 respectively, illustrated in block form in FIG. 5. The strobe pulses are timed to pass the desired portion of the amplified output "read out" of the addressed cell in the auxiliary memory which portion begins .6 microsecond after read current is supplied to the cores forming the addressed cell. Generating strobe pulses at 1.8 microseconds in the operating cycle, .6 microsecond after the read current applied to the cores at 1.2 microseconds, passes the desired amplified output from the cores of the addressed cell to the respective flip-flops in the S register.

Strobe pulse forming circuits 60 have been provided to produce the strobe pulses Q*a*1 and Q*a*2, shown in FIGS. 3 (*i*) and 3(*j*), 1.8 microseconds after the beginning of the operating cycle. The circuits 60 are connected to the delay line section 45 at a tap *t*4 by an amplifier 62 to supply an inverted timing pulse P4, a pulse 64 to the circuits 60. The timing pulse P4 is inverted by the amplifier-shaper circuit 62 to provide the pulse 64 which is passed by AND gates 65, 66, and 67 in the presence of proper enabling inputs to the respective gates. The proper enabling inputs to the AND gate 65, for passing the pulse 64 to produce a strobe pulse Q*a*1, are the low potential logical inputs $E_1'$ and $E_2'$, shown in FIGS. 3(*n*) and 3(*o*). As stated previously, the output $E_1'$ is at the low logical potential level during an auxiliary memory cycle when the flip-flop E1 is reset to its false state. The low potential level input $E_2'$ to AND gate 65 is provided by flip-flop E2 while the latter is residing in its false state. The flip-flop E2 is in its false state during an operating cycle including a "read transfer" auxiliary memory cycle wherein the word "read out" from the auxiliary memory is stored in the S register as distinguished from an auxiliary memory cycle in which the "read out" is a "destructive read out," i.e., not stored in the S register. The output of the AND gate 65 is shaped, amplified, and inverted by an amplifier 68*a* to produce the strobe pulse Q*a*1 which is coupled to the sense amplifiers S*a*1–12 and S*a*19 to gate their output. Additional AND gates 66 and 67 in the gating circuits 60 pass the pulse 64 to produce the strobe pulse Q*a*2 when the index registers 15, or the jump registers 16, or a temporary storage 19 are being addressed, requiring additional flip-flops S13–18 to store the output.

The enabling inputs required to pass the pulse 64 through AND gates 66 and 67 are inputs $A_4'$ and $A_7'$, respectively. Inputs $A_4'$ and $A_7'$ are the low potential level logical outputs of the respective flip-flops A4 and A7 which indicate that a cell in the index registers 15 or the jump registers 16 is being addressed. Since the word length of a cell in the index or jump registers 15, 16 is eighteen bits plus a parity check bit, nineteen flip-flops in the S register are required to store the nineteen bits "read out" of the auxiliary memory and the outputs of sense amplifiers S*a*13–18 are strobed by strobe pulse Q*a*2 to store the latter six bit portion of the word in flip-flops S13–18 of the S register.

The flip-flop G4, controlling the read current source 94, shown in FIG. 5 terminates the timing signal $G_4$ to interrupt the current supplied to a selected pair of read current drivers for the addressed cell in the respective groups 92 and 93, 3.2 microseconds after the beginning of the operating cycle which is .3 microsecond prior to the logical clock $C_L$ (FIG. 3(*k*)). The timing pulse P5 is coupled from tap *t*5 to the reset input $_0g_4$ to reset flip-flop G4, terminating the timing signal $G_4$ (FIG. 3(*h*)).

After the performance of the logic, all flip-flops affected thereby are set by the logical clock pulse $C_L$. An adequate time interval in the operating cycle, beginning with the strobe pulses Q*a*2 and Q*a*1 occurring 1.8 microseconds after the initiation of the operating cycle and ending at the logical clock pulse $C_L$ which is a total time duration of 1.7 microseconds, is allowed for the performance of the logical and arithmetic operations in the arithmetic unit 11. The logical clock pulse $C_L$ is produced in response to the timing pulse P6 which is derived from the delay line at the tap *t*6. The timing pulse P6 is coupled to an amplifier-shaper circuit 69 where it is amplified and shaped to produce the logical clock pulse $C_L$, shown in FIG. 3(*k*).

Figure 7A:
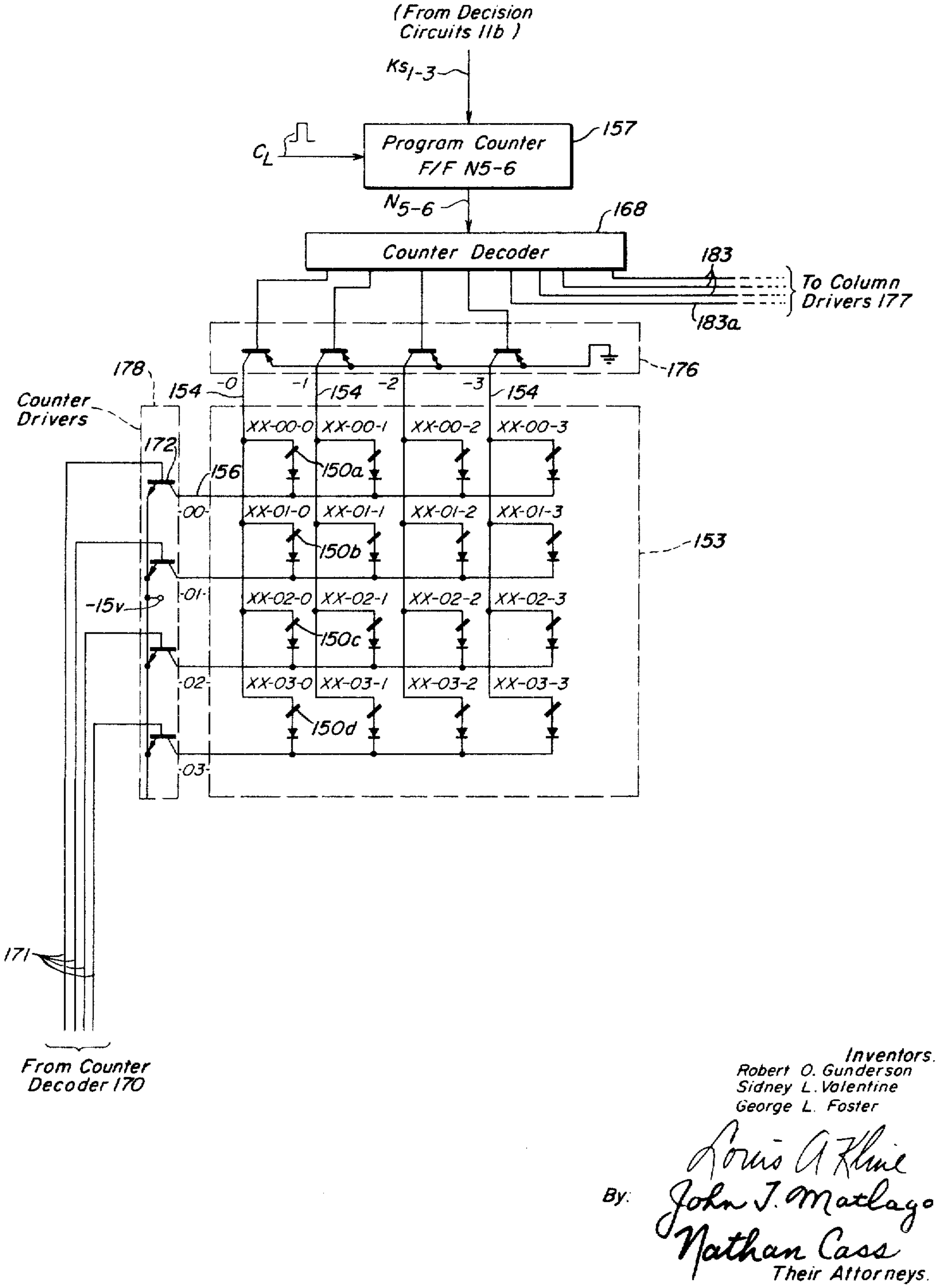
Figure 7B:
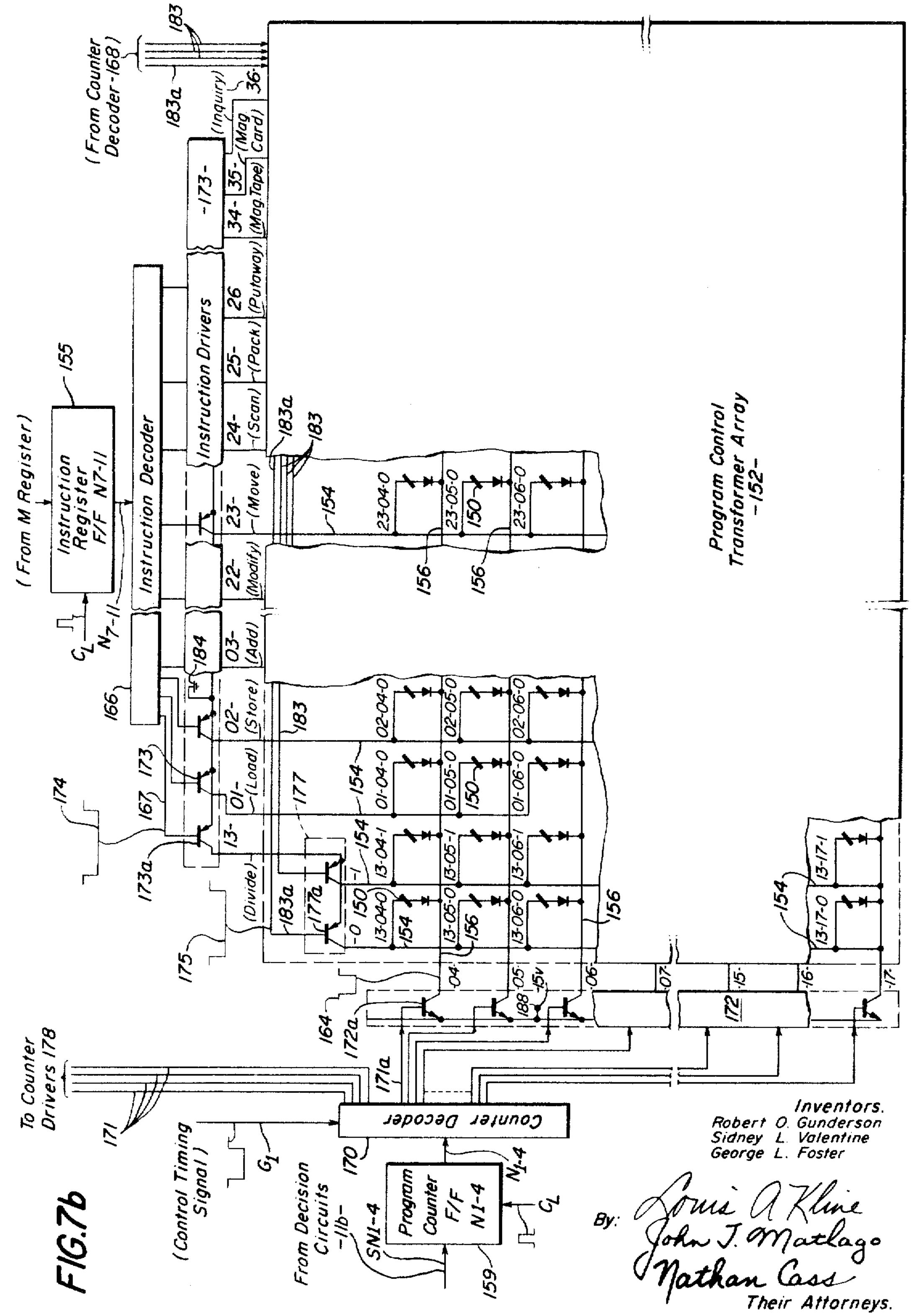

The timing pulse P6 is also coupled to reset inputs $_0g_1$ and $_0g_3$ of the flip-flops G1 and G3, respectively. Resetting of the flip-flop G1 terminates the timing signal $G_1$ coupled to the program counter decoder 170 (FIG. 7*b*). Resetting of the flip-flop G3 terminates the timing signal G3 supplied to the address decoders 90 and 91.

It will be noted that the duration of the timing signal $G_1$ extends to the logical clock pulse $C_L$ to provide a program control signal X—— on selected sense lines 180 (FIG. 8) connected to the logical networks. In the program control system shown in FIGS. 7*a*, 7*b*, and 8, the inherent time delay of approximately .2 microsecond of program control signals produced on sense lines 180 assures an overlap of program control signals and the leading edge of the logical clock pulse $C_L$. As a result, the outputs of the logical networks, which are dependent upon the presence of the control signal, will be present at logical inputs of flip-flops coupled to the selected networks when the leading edge of the logical clock pulse $C_L$ appears at the clock inputs of the flip-flops. As will be apparent from the description of the flip-flop circuits in FIG. 10, flip-flops are set according to the respective logical inputs at the leading edge of the logical clock pulse $C_L$ applied to the clock inputs of the flip-flops. The delay of the program control signals is illustrated in the timing diagram shown in FIGS. 9(*c*), 9(*d*), and 9(*f*) wherein the time delay, approximately .2 microsecond, of a typical program control signal produced in response to the drive pulse 164 and the timing signal $G_1$, is clearly indicated. It will be noted that as a result of the time delay the low potential portion of the program control signal, control pulse 189 remains low during the occurrence of the leading edge of logical clock pulse $C_L$. A detailed discussion of the operation of the program control system is presented in the description of FIGS. 7*a*, 7*b*, 8, and 9, infra.

The decoders 90 and 91 of the auxiliary memory 13 (FIG. 5) are constructed and arranged to provide output signals in response to the timing signal $G_3$ applied thereto, which enable a predetermined pair of read drivers, one in each of the groups 92 and 93, to select the addressed cell in the auxiliary memory. At the logical clock pulse $C_L$, the timing signal $G_3$ is removed and decoders 90 and 91 automatically, and without the need of retaining the settings of the A register, enable a predetermined pair of write drivers, one in each of the groups 101 and 102 coupled to the memory cores, in order to permit writing into the cell at the same address during the write time interval.

After all flip-flops affected by the logical clock $C_L$ have been set in accordance with the logical and arithmetic operations performed in the operating cycle, e.g., addition, subtraction, etc., the information, if any, in the S register is written into an addressed cell in the auxiliary memory which address is the same as the address of the word "read out" because of the action of decoders 90 and 91 described in the previous paragraph. The operations associated with the "writing" into an addressed cell in the auxiliary memory 13 comprise supplying of write enable current and write current to cores in the addressed cell of the auxiliary memory 13. The write enable current is initiated prior to the write current and a one microsecond time interval has been provided between the start of timing signals $G_5$ and $G_6$ to permit the write enable current to build up to the proper current level before the write current is initiated. Consequently, the write enable current timing signal $G_5$ is initiated by the timing pulse P6. The timing pulse P6 is coupled to the set input $_1g_5$ to set the flip-flop G5 to produce the timing signal $G_5$ shown in FIG. 3(*l*) which is coupled to the write enable drivers 98 (FIG. 5) to initiate write enable current in the auxiliary memory 13.

The timing flip-flop G6 controlling the write current timing is set by the timing pulse P7 which is derived from the delay line section 48, 4.5 microseconds after the start of the operating cycle, at the tap *t*7. The timing pulse P7 which is coupled to the set input $_1g_6$ sets the flip-flop G6 in its true state to provide a timing signal $G_6$ (FIG. 3(*m*)). The timing signal $G_6$ is coupled to a write current source 100 (FIG. 5) to control the supply of current write drivers in groups 101 and 102 whereby write drivers selected by the output of decoders 90 and 91 supply write current during the write current time interval or the write time interval to the cores in the addressed cell in the auxiliary memory array for "writing" the word stored in the S register into the cell during the write time interval.

Both timing flip-flops G5 and G6 are reset by the timing pulse P8. The reset inputs $_0g_5$ and $_0g_6$ are connected to a tap *t*8 located at the end of the delay line section 49 which is the end of the six microsecond operating cycle. Upon resetting the timing flip-flops G5 and G6 at the end of the operating cycle, the write enable drivers 98 and the write current source 100 are turned off to terminate the write enable and write currents supplied to the addressed cell in the auxiliary memory 13.

The foregoing describes the timing control of a complete operating cycle in the processor. In the event an operating cycle does not include an auxiliary memory cycle, the outputs of flip-flops G3, G4, G5, and G6 would not be gated to the respective control points by respective AND gates shown schematically in FIG. 1 by a single AND gate 59 requiring a true signal output $G_2$ from the flip-flop G2. Further, the strobe pulses Q*a*1 and Q*a*2 would not be generated since both of the required enabling signal inputs $E_1'$, $E_2'$ to the AND gates 65 to 67, would not be present to gate the pulse 64. Therefore, the only timing flip-flop effective during an operating cycle, which does not include an auxiliary memory cycle, is flop-flop G1 which supplies the timing signal $G_1$ to the program counter decoder 170 (FIGS. 7*a* and 7*b*). Each and every operating cycle irrespective of the inclusion of an auxiliary memory cycle also provides a logical clock pulse $G_L$ for setting the flip-flops in accordance with the logic performed during the operating cycle.

*Main memory timing control*

In considering the timing control circuits 24, 26, 28, and 30 for the main memory units #0 to #3 (FIG. 1) during a typical operating cycle, it will be assumed that #0 of the main memory is selected by the address in the L register wherein the state of the flip-flops L17 and L18 provides inputs $L_{17}'$ and $L_8'$ to the AND gate 34 of the main memory decoder 12, and a main memory cycle as included in the operating cycle under consideration, as indicated by the false state of flip-flop F1 providing an input $F_1'$ to the AND gate 34. Since timing control circuits 24, 26, 28, and 30 are identical, a description of the operation of control circuit 24 for unit #0, as shown in FIG. 2, will provide a complete understanding of the other timing control circuits for units #1, #2, and #3. In the presence of the low level logical potential inputs $F_1'$, $L_{17}'$, $L_{18}'$ to gate 34, a clock pulse C which has been inverted, shaped, and amplified in amplifier 43 is passed through the AND gate 34 and the output of the AND gate 34 is coupled to an amplifier-shaper 72 to produce a clock pulse C*m* (FIG. 4(*a*)) which is supplied to the main memory delay line 42. The clock pulse C*m* porduces timing pulses P*m*0, P*m*1, P*m*3, P*m*4, P*m*5, P*m*6, P*m*7, and P*m*8 shown in FIG. 4(*b*) as the clock pulse C*m* passes through delay line 42. It should be noted that reference to the signal waveforms in FIG. 4 will be made throughout the following description of the timing control circuit 24.

Prior to considering the detailed operation of the timing control circuit 24, a comparison of its operation with the timing control circuit 22 would be helpful in providing a more complete understanding of the overall operation of the timing control system and the operation of control circuit 24. The timing of the "read" and "write" operations in the main memory is the same as the timing of the "read" and "write" operations in the auxiliary memory, therefore the timing signals produced by the timing flip-flops R1, R2, W1, and W2 will be the same as the timing signals produced by the flip-flops G4, G3, G6, and G5, respectively.

It will be noted further that the strobe pulse Q*m* is formed at the same time in an operating cycle as the strobe pulses Q*a*1 and Q*a*2 are formed. In considering the differences in the timing control circuits 22 and 24, it will be noted that the gating of the clock C to the delay line 42 for the main memory unit #0 eliminates the need of a flip-flop such as flip-flop G2 required in the timing control circuit 22 to indicate an auxiliary memory cycle. The timing control circuit 24 and identical timing control circuits 26, 28, and 30 do not require a timing flip-flop for controlling the generation of timing signals in the program control system since only one such program control timing signal, i.e., flip-flop output $G_1$ is required during each operating cycle and this timing signal $G_1$ is provided by the flip-flop G1. Also, there is no need for generating a logical clock pulse $C_L$ in the timing control circuits 24, 26, 28, and 30 as this pulse is generated by the timing control circuit 22.

A portion of an address for the main memory is directed to the enable circuitry individual to each of the main memory units #0–#3 and a timing flip-flop, e.g., flip-flop R3 for main memory unit #0, is required in each main memory timing control circuit 24, 26, 28, and 30 for controlling the timing of enable logic decoders, e.g., an enable logic decoder 110 which decodes the output of flip-flops L5 and L9 in the L register, shown in FIG. 6.

Referring to the timing control circuit 24, the timing flip-flop R3, supplying a timing signal $R_3$ (FIG. 4(d)) to the decoder 110, is set by the timing pulse P*m*0. The timing pulse P*m*0 is derived from delay line 80 at tap *tm*0 and is coupled to the set input $_1r_3$. The output $R_3$ provides a low logical potential level timing signal which is coupled to the enable logic decoder 110 shown in FIG. 6. The output of the decoder 110 is fed to enable drivers 112 to selectively produce enable currents in an addressed cell in the memory core array 114 as described more fully, infra, in a detailed description of FIG. 6.

The next operation in an operating cycle including a main memory cycle is the decoding of the output from flip-flops L1–4 and L6–8 and L10–16, the portion of the address coupled to decoders 116 and 117 in the main memory unit #0 illustrated in FIG. 6. The timing flip-flop R2 produces a timing signal $R_2$ (FIG. 4(*e*)) which controls the timing of the decoders 116 and 117. A tap *tm*1 is coupled to the set input $_1r_2$ to supply a timing pulse P*m*1 to the flip-flop R2, .8 microsecond after the beginning of an operating cycle. The time interval of 1.2 microseconds between timing signals $R_3$ and $R_1$ and the time interval of .4 microsecond between the timing signals $R_2$ and $R_1$ are adequate time periods for the decoders 110 and 116 and 117, respectively, to provide a completely decoded address of the selected storage cell in the main memory unit #0 before read current is applied to the cores in the memory core array 114.

In the next opertaion of an operating cycle, read current is supplied to the cores in the memory core array 114 at the addressed main memory cell in unit #0 and the control of the timing of the read current source 118 (FIG. 6) is provided by the timing signal $R_1$ (FIG. 4(*f*)) produced by the flip-flop R1 having a set input $_1r_1$ connected to the tap *tm*3. The tap *tm*3 is located on section 81 of the delay line 42 to produce a timing pulse P*m*3 occuring 1.2 microseconds after the beginning of an operating cycle. The timing pulse P*m*3 is coupled to the set input $_1r_1$ to set timing flip-flop R1 into its true state initiating the timing signal $R_1$.

The next timing pulse derived from the delay line 42, timing pulse P*m*4, is coupled to the strobe pulse forming circuit 70. The timing pulse P*m*4 occurs 1.8 microseconds after the beginning of the operating cycle. The circuit 70 is coupled to the tap *tm*4 and the timing pulse P*m*4 is inverted, amplified, and shaped in amplifier 74 and coupled to AND gate 71 having an enabling signal input $F_2'$. During a "read transfer" main memory cycle, the enabling signal from the output $F_2'$ is coupled to the AND gate 71 to pass the inverted timing pulse P*m*4. The output of the gate 71 is inverted and shaped during amplification in amplifier 75 to produce the strobe pulse Q*m*. The strobe pulse Q*m* (FIG. 4(*g*)) is coupled to sense amplifiers S*am*1–13 (FIG. 6) for the main memory unit #0 to pass the output of the sense amplifiers to the set inputs of flip-flops M1–13 in the M register.

The timing flip-flop R1 is reset by a timing pulse P*m*5 derived from the delay line section 83 at tap *tm*5. The timing pulse P*m*5 resets flip-flop R1 to terminate the read current timing signal $R_1$, 3.2 microseconds after the beginning of the operating cycle, whereby a two microsecond time interval is provided for supplying read current to an addressed cell in the core array 114 of main memory unit #0. The timing of signal $R_1$ which is coupled to the read current source 118, terminates the supply of read current to a pair of read drivers in groups 120 and 121 and read current to the cores in the addressed cell in memory units #0.

The reset inputs $_0r_2$ and $_0r_3$ of the flip-flops R2 and R3, respectively, are coupled to the delay line section 83 at the tap *tm*6 to be reset by the timing pulse P*m*6 to terminate timing signals $R_2$ and $R_3$, 3.5 microseconds after the beginning of an operating cycle as shown in FIG. 4(*e*) and 4(*d*), respectively.

The tap *tm*6 is also connected to a set input $_1w_2$ of the flip-flop W2 to initiate timing signal $W_2$ (FIG. 4(*h*)) which is coupled to the enable logic decoder 110. The timing signal $W_2$ precedes the write current timing signal $W_1$ shown in FIG. 4(*i*) to provide an adequate time interval for the output of decoder 110 to reach the proper level before write current is supplied to cores of the addressed cell in the main memory unit #0.

The flip-flop W1 for timing the write currents is set by the timing pulse P*m*7 derived from delay line section 84 at the tap *tm*7. The tap *tm*7 is located on delay line section 84 to obtain a timing pulse P*m*7, 4.5 microseconds after the beginning of the operating cycle. The timing pulse P*m*7 is coupled to the set input $_1w_1$ to set the flip-flop W1 in its true state initiating the low potential level timing signal $W_1$ for controlling a write current source 122 (FIG. 6) supplying current to a pair of write drivers in groups 124 and 125 controlling the write current to main memory cores in an addressed cell.

Both flip-flops W1 and W2 controlling the write current source 122 and enable decoder 110, respectively, in the main memory unit #0 are reset by the timing pulse P*m*8. The timing pulse P*m*8 is coupled to the reset inputs $_0w_1$ and $_0w_2$ from the delay line tap *tm*8, which tap is located on the end of delay line section 85. Resetting of flip-flops W1 and W2 terminates the timing signals $W_1$ and $W_2$ to discontinue write current and write enable current supplied to cores in the addressed cell in the main memory unit #0, thereby completing the operations in an operating cycle. The timing pulse P*m*8 occurs at the end of the typical operating cycle selected for description which is six microseconds after the beginning of the typical operating cycle.

The circuits and operation of timing control circuits 26, 28, and 30 are identical to the circuit and operation of timing control circuit 24 described supra. Detailed descriptions and showings have not been set forth therefor and reference is made to timing control circuit 24 for the description of timing control circuits 26, 28, and 30 and control of the timing of units #1, #2, and #3 of the main memory.

From the foregoing description, it is obvious the various .1 microsecond positions on the delay lines are capable of being tapped as required for providing the desired timing signals. It should now be readily apparent that adjustment of the timing of operations or functions in the operating cycle is easily facilitated and the timing control system is made flexible by the availability of timing signals at .1 microsecond time intervals. Thus, the timing of operations in the operating cycle may be adjusted, if necessary, e.g., to vary the timing of the "read" or "write" operations in the operating cycle, to accommodate circuits having higher or lower speeds or introducing additional circuits having an inherent delay, such as the amplifier-shaper circuits 41.

The delay line provides a dynamic timing source and obviates the need for pulse, digit, or other counters for providing timing signals since the timing signals can be derived directly from the delay line to which a clock pulse is supplied at the beginning of every operating cycle, e.g., every six microseconds for the computer at its own operating rate.

*Auxiliary memory*

In the foregoing description of FIG. 1, the operation of the auxiliary memory 13 in the overall system of the aforementioned copending patent application was generally described. From this description it will be apparent that the auxiliary memory 13 of FIG. 1 could be provided in a variety of forms in accordance with present knowledge in the art. A preferred form of such an auxiliary memory is illustrated in FIG. 5 and will be described in some detail.

Figure 5A:
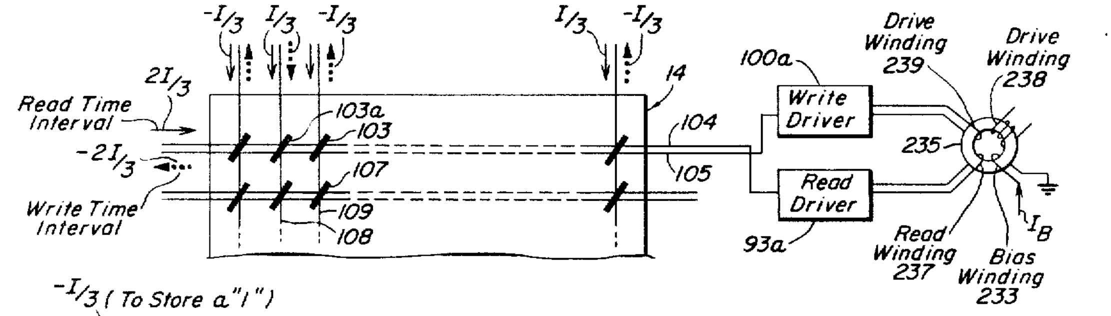

Referring to FIG. 5, the storage means of the auxiliary memory 13 is a magnetic memory core array 14 having a plurality of bistable ferrite cores arranged in rows and columns, as illustrated by the detailed portion of the array 14 schematically shown in FIG. 5*a*, typical cores being indicated by the numerals 103, **103*a*, and 107. The specific memory array 14** illustrated in FIGS. 5 and 5*a* may have eighty rows of cores, each row containing nineteen cores representing the nineteen bits in a register, one of each of these nineteen bits being conveniently employed as a parity check bit. Since each row comprises a register capable of storing nineteen bits, the array 14 has a total capacity of eighty, nineteen bit capacity registers corresponding to the eighty rows in the array 14.

As indicated in FIG. 5, the eighty rows in the array 14 may conveniently be divided into various functional sections designating the functions of the registers comprising the particular rows in the array 14. For example, thirty-two rows may serve as index registers 15, another thirty-two rows may serve as pump registers 16, eight rows may serve as temporary storage registers 19, and the remaining eight rows may serve as an accumulator 17. The functional separation of these rows in the array 14 into sections 15, 16, 17, and 19 may be disregarded for the purposes of the present description of the operation of the auxiliary memory 13, since without considering the setting of the flip-flops in the A register, the selection of a particular register in the array is not dependent upon which section is involved, and will be essentially the same for all rows, regardless of section.

Briefly, the operation of the auxiliary memory 13 of FIG. 5 is such that only one of the eighty rows is accessed at any one time. During the read time interval, the register corresponding to a selected row is "read out" and the information or data is stored in the S register having nineteen flip-flops S1-19 corresponding to the nineteen bits in the selected register. Then, during the write time interval which occurs after the read time interval, either the same data, or new data, is "written back" into the same row in the array 14, in accordance with the settings of the S register flip-flops S1–19. As described in connection with FIG. 2, flip-flops S1–19 are cleared at the beginning of the memory cycle by clear pulses R*s*1 and R*s*2, and may be changed at the logical clock $C_L$ by logical signals coupled to logical inputs *s*S1–12 and *s*S13–18 to correspond to any new data to be stored in the particular row of cores in array 14. The specific manner in which the data in a register corresponding to a selected row in the array is "read out" and "written back" into during respective read and write time intervals is described below.

Referring to FIG. 5*a*, a typical read line 104 and a typical write line 105 pass through the row containing cores **103*a* and 103, the cores in every other row in the array 14 having similar read and write drive lines passing therethrough. Also, each of the nineteen columns of cores in the array 14 has an enable line passing therethrough, such as typically illustrated by enable lines 108 and 109, each column representing a particular bit of the data on each row. Each of the nineteen enable lines is fed by a bias current of I/3 from a respective one of nineteen enable drivers 98 (FIG. 5), as illustrated by the solid line arrows adjacent the enable lines in FIG. 5a, the current I representing full select read current required to "read out" from a core (the current —I thereby representing full select write current). Thus, the enable drivers 98 provide a bias current of I/3, or I/3 read select current, to all the cores in the array 14**.

"Reading out" and "writing into" the cores of a selected row of the array, corresponding to the desired nineteen bit register to be accessed, will now be understood with reference to FIGS. 5 and 5a. The solid line arrows in FIG. 5a designate the current flowing in the enable lines and the selected read line 104 during the read time interval, and the dotted lines arrows designate the current flowing in the enable lines and the selected write line 105 during the write time interval, it being assumed that the nineteen cores in the row containing cores 103a and 103 correspond to the nineteen bits of data which are to be "read out" and "written into" during a memory cycle.

Considering the read time interval first, "read out" is accomplished by causing a current of 2I/3, or 2/3 read select current, to flow in the read line of the row corresponding to the desired register, as indicated by the solid arrow adjacent read line 104 in FIG. 5a, the read lines of all other rows receiving no current. Since each of the cores in the selected row already has a bias current of I/3 flowing therein (as do all the other cores in the array as described previously and indicated by the solid line arrows adjacent each enable line) the nineteen cores in the selected row will thereby receive full read select current, or I, to permit "read out" therefrom (2I/3 row current plus I/3 column current). All other cores in unselected rows of the array 14 are affected only by the bias of I/3, or I/3 read select current, and will thereby remain relatively undisturbed. Thus, it will be seen that "read out" is obtained from the cores of the selected register while achieving the desirable high selection ratio of 3 to 1 between currents applied to selected and unselected cores in the array.

The row containing the desired nineteen bits of data which are to be "read out" is selected by means of decoders 90 and 91 (FIG. 5), operating in response to the decoder timing signal $G_3$ and in accordance with the outputs $A_{1-4}$ and $A_{5-7}$ of A (address) register flip-flops A1–7, respectively applied thereto, to activate a respective one of a first group of ten read drivers 92 and a respective one of a second group of eight read drivers 93. These two groups of read drivers 92 and 93 are constructed and arranged for linear selection of a particular one of the eighty read lines in the array 14. The group of read drivers 93 may, for example, select one of eight groups, each group comprising ten rows of cores; and the group of read drivers 92 selects one of the rows in the group selected by the read drivers 93 to complete the linear selection. Thus, during the read time interval, when a read current source 94 is energized by the timing signal $G_4$ applied thereto as shown in FIG. 5, a current of 2I/3, or 2/3 read select current is caused to flow from the rear current source 94 to the read line 104 of the selected row by way of a selected pair of read drivers which were activated by decoders 90 and 91, in accordance with the outputs of A register flip-flops A1–7. The timing signal $G_4$ applied to the read current source 94 is delayed with respect to the decoder timing pulse $G_3$ in order to permit sufficient time for the selected pair of read drivers to be activated by decoders 90 and 91, since as mentioned previously, decoders 90 and 91 each include a decoder core matrix for decoding which requires a finite time to complete the decoding operation.

The bit stored in each of the cores of the selected row (corresponding to the selected word) is sensed by one of nineteen sense lines respectively provided for each column in the array, an induced pulse in a sense line indicating the storage of a "1" in the core of the selected row through which that sense line passes, and the absence of an induced pulse indicating the storage of a "0" therein. The sense lines are not shown in FIG. 5a in order to avoid confusion in the drawings, but may be provided in any of a number of well-known ways.

As shown in FIG. 5, the nineteen sense lines are coupled to respective ones of nineteen sense amplifiers Sa1–19, which are in turn fed to respective ones of nineteen S register flip-flops S1–19. The amplified pulses on the sense lines represent the bits which were previously stored in selected (accessed) registers and "read out" of the array 14 and are to be stored in corresponding flip-flops of the S register.

Strobe pulses Qa1 and Qa2, fed to sense amplifiers Sa1–12, 19 and Sa13–18, respectively, are provided so that the sense amplifiers become operable only during the portion of the read time interval when the pulses induced in the sense lines are expected, thereby preventing unwanted pulses (which may occur on the sense lines at other times) from interfering with the operation of the sense amplifiers or the S register flip-flops coupled thereto. Two strobe pulses Qa1 and Qa2 are provided to permit either all the sense amplifiers to be operated, or only just sense amplifiers Sa1–12, 19. This choice is provided because the accumulator section 17 of the array 14 may typically comprise only thirteen bits on each of the thirty-two rows corresponding thereto, instead of nineteen bits. In such a case, the outputs of sense amplifiers Sa13–18 are unnecessary, and consequently are conveniently prevented from operating by omitting strobe pulse Qa2 when one of the accumulator rows in the array 14 is selected and "read out" into the S register.

Since a magnetic core memory array, such as array 14 in FIG. 5 is inherently of the destructive type, the cores of the selected register will all be in the same state after a "read out" therefrom (which in accordance with conventional practice would be the "0" state). Thus, if the data read out of the selected row of cores in the array 14 is not to be lost, it must be "written back" into the cores of the selected row, or alternatively, new data may be desired to be "written back" into the selected row in response to some operation of the computer.

In the auxiliary memory 13 of FIG. 5, the settings of the S register flip-flops, S1–19, are employed to determine the data which is to be "written back" into the selected row during the write time interval. Upon the appearance of the logical clock $C_L$, the settings of these S register flip-flops are retained if the same data is to be "written back" into the cores of the selected row or, alternatively, are changed by logical signals coupled to the logical inputs sS1–12 and sS13–18 to correspond to any other data which is to be "written back" into the selected row during the write time interval. S register flip-flop S19 corresponds to the parity check bit and its setting is controlled by well-known parity bit generator circuitry in a conventional manner.

As generally indicated in FIG. 5, the outputs $S_{1-19}$ of S register flip-flops S1–19 are fed to respective ones of the nineteen enable drivers 98 which, as described previously, are constructed and arranged to provide a bias of I/3, or 1/3 read select current, to the cores in each of the nineteen columns of the array 14, as illustrated by the solid arrows adjacent the enable lines (such as 108 and 109) in FIG. 5a. The nineteen enable drivers 98 are further constructed and arranged so that, at the appearance of the timing signal $G_5$, a short time after the appearance of the logical clock $C_L$, each enable driver which has a "1" applied thereto from its respective S register flip-flop is caused to provide a current of —I/3, or 1/3 write select current, to its respective enable line (as illustrated by the dotted arrow adjacent enable line 109 in FIG. 5a); on the other hand, each enable driver which has a "0" applied thereto from its respective S register flip-flops remains unchanged and continues to provide the bias current of I/3, or 1/3 read select current, to its respective enable line (as illustrated by the dotted arrow adjacent enable line 108 in FIG. 5a). Thus, at the appearance of the timing signal $G_5$, those cores in columns corresponding to the bit of the selected register in which a "1" is to be "written" (such as core 103 and the first and last cores of the same row illustrated in FIG. 5*a*) will have a current of —I/3, or 1/3 write select current, applied thereto, while those cores in which a "0" is to be "written" (such as core 103*a* in FIG. 5*a*) will remain with a bias current of I/3, or 1/3 read select bias current applied thereto, as illustrated by the dotted arrows in FIG. 5*a*.

Then, at the appearance of a timing signal $G_6$, occurring after the timing signal $G_5$, the bits are "written" into the cores of the same row which was "read out" during the read time interval by causing a current of —2I/3, or 2/3 write select current, to flow in the selected row as indicated by the dotted arrow adjacent write line 105 in FIG. 5*a*, the write lines of all other rows in the array 14 receiving no current.

As a result of the application of the current of —2I/3 to write line 105, each core in the selected row having a current of —I/3, or 1/3 write select current, flowing in its enable line (such as core 103) will receive a current of —I, or full write select current (—2I/3 row current plus —I/3 column current) to switch the core from the "0" state, in which it remained after "read out" to the "1" state, thereby storing a "1" therein. On the other hand, each core in the selected row having a current of I/3, or 1/3 read select current, flowing in its enable line (such as core 103*a*) will receive a net current of only —I/3, or 1/3 write select current (—2I/3 row current plus I/3 column current), which causes the core to remain in the "0" state in which it was left after "read out," thereby "storing" a "0" therein. All other cores in the array on unselected rows receive no other current except the current of I/3 or —I/3 flowing in their respective enable lines. Thus, unselected cores again remain essentially undisturbed during the write time interval as they did during the read time interval, and again the high ratio of three-to-one is achieved between the currents applied to selected and unselected cores in the array.

In a manner similar to that occurring during the read time interval, the desired row is selected during the write time interval by decoders 90 and 91 activating a respective one of a first group of ten write drivers 101 and a respective one of a second group of eight write drivers 102. Like the two groups of read drivers 92 and 93, these two groups of write drivers 101 and 102 are constructed and arranged for linear selection of a particular one of the eighty write lines in the array 14. Thus, during the write time interval, when a write current source 100 is energized by the timing signals $G_6$ applied thereto as shown in FIG. 5, a current of —2I/3, or 2/3 write select current, is caused to flow from the write current source 100 to the write line 105 of the selected row by way of the write drivers activated by decoders 90 and 91.

As was pointed out in connection with the above description of the auxiliary memory 13 of FIG. 5, the mode of operation employed is such that a ratio of three-to-one is achieved between currents applied to selected and unselected cores during both reading and writing operations, as compared to a ratio of only two-to-one in the well-known coincident-current mode. This three-to-one ratio is highly desirable and makes it possible to greatly reduce the tolerances on the cores used in the array as well as the criticality of operation of the external drive circuitry. In addition, greater reliability of operation is obtained in varying temperature environments, since changes in core characteristics with temperature will have much less of an effect on operational reliability.

With regard to decoders 90 and 91, it will be remembered that each includes a decoding matrix for activating the read and write drivers so that, despite any A register changes occurring after the read time interval, the row selected by decoders 90 and 91 during the write time interval will be the same row as selected during the read time interval, thereby permitting the A register to be set to a new address at the logical clock pulse. The manner in which this is accomplished will now be explained for decoder 91, and it is to be understood that decoder 90 may be similarly constructed and arranged, as may main memory decoders 116 and 117 of FIG. 6, these latter decoders being discussed in the main memory description following this description of the auxiliary memory.

FIG. 5*a* shows a typical decoder core 235 of the eight decoder cores making up the decoding matrix of decoder 91. As is the case for all of the eight decoder cores in the decoding matrix of decoder 91, the typical decoder core 235 in FIG. 5*a* has a square loop hysteresis characteristic and is caused to rest in one of its two saturated magnetic states by means of a bias current $I_B$ applied to a bias winding 233 provided on the core 235. Decoder core 235 is also provided with oppositely poled read and write windings 237 and 239 which are fed to those read and write drivers 93*a* and 100*a* which are coupled to read and write lines 104 and 105 of the same row. It will be evident, therefore, that each decoder core controls the activation of one read driver and one write driver, both of which drivers are in turn coupled to read and write drive lines of the same row.

Figure 5B:
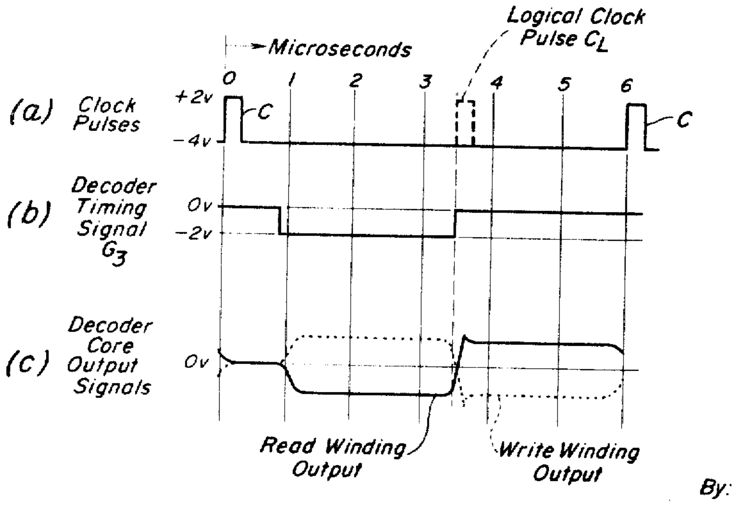

Thus, referring to the timing diagram of FIG. 5*b* (located on the same sheet of drawing as FIG. 9) along with FIG. 5*a*, it will be understood that if the row containing read and write lines 104 and 105 is to be selected as previously assumed then, when the decoder timing signal $G_3$ (graph (*b*) of FIG. 5*b*) applied to decoders 90 and 91 falls to —2 volts at about 0.9 microsecond, A register outputs $A_{5-7}$ (by means of conventional circuitry employed in decoder 91) will cause a drive pulse to be applied to drive winding 238 of decoder core 235 to partially switch the core by the time the logical clock pulse $C_L$ appears. All other decoder cores in decoder core 235 corresponding to other rows in the array will remain unenergized. As a result of this partial switching of decoder core 235, a voltage of negative polarity is induced in the read winding 237, as shown by the solid line curve in graph (*c*) of FIG. 5*b*, and a voltage of positive polarity is induced in the oppositely poled write winding 239, as shown by the dotted line curve in graph (*c*) of FIG. 5*b*. Read and write drivers 93*a* and 100*a*, like all other read and write drivers, are constructed and arranged to be activated only by a voltage of negative polarity. Thus, during the read time interval, only read drivers 93*a* will be activated by the negative voltage induced in read winding 237 to complete selection of read line 104, while write driver 100*a* will remain unactivated because of the positive voltage in write winding 239.

When the decoder timing pulse $G_3$ returns to zero volts at the logical clock pulse $C_L$, as shown in FIG. 5*a*, the drive current applied to drive winding 238 will be removed and the decoder core 235 will automatically be returned by bias current $I_B$ to its initial state, causing voltages of opposite polarity to be induced in read and write windings 237 and 239 during the read time interval, as shown in graph (*c*) of FIG. 5*b*. Thus, write driver 100*a* is now activated during the write time interval complete selection of write drive line 105, while read drivers 93*a* remain unactivated.

It should now be evident that the only decoder core which can induce voltage signals in its read and write windings during the write time interval is the decoder core 235 which is partially switched during the read time interval and which is returned to its initial state during the write time interval, all other decoder cores in decoder 91 remaining in their biased state throughout both read and write time intervals. Thus, the A register settings are not needed to write back into the same address of the auxiliary memory 13 and may be changed to a new address at the logical clock pulse $C_L$.

*Main memory*

As was the case for the auxiliary memory 13 just described various types of data storage arrangements may be employed for the main memory units #0–#3 illustrated in FIG. 1. A particularly desirable embodiment which may be employed for each of the main memory units #0, #1, #2 and #3 is illustrated in FIGS. 6 and 6*a*. While FIGS. 6 and 6*a* are specifically directed to an embodiment of the main memory unit #0 of FIG. 1, it will be understood that the other three main memory units may be similarly constructed.

Referring to FIGS. 6 and 6*a*, the storage means of the main memory unit #0 is a magnetic memory core array 114 having a plurality of bistable ferrite cores arranged in rows and columns. Typically, the array 114 may have 130,000 cores arranged in 2,500 rows and fifty-two columns, each row having fifty-two cores representing four groups of thirteen bits in which twelve bits of a group is a word and one bit serving as a parity check digit. Since each of the 2,500 rows is capable of storing four words, the array 114 has a total capacity of 10,000 words.

The array 114 may conveniently be considered as being divided into four sections, I, II, III, and IV representing the four words on each row, each section including correspondingly positioned cores representing the same word on each row. For example, section I includes those cores representing the first word of each row in the array, section II includes those cores representing the second word of each row, section III includes those cores representing the third word of each row, and section IV includes those cores representing the fourth word of each row. In the two typical rows shown in FIG. 6*a*, only the core corresponding to the first bit of each word is shown. Thus, cores 126 and 146 in FIG. 6*a* each correspond to the first bit of the first word of its respective row, cores 127 and 147 each correspond to the first bit of the second word of its respective row, cores 128 and 148 each correspond to the first bit of the third word of its respective row, and cores 129 and 149 each correspond to the first bit of the fourth word of its respective row.

Similar to the array 14 of the auxiliary memory 13 illustrated in FIGS. 5 and 5*a*, each of the 2,500 rows in the array 114 has a read line and a write line passing through all the cores in the row, such as read line 134 and write line 135 shown in FIG. 6*a* for the row including cores 126 to 129 inclusive. Also similar to the array 14 of the auxiliary memory 13 of FIGS. 5 and 5*a*, each of the fifty-two columns in the array 114 has an enable line passing through all the cores in the column, such as illustrated by enable lines 136 to 139 inclusive in FIG. 6*a*, the columns being arranged so that the same enable line passes through cores corresponding to the same bit of its respective word. For example, enable line 136 passes through all the cores in the array corresponding to the first bit of the first word of each row.

The operation of the array 114 may now be understood with reference to FIG. 6*a*, the solid line arrows in FIG. 6*a* representing current flowing during the reading operation while the dotted line arrows represent current flowing during the writing operation. For purposes of this description it will be assumed that the word to be accessed in the array 114 is the first word of the row, which includes cores 126 to 129 in FIG. 6*a*. Thus, core 126 which stores the first bit of the first word on this row will be accessed, while cores 127, 128, and 129 which store the first bit of the second, third, and fourth words on the row, as well as the cores on unselected rows, such as cores 146 to 149, will remain relatively undisturbed.

First, considering the read time interval and the solid line arrows in FIG. 6*a*, a current of I/3, or 1/3 read select current, is caused to flow in the thirteen enable lines passing through the thirteen cores of the selected first word plus its parity check bit (such as enable line 136), while a current of —I/3, or 1/3 write select current, is caused to flow in the remaining thirty-nine enable lines passing through the thirty-nine cores of the unselected second, third, and fourth words and parity check bits (such as enable lines 137, 138, and 139). To read out a particular one of the 10,000 words in the array, a current of 2I/3, or 2/3 read select current, is then caused to flow in the read line of the selected row, as indicated by the solid line arrow adjacent read line 134 in FIG. 6*a*, the read lines of all other rows receiving no current. Since each of the cores of the first word in the selected row (such as core 126) has a current of I/3 flowing in its enable line, the additional current of 2I/3 in the read line 134 will provide a resultant current of I, or full select current, in each of the thirteen cores corresponding to the selected word (twelve bit word plus one parity check bit), thereby permitting "read out" therefrom.

However, since each of the cores of the second, third, and fourth words on the selected row (such as cores 127, 128, and 129) has a current of —I/3 in its enable line, the current of 2I/3 flowing in read line 134 causes a resultant current of only I/3 in each such core, thereby leaving the cores of the unselected second, third, and fourth words on the selected row relatively undisturbed. All other cores on unselected rows in the array (such as cores 146 to 149) receive only the enable current of I/3 (cores 147, 148, and 149) or —I/3 (core 146) and will, therefore, also remain relatively undisturbed. Thus, it will be seen that "read out" is obtained only from the cores representing the selected first word on the selected row, while at the same time achieving the desired high selection ratio of three-to-one between currents applied to selected and unselected cores.

In the write time interval, operation of the array 114 is as indicated by the dotted line arrows in FIG. 6*a*. From FIG. 6*a* it will be understood that a current of —I/3 is caused to flow only in the enable lines passing through those cores of the selected first word in which a "1" is to be stored, a current of I/3 being caused to flow in all other enable lines, which include the enable lines passing through cores of the selected first word in which a "0" is to be stored in addition to the enable lines passing through the thirty-nine cores of the unselected second, third, and fourth words on the row, such as cores 127, 128, and 129.

Consequently, when a current of —2I/3, or 2/3 write select current, is passed through the write line of the selected row, as indicated by the dotted line arrow adjacent write line 135 in FIG. 6*a*, only those cores of the selected first word on the selected row in which "1" is to be stored will receive a resultant current of —I, or full select write current, to switch the core from the "0" state in which it was left after "read out" to the "1" state, and thereby store a "1" therein. The other cores of the selected first word of the selected row in which a "0" is to be written receive a resultant current of only —I/3 and thus remain in the "0" state in which they were left after "read out" to thereby store a "0" therein. The remaining thirty-nine cores of the unselected second, third, and fourth words on the selected row (such as cores 127, 128, and 129) also receive a resultant current of only —I/3 which leaves these cores again relatively undisturbed as they remained after the read time interval. Also, all other cores on unselected rows in the array (such as cores 146 to 149) receive only the enable current of I/3 or —I/3 flowing in their respective enable lines and, therefore, like the thirty-nine cores of the unselected second, third, and fourth words of the selected row, again remain relatively undisturbed as they did after the read time interval.

It will thus be evident from the above description that the desirable high ratio of three-to-one is achieved between the currents applied to selected and unselected cores, even though four words are provided on each row instead of only one word as in the mode of operation employed by the auxiliary memory 13 of FIGS. 5 and 5*a*. And, because four words are provided on each row instead of only one word as in the auxiliary memory 13 of FIGS. 5 and 5*a*, only one of 2,500 rows need be selected instead of one of 10,000 as would be required if the system of the auxiliary memory 13 were employed, which is a saving of 75% in row decoder and drive circuitry.

Selection of the desired one of the 2,500 rows in the array 114 of the main memory unit #0 of FIGS. 6 and 6*a* during read and write time intervals is accomplished in the same manner as was described for selection of a particular one of the eighty rows in the array 14 of the auxiliary memory 13 of FIGS. 5*a* and 5*b*. That is, referring to FIG. 6, during the read time interval, decoders 116 and 117 operate in response to the decoder timing signal $R_2$ and in accordance with the outputs $L_{1-4}$, $L_{6-8}$, and $L_{10-16}$ of corresponding L register flip-flops respectively applied thereto, to activate a respective one of a first group of fifty read drivers 120 and a second group of fifty read drivers 121. These two groups of read drivers 120 and 121, in a manner similar to the two groups of read drivers 92 and 93 of the auxiliary memory 13 of FIG. 5, are constructed and arranged for linear selection of a particular one of the 2,500 lines in the array 114. Thus, when a read current source 118 is energized by the read current timing signal $R_1$ applied thereto, as shown in FIG. 6, a current of 2I/3, or 2/3 read select current, is caused to flow from the read current source 118 to the read line of the selected row (read line 134 in FIG. 6*a*) by way of the read drivers which were activated by decoders 116 and 117 in accordance with the outputs $L_{1-4}$, $L_{6-8}$, and $L_{10-16}$ of the L register.

Likewise, during the write timing interval, the desired row is selected by decoders 116 and 117 activating a respective one of a first group of fifty write drivers 124 and a respective one of a second group of fifty write drivers 125, which by linear selection causes a current of —2I/3, or 2/3 write select current to flow from a write current source 122, energized by the write current timing signal $W_1$, to the write line of the selected row (write line 135 in FIG. 6*a*) by way of the activated write drivers. Similar to decoders 90 and 91 of the auxiliary memory 13, decoders 116 and 117 of the main memory unit #0 include decoder core decoding matrices constructed and arranged to operate upon removal of the decoder timing signal $R_2$ (which removal occurs at the logical clock pulse $C_L$) to activate a write driver in each group which will select the same row as did the read drivers activated during the read time interval.

During the read time interval, the selected word in the array 114 whose thirteen cores receive full select read current, or I, is sensed by means of thirteen sense lines provided in the array 114 coupled to respective ones of thirteen sense amplifiers S*am*1–13, which are in turn coupled to respective ones of thirteen M register flip-flops M1–13 to permit the selected word "read out" of the array 114 to be set up in corresponding ones of the M register flip-flops M1–12. The thirteen sense lines are not shown in FIG. 6*a* in order not to confuse the figure, but are constructed and arranged in the array 114 so that each sense line passes through all the cores corresponding to a particular bit of each word. For example, the first sense line passes through the 10,000 cores corresponding to the first fit of each of the 10,000 words in the array 114, the second sense line passes through the 10,000 cores corresponding to the second bit of each of the 10,000 words in the array 114, and so on. Since only the bits of one of the 10,000 words in the array are "read out" or "written" into the array at any one time, a pulse induced in a particular sense line during "read out" and the bit thereby set up in a respective M register flip-flop will correspond only to the particular bit of the selected word, since the similarly positioned bits of other words in the array are essentially undisturbed with only a current of I/3 or —I/3 being applied thereto as described previously.

A strobe pulse $Q_m$ is provided to permit sense amplifiers S*am*1–13 to become operable only during the portion of the read time interval when the pulses induced in the sense lines are expected, thereby preventing unwanted pulses from interfering with the operation of the sense amplifiers S*am*1–13 or the M register flip-flops M1–13 coupled thereto.

A clear pulse R*m* is fed to the M register at the beginning of a memory cycle to permit the M register flip-flops to be cleared in preparation for the setting up therein of the selected word to be "read out" of the array 114. At the logical clock $C_L$, either the settings of the M register flip-flops are retained in order to permit the same word to be "written back" into the array 114, or else, the M register flip-flops M1–13 are changed by signals *s*M1–13 to correspond to any new word and parity check bit which may be desired to be "written" into the selected row in the array 114. M register flip-flop 13 corresponds to the parity check bit and its setting is controlled by well-known parity bit generator circuitry in a conventional manner.

The current of I/3 or —I/3 applied to each of the fifty-two enable lines in the array 114 (such as enable lines 136–139 in FIG. 6*a*) is derived from fifty-two enable drivers divided into four groups of thirteen enable drivers each, as shown in FIG. 6, each group of thirteen enable drivers feeding respective ones of the thirteen enable lines of a respective section of the array 114. As pointed out previously each section includes similarly positioned words of the rows in the array 114. Each of the fifty-two enable drivers is constructed and arranged to provide a current of either I/3 or —I/3 to its respective enable line, depending upon a control signal applied to each enable driver from an enable logic decoder 110, which is in turn controlled by outputs $L_5$ and $L_9$ from the L register, outputs $M_{1-13}$ from the M register, and the enable current timing signals $R_3$ and $W_2$. As described previously, it is the direction of flow of enable current, either I/3 or —I/3, supplied by each enable driver to its respective enable line during "reading" and "writing" which determines which cores are to be "read out" and "written" into during respective read and write time intervals.

The operation of the enable logic decoder 110 in controlling the direction of I/3 select current supplied by each enable driver to its respective enable line is such that the address register outputs $L_5$ and $L_9$ determine which of the four words on the selected row is to be accessed during both read and write time intervals, the enable current timing signals $R_3$ and $W_2$ provide information as to whether the read or write time interval is taking place, and the M register outputs $M_{1-13}$ determine whether a "1" or "0" is to be "written" into each digit of the selected one of four words on the selected row during the write time interval. It will be noted in FIG. 6 that register outputs $L_5$ and $L_9$ are fed to enable logic decoder 110 by means of storage flip-flops LL5 and LL9, which are provided to store these settings so that all L register flip-flops may be changed to a new address at the logical clock pulse.

*Program control*

Referring now to FIGS. 7*a* and 7*b*, the program control system of the computer disclosed in the aforementioned copending patent application is shown which functions during each operating cycle to energize a predetermined program control transformer whose sense lines in turn render operative those logical diode circuits required to accomplish the particular operations to be performed during the operating cycle. For convenience and clarity, the operations to be performed during a sequence of operating cycles may be represented by respective operation blocks, such as illustrated in FIG. 17. The particular program control transformer 150 selected during an operating cycle is determined by the states of flip-flops N7–11 of the instruction register 155 (FIG. 7*b*) and flip-flops N1–4 and N5–6 of the program counters 157 (FIG. 7*a*) and 159 (FIG. 7*b*) whose states during each operating cycle are determined in accordance with the particular commands in the routines of the computer system.

The instruction register 155 (FIG. 7*b*) includes flip-flops N7–11 for the storage of an instruction designated as the command code which specifies the command to be performed in the subsequent operating cycles. After the instruction register 155 has been set at the beginning of the execution of a command, the register remains unchanged until the required operation blocks in the command are performed or until a decision is made to the contrary. The states of the flip-flops N7–11 for the typical commands are indicated in the table shown in FIG. 10. The states of flip-flops N7–11 for the divide command 13–, for example are 01011 wherein flip-flop N7 designates the least significant bit and the order of significance of the flip-flops increases with the flip-flop number. The outputs $N_{7-11}$ of flip-flops N7–11 acting through instruction decoder 166 (FIG. 7*b*) and instruction drivers 173 select the drive lines 154 of one or a group of columns of octally numbered transformers 150 in the program control transformer array 152. For example, when flip-flops N7–11 have the octal configuration 13–, driver transistor 173*a* will become conductive to effectively ground the emitters of the transistors within block 177 to thereby select the first group of columns –0 and –1. A block of transistors, such as 177, is provided for each group of columns selected by instruction decoder 166 in order to permit selection of a particular column within each selected group in response to flip-flops N5 and N6 (FIG. 7*a*) operating through counter decoder 168, as will be described, infra.

In many of the commands, twelve or a lesser number of operation blocks are required for the performance of the operations individual to the command, in which case only a single column of transformers 150 in array 152 (each column in array 152 having twelve or a lesser number of transformers) is required for the execution of the command. For such commands, the instruction decoder 166 selects directly, according to the command, the proper column of transformers 150 in the array 152. On the other hand, in certain instances, computer commands are such that more than twelve operation blocks may be required for completion or execution of the operations individual to the command. In such instances, a single column of twelve transformers is insufficient and a group of columns of transformers are provided to accommodate the execution of the long command, one transformer corresponding to each operation block. The maximum number of columns which are used in a group is four to provide a maximum number of forty-eight transformers corresponding to the forty-eight operation blocks available for a long command; but as in the case of other commands, not all of the operation blocks need be used. Command 13–, for example, uses two columns of transformers 150 providing a maximum of twenty-four operation blocks which are individual to the command. The use of additional columns of transformers to continue the count of commands which require more than twelve operation blocks has an advantage in that it simplifies and reduces the number of components in the program counter 157, counter drivers 178, and the number of row drive lines 156. In longer commands requiring more than twelve operation blocks, including in some instances various modes, i.e., alternate operation blocks to be performed, flip-flops N7–11 acting through the instruction decoder 166 and drivers 173 select a group of columns of transformers 150 in the array 152 (such as the selection of columns 0 and 1 by conduction of driver transistor 173*a* when flip-flops N7–11 have the binary configuration 13–) which correspond to the command to be performed. The program counter flip-flops N5 and N6 acting through the counter decoder 168 (FIG. 7*a*) and the transistors within a respective block 177 (FIG. 7*b*) then select the particular column of transformers 150 in the array 152 from the group selected by flip-flops N7–11.

The various combinations of the states of flip-flops N5 and N6 for typical commands are shown in the table illustrated in FIG. 10 alongside the states of the instruction register flip-flops N7–11. Where the command includes a group of columns in the array 152, various combinations of the states of flip-flops N5 and N6 are indicated corresponding to the selection of particular columns in the group.

It should be noted that the instruction register flip-flops N7–11 do not enter into the selection of transformers in the program control array 153 shown in FIG. 7*a*. The program counter flip-flops N5 and N6 themselves acting through counter decoder 168 and drivers 176 select a single column of transformers 150 in the array 153, and the instruction register 155 (FIG. 7*b*) is not involved in the selection.

The order in which the transformers in a selected column are energized during execution of a command (and thus the order in which the operation blocks are performed during successive operating intervals) is controlled by program counter flip-flops N1–4 which during each operating interval select the drive line 156 of one of the twelve octally numbered rows making up arrays 153 and 152 in FIGS. 7*a* and 7*b*, respectively. Specifically, during each operating cycle, flip-flops N1–4 acting through counter decoder 170 and drivers 178 select either one of the four rows –00– to –03– in array 153 if one of the transformers in array 153 is to be energized, or one of the eight octally numbered rows –04 to 17– in array 152 if a transformer in array 152 is to be energized. If one of the four rows –00– to –03– of array 153 is selected, the selection of the transformer in array 153 to be energized is then completed by flip-flops N5 and N6 acting through counter decoder 168 and driver transistors 176 to select one of the four columns in array 153. However, if one of the eight rows 04–17 in array 152 is selected, the selection of the transformer in array 152 to be energized is then completed by flip-flops N7–11 acting through instruction decoder 166 to select a group of columns, and in addition, by flip-flops N5 and N6 acting through counter decoder 168 and transistors 177 to select a particular one of the columns from the group; of course, if flip-flops N7–11 select only one column, the use of flip-flops N5 and N6 and transistors 177 is not necessary. As will be evident, infra, the transformers of array 153 correspond to command level operation blocks, while the transformers of array 152 correspond to operation blocks for individual commands.

Both the columns and the rows of transformers 150 have been octally numbered so that each transformer corresponds to the particular configurations of flip-flops N7–11, N1–4, and N5–6, respectively, which are required for its selection; the numbering of each transformer also corresponds to a like numbered operation block. For example, the transformer in array 152 (FIG. 7*b*) designated as 13–04–0 corresponds to operation block 13–04–0 and is selected by N7–11 having the configuration 13–, N1–4 having the configuration 04–, and N5–6 having the configuration –0. As another example, the transformer in array 153 (FIG. 7*a*) designated as XX–00–0 corresponds to operation block XX–00–0 and is selected by N1–4 having the configuration 00– and N5–6 having the configuration 0. The "XX" at the beginning of the number is provided to indicate that flip-flops N7–11 play no part in the selection of transformers in array 153, the selection of a transformer in array 153 depending only on the configurations of flip-flops N1–4 and N5 and N6.

In FIG. 11, the states of the flip-flops N1–4 have been indicated in the table for each of the rows –00– to –17–, inclusive, wherein the numbering used employs octal digits only, i.e., 0 to 7, inclusive. The table in FIG. 12 has been divided into two sections, the upper section including rows –00– to –03– of array 153, and the lower section including rows –04– to –17– of array 152. The various possible configurations of the states of program counter flip-flops N5 and N6 for each row are also indicated in FIG. 11 alongside the individual states of flip-flops N1–4 for respective rows. As explained in the previous paragraph, when flip-flops N1–4 select one of the rows –00– to –03– of array 153, only flip-flops N5 and N6 are required to select the transformer in array 153 to be energized; on the other hand, when flip-flops N1–4 select one of the rows –04– to –17– of array 152, the transformer in array 152 to be energized is selected by flip-flops N7–11 acting alone if only one column is selected, but if flip-flops N7–11 select a group of columns (which may be as many as four), then flip-flops N5 and N6 are required to choose a particular column from the selected group.

Additional tables illustrated in FIGS. 12 and 13 show the states of instruction register flip-flops N7–11 and program counter flip-flops N1–4 for the energization during successive operating cycles of those transformers (each transformer corresponding to a predetermined operation block of the same number as pointed out previously) which are required for the performance of a single stage exemplary command "load" (FIG. 12) and the performance of a double stage exemplary command "move" (FIG. 13). As noted alongside the tables in FIGS. 12 and 13, the upper sections of the tables are common to all single and double stage commands, respectively. As mentioned previously, the operation blocks having a first portion designation of XX correspond to transformers in array 153 (FIG. 7*a*) and the instruction register 166 does not control their selection. It should be noted that the XX–00–0 and XX–00–1 operation blocks are common to both single and double stage commands.

Now considering the program control apparatus in detail with reference to FIGS. 7*a* and 7*b* along with FIG. 8, it will be seen that the transformers 150 of arrays 152 and 153 are arranged in columns and rows by means of column lines 154 and row lines 156. The drive windings 158 (FIG. 8) of transformers common to a single row are connected to the same row drive line 156, while the drive windings common to a single column are connected to the same column drive line 154. As shown in FIG. 8, which is an exemplary embodiment of the transformer 13–04–0 of FIG. 7*b*, the transformer has a core 160 which is normally biased to a predetermined one of its two bistable states by a bias current $I_B$ (FIG. 9(*h*)) passed through a main bias line 162. The bias line 162 has been omitted in FIGS. 7*a* and 7*b* for clarity, but is coupled to each of the transformer cores 160 in arrays 152 and 153 in a manner similar to that shown in FIG. 8. Thus, in the absence of a drive current pulse 164 (FIG. 9*d*) applied to the drive wind 158 of any transformer, all transformers remain biased in the same predetermined state.

The selection of any one of the transformers 150 in the arrays 152 and 153, for example, transformer 13–04–0 in FIG. 8, is accomplished during each operating cycle by the proper choice of column and row drive lines 154 and 156 in accordance with the configurations of flip-flops N1–4, N5–6, and N7–11 as described previously. The timing of the selection is initiated during an operating cycle by timing signal $G_1$ (FIG. 9(*c*)) supplied from flip-flop G1 (FIG. 2), and fed to counter decoder 170 (FIG. 7*b*), whereupon a drive pulse 164 (FIG. 9(*d*)) is applied to the drive winding 158 of the selected transformer. The drive pulse 164 thus applied to the drive winding 158 of the selected transformer partially switches the core to induce program control pulses 189 on each of the secondary windings or sense lines 180 passing through the core 160. A typical program control pulse induced in the sense line XS3 of transformer 13–04–0 in FIG. 8 is illustrated in FIG. 9(*g*).

It should be understood that a particular one of the sense lines 180 is, in the usual case, inductively coupled to more than one of the transformer cores 160 in the respective array whereby a program control signal is produced on that sense line whenever drive pulses 164 are coupled to any one of the transformer cores 160 to which the particular sense line is coupled. It should be clearly understood that the transformers are selected one at a time by the setting of the column and row flip-flops and that one of the transformers 150 corresponds to each operation block. Resetting the program counter flip-flops N1–4 at the logical clock pulse $C_L$ is effective to change the coordinate selection of transformers 150 to proceed to the next operation block in the same column.

The description of a typical operation of the program control system will now follow with primary reference to the detailed circuit diagram of FIG. 8, which for the purposes of this description has been drawn to include typical associated program control circuits along with the transformer 13–04–0 shown in detail therein. For the purposes of this typical description, it will be assumed that operation block 13–04–0 is to be executed, the timing diagram for which is illustrated in the right half of FIG. 9. To select transformer 13–04–0 corresponding to operation block 13–04–0, it will be necessary that flip-flops N7–11, N5–6, and N1–4 be set to their required configurations at the logical clock $C_L$ of the previous operating cycle (which may be operation block XX–03–0 as indicated in FIG. 9). From previous discussions it will be understood that the configurations required to select transformer 13–04–0 are: flip-flops N7–11 be set to configuration 13– corresponding to the group in array 152 containing columns –0 and –1, flip-flops N5 and N6 be set to the configuration corresponding to column 0, and flip-flops N1–4 be set to a configuration such that $N_1'$, $N_2'$, $N_3$, and $N_4'$ are all true corresponding to row –04–.

Considered electronically, it wil lbe understood that the outputs of flip-flops N7–11 will then act to cause the instruction decoder 166 to produce a low output signal 174 (FIG. 9(*e*)) on a decorder output line 167 which is coupled to the base of a PNP switching transistor 173*a*, as shown in FIG. 8. The signal 174 turns on the switching transistor 173*a* to complete a circuit from the ground 184 through the transistor 173*a* to the emitters of driver transistors 177 which drive columns –0 and –1 of array 152, which columns correspond to the divide command 13–. The selection of column –0 from the two columns selected by divide command 13– is then accomplished by a low output signal 175 (FIG. 9(*f*)) on decoder output line 183*a* provided by counter decoder 168 (FIG. 7*a*) in response to the –0 column configuration of flip-flops N5 and N6. As shown in FIG. 8, the decoder output line 183*a* is coupled to the base of the PNP switching transistor 177*a* which drives column –0, and in response to the signal 175 is turned on to complete a circuit from the ground 184 through transistors 173*a* and 177*a* to the column drive line 154, thereby effectively grounding the end of drive winding 158 of the transformer which is connected to column line 154.

The final selection of transformers 13–04–0 occurs at the leading edge of the control timing signal $G_1$ (FIG. 9(*c*) and FIG. 3(*g*)), at which time $G_1$ becomes true along with flip-flop outputs $N_1'$, $N_2'$, $N_3$, and $N_4'$ corresponding to row –04–. As a result, a low output signal 185 is applied to amplifier and inverter 186 from a typical decoder network 182 shown in FIG. 8, producing an amplified and inverted signal on base line 171*a* to turn on transistor 172*a* and cause a —15 volt drive pulse 164 (FIG. 9(*d*)) to be applied to the row end of drive winding 158 of transformer 13–04–0 by way of row drive line 156 and diode 190. Since the column end of drive winding 158 has previously been grounded through transistors 177*a* and 173*a*, a complete circuit now exists through drive winding 158 of transformer 13–04–0 to cause drive pulse 164 to partially switch the core 160 and induce program control pulses (e.g. FIG. 9(g)) in each of the sense lines 180. The purpose of diodes 190 in series with drive windings 158 is to prevent "sneak" currents. The diodes 190 also serve to reduce transients generated by voltages induced in the drive winding 158 upon return of core 160 to its biased state when the drive pulse 164 falls to zero at the appearance of the logical clock $C_L$.

It will now be evident that energization of transformer 13–04–0, corresponding to the operation block of the same number, produces program control signals XS3, XS4---XKM1 on each of the sense lines 180 coupled to the energized transformer as illustrated for a typical program control signal XS3 in FIG. 9(g). Each sense line 180 is connected to a respective program control signal X-- input of one or more logical circuits in an "and" relationship so that the logical circuit remains inactive during an operating cycle unless a program control signal X-- is applied thereto. Thus, when program control pulses XS3, XS4---XKM1 are generated in response to transformer 13–04–0 being energized, those logical circuits to which these signals are fed become operative during the operating cycle. The energization of the program control transformer 13–04–0 is thereby able to activate the predetermined combination of logical circuits which are required to be operative during the operating cycle in order to perform the operations corresponding to operation block 13–04–0. In a like manner, the energization of a different transformer during an operating cycle would induce program control signals X-- on the sense lines coupled to that transformer, whereby the predetermined combination of logical circuits fed by these sense lines would become operative during the operating cycle to perform the operations required for the operation block corresponding to the energized transformer. Thus, by proper choice of the program control transformer energized during an operating cycle, any of a considerable number of possible combinations of logical circuits may conveniently be made operative in order to perform the wide variety of operations which may be required for the different operation blocks provided by the computer.

Each program control pulse, such as illustrated by program control pulse 189 in FIG. 9(g) on the respective sense line 180, is chosen to be low for approximately two and one-half microseconds prior to the leading edge of the logical clock pulse $C_L$ in order to provide an adequate time period for propagation of logical signals through the logical circuits which have been made operative during an operative cycle in response to a program control pulse induced in a respective sense line 180 fed thereto. Also, each progarm control pulse 189 is caused to overlap in time the logical clock $C_L$ by approximately 0.2 microsecond so that the logical circuits will remain operative to trigger their respective flip-flops during the 0.2 microsecond duration of the logical clock $C_L$.

Considering now the details of construction of a program control transformer 150, such as transformer 13–04–0 of FIG. 8, it will be understood that the transformer core material is preferably of a type characterized by a relatively narrow width rectangular hysteresis loop, high permeability, low coercivity, and low eddy current loss. Such a core material may be Permalloy, a nickel-iron alloy having a high percentage of nickel, for example, a core of 78% nickel and 22% iron. A transformer 150 using a toroidal core having the aforementioned desirable characteristics provides a minimum of distortion of the drive pulse 164 to produce program control pulses (such as 189 in FIG. 9(g) which are substantial replicas of the drive pulses 164.

The primary consideration in determining the magnitude of the bias current $I_B$ (FIG. 8) for a program control transformer is to make sure that sufficient bias is provided to drive the partially switched transformer core 160 back to its biased state in the time interval between drive pulses 164 of successive operating cycles in the event an operation block is repeated, referred to herein as "sticking." Another important consideration in determining the bias current $I_B$ is that a bias current $I_B$ of sufficient magnitude be provided to reduce the spurious signal outputs on sense lines 180 which are not coupled to an energized transformer 150 during a given operation cycle.

The foregoing describes the operation of the program control system during a complete operating cycle indicated as operation block 13–04–0 in FIG. 9 in which program control signals XS3, XS4--- XKM1 are supplied on sense lines 180 to predetermined logical circuits of the computer during an operating cycle in order to make these predetermined logical circuits operative to perform the operations desired in accordance with the operation block to which the transformer 13–04–0 corresponds. If the following operating cycle is to perform operations of operation blocks 13–05–0, program control transformer 150 for operation block 13–05–0 will then be energized to produce program control signals X-- on sense lines 180 coupled thereto in a manner similar to that just described for transformer 13–04–0. Alternatively, as a result of the logic performed in the operating cycle for operation block 13–04–0, the same operation block may be repeated in the immediately following operation cycle, or operation blocks in a command may be skipped, depending on the operation of the program counter flip-flops N1–4 and N5–6 controlled by the outputs of decision drivers **K*s*1, K*s*2, and K*s*3**. In the immediately following operating cycle, therefore, the same transformer may be energized again or a selection may be made of another transformer which corresponds to an operation block selected in accordance with decisions during the performance of the logical operations in the operations block 13–04–0.

Now referring also to FIG. 16, an exemplary portion of a sequential "flow diagram" or operation block diagram is depicted illustrating typical sequential steps or block operations within different commands which may be executed by suitable selection of predetermined program control transformers 150 of arrays 152 and 153 during successive operating cycles. As pointed out previously each of the operation blocks shown in FIG. 16 has an operation block number by which it is identified and which number corresponds to the numerical designation of a transformer in either array 152 or 153 which controls the activation of a predetermined group of logical circuits represented by that block. For example, transformer 01–04–0 (FIG. 7*b*) controls the activation of the predetermined group of logical circuits whose operation is represented by operation block 01–04–0 of FIG. 16. Each operation block represents, in the operation sense, a set of logical equations which define the logical relationship of the predetermined logical circuits which are made effective during an operating cycle by the program control pulses 189 induced in sense lines coupled to the program control transformer corresponding to that operation block, as pointed out previously. It will thus become evident from the foregoing description that it is possible to make the computer self-sequencing so that, as a result of carrying out the operations represented by a given operation block during an operating cycle, the logical circuits controlling the N flip-flops may be controlled by other computer logical circuits (such as decision circuits **11*b***) to permit the N flip-flops to be set to the configurations required to select the next program control transformer corresponding to the operation block to be performed during the next operating cycle. Consequently, the order in which the operation blocks are performed by the computer is thus conveniently and advantageously made automatically self-sequencing, without requiring additional clock pulse periods or other time consuming operations.

As hereinbefore indicated, the specific operations which are represented by a particular operation block which are carried out in predetermined order during an operating cycle, may be repeated in each of one or more operating cycles, depending on a binary decision formed in the decision logic of decision circuits **11*b* and brought into effect by the output of the decision drivers Ks1–3. An example of this choice in response to logical operations is indicated at operation block 02–05–0 in FIG. 16, wherein, as indicated, the computer may, in normal action, encounter the next operation block, or skip (for example, to block XX–00–0), or "stick," i.e., repeat the operations of a block 02–05–2, as determined by the results of operations within the decision circuits 11***b* and placed in effect through decision drivers Ks1 and Ks2. Another choice which may be provided within a given command is that at certain operation blocks, a choice between two alternate subsequent operation blocks may be made by the true-false status of one of the program counter flip-flops N5 and N6. This choice may, for example, cause the sequence of operations during that step to be controlled by a program control transformer 150 in an adjacent column of array 152 (FIG. 7*b*) rather than by the next transformer following in the present column. Thus, it is evident that besides being self-sequencing, logical decisions made by the computer while performing the operations defined by the operation blocks of the command may determine the actual flow path of block operations followed during the computer operation.

*Command structure*

The computer system disclosed in the aforementioned copending patent application is a modified single address system wherein only one main memory field and only one operand stored in the main memory field is normally accessed in a single command. Those commands which access only a single operand are referred to herein as single stage commands and are graphically illustrated in FIG. 14. Some commands, however, are capable of accessing two operands in order, for example, to transfer information from one location in the memory to another. These latter commands are referred to as double stage commands and are illustrated diagrammatically in FIG. 15.

In the present computer system an actual operand is sometimes stored in the second word (word #2) of a command (in lieu of an address for that operand) where the operand consists in a single word. This is a special case termed implicit addressing and in these instances, since the operand is the second word (word #2) (A) of the command in FIG. 14, the operand may be made available immediately by accessing the main memory cells of the command corresponding thereto. This special case of implicit addressing is represented in a command by the last four bits (R) of word #1 thereof which four bits are 1111, i.e., (R=(—)) to indicate that the second word (A) of the command is the operand.

Another mode of addressing which may be employed is referred to as relative addressing wherein the second word (A) of the command does not contain the operand as in implicit addressing described above but instead, the second word of the command contains a twelve bit relative address which upon combination with an eighteen bit base number in one of the index registers 15 of the auxiliary memory 13 (FIG. 1) provides the eighteen bit address of the first word of the main memory field containing the operand or as more simply stated, the first word of the operand. Thus, in relative addressing the operand is found by means of the second word (A) of the command which serves as a relative address, and upon being combined with a particular base number in a specified index register provides the address of the first word of the operand in the main memory 9. The modification of the relative address (A) in this manner thereby permits different data to be operated upon with the same sequence of commands, and makes possible increased operating speeds as well as permitting greater versatility with a minimum of circuit complexity.

The particular base number in the index register with which the second word (A) of the command is to be combined to provide the address of the first word of the operand is specified by the (RX) portion of the first word of the command which, instead of the (R) portion being set to 1111 as in implicit addressing previously described, the (R) portion combines with the (X) portion to provide an (RX) portion which is the address of the index register where the base number can be found. The twelve bit relative address (A), which is the second word of the command, is combined with the eighteen bit base number accessed from the addressed index register by addition of the two in the adder 11*a*, the sum being put into the L register. The sum stored in the L register is the address of the first word of the operand.

The following is an example illustrating how a single stage command may be accessed from the main memory 9 (FIG. 1) in which it is stored in order to initiate the execution of a command. For this example, it will be assumed that the first word (word #1 of FIG. 14) of the command to be accessed is a number (351) and is stored in a first cell of main memory unit #0 (FIG. 1) at address (40); it will also be assumed that the second word (A) of the command to be accessed is a number (150) and is stored in a second cell of main memory unit #0 at address (41). To access these first and second words of the command stored in main memory unit #0, it is first necessary that their address of the word #1 (40) be looked up in the Control N° Register (one of the index registers 15) where it is stored; the address is then "read out" of the Control N° Register, stored in the S register, and then transferred to the L register to permit the words (351) and (150) at addresses (40) and (41) in the main memory unit #0 to be sequentially "read out" into the M register.

So far, a typical single stage command, such as illustrated in FIG. 14, has been analyzed to the extent that the function of the second word (A) of the command has been illustrated as well as the functions of the portion (R) and the combined portions (RX) for implicit and relative addressing, respectively. It has been shown that the second word (A) of the command may itself be the operand, in which case portion (R) of the first word of the command is 1111 to permit those memory cells in the main memory corresponding to the second word (A) of the command (which is the operand) to be accessed. Alternatively, the second word (A) of the command may merely be a relative address which is added to a base number found in one of the index registers 15 to provide the eighteen bit address required to access the first word of the operand in the main memory, the address of the register containing the base number in the index registers 15 being provided by the (RX) portion of the first word of the command.

Thus, the remaining portions of the single stage command to be considered are the portions (F) and (C) of the first word. The portion (F) is a three bit binary number representing the number of words in a main memory field (which may have up to eight words as explained previously). The portion (F), therefore, is able to provide information as to when the last word in the field has been accessed. Finally, the purpose of the (C) portion of the first word of the single stage command may be considered. This (C) portion is a four bit binary number representing the command code; that is, remembering the previous discussion of the program control system shown in FIGS. 7*a* and 7*b*, the configuration of instruction register 155 (FIG. 7*b*) containing flip-flops N7–11 is determined by the command code (C), and these flip-flops N7–11 in turn determine those columns of program control transformers 150 (and their corresponding operating blocks) which are capable of becoming energized during the execution of a command.

Turning now to a consideration of a double stage command, the basic structure of a typical command is illustrated diagrammatically in FIG. 15. It will be seen that, in general, the first and second words (word #1 and word #2) are the same as the first and second words of a single stage command (FIG. 14), and may likewise provide the information for a first operand. In a double stage command the (F) portion and the (C) portion together provide the information for setting the instruction register flip-flops N7–11. However, in addition to the first and second words, a double stage command requires two more words (word #3 and word #4), which are able to provide the information for a second operand. Since the command code already has been provided by the (C) portion and the (F) portion of the first word of the command, the (G) portion of the third word is available to provide the field of the first operand; or if no field length information is necessary, the (G) portion is available for various alternatives which may be involved in executing the double stage command. The other portions of the third word (Q), (Y), and (J) may have similar functions to those described for portions (F), (X), and (R), respectively of the first word of a single stage command. Also, in the same manner in which the second word (A) of the command may represent the relative address of the first word of the field containing the first operand, the fourth word (B) of the command may represent the relative address of the first word of the field containing the second operand.

It will be appreciated that the arrangement and functions of the various portions of the command structure described above and illustrated in FIGS. 14 and 15 are not limited to the specific examples presented, and may be given different representations and functions depending on the particular computer operation to be performed.

The command flow diagram illustrated in FIG. 16 describes block operations of exemplary commands and, as such, represents an overall picture of computer operation. It may be noted that the operation blocks are generally arranged in FIG. 16 to correspond to the location of their respective transformers 150 in arrays 152 and 153 of the program control system shown in FIGS. *7a* and *7b*, one program control transformer (and thus one operation block) being energized for each operating cycle. As pointed out in connection with the description of the program control system of FIGS. *7a* and *7b*, the energization of a program control transformer during an operating cycle causes a predetermined combination of logical circuits to become operative during that operating cycle in response to program control signals induced in sense lines coupled to the energized transformer. Thus, by energizing the program control transformers in a predetermined manner during successive operating cycles, any desired command may be performed; also, the selection of each program control transformer to be energized during each operating cycle is advantageously determined by the logical operations performed during the previous operating cycle and various decision circuits **11*b*** (FIG. 1) in a manner so that automatic self-sequencing operation is obtained.

Referring again to the operation blocks of FIG. 16, it will be seen that the first two operation blocks, namely, XX–00–0 and XX–01–0 are particularly significant in that all commands are set up for execution by first passing through these two operation blocks; that is, operation blocks XX–00–0 and XX–01–0 are common to all commands. Single stage commands are then further processed in blocks XX–02–0 and XX–03–0, after which any of a number of single stage commands may then be performed by energizing, during successive operating cycles, the program control transformers whose operation blocks correspond to the particular single stage command to be executed. FIG. 16 illustrates the command flow of the typical single stage commands: load, store, and divide.

The command flow for all double stage commands is first through blocks XX–00–0 and XX–01–0 in the same manner as for single stage commands, but as shown in FIG. 16, the flow then proceeds to blocks XX–00–1, XX–01–1, and XX–03–1, in that order, with provision for exceptions as noted by the "skips" indicated. After these blocks, the command flow may then proceed to any of a number of double stage commands, one such double stage command being indicated by the "move" command in FIG. 16.

One or more "skips" such as indicated in connection with block XX–00–1 in FIG. 16, may be provided in executing a command for various purposes, for example, in order to avoid unnecessary block operations, or after the data on which the computer is operating has been processed to a predermined point. Decision circuits, such as **11*b*** in FIG. 1 which include decision logic and decision drivers K*s*1 and K*s*2, act to control when a "skip," "jump," or some other decision operation is to take place after a particular operation block. For example, the "skip" from blocks XX–01–1 to XX–03–0 is the result of decisions which depend upon whether an operand is contained in the second word of respective commands.

THE PRESENT INVENTION

The manner in which the present invention may be applied to the computer system disclosed in the aforementioned copending patent application will now be explained with reference to FIGS. 17–20.

Referring first to FIG. 17, illustrated therein is typical structure for modifying the operation of the timing control system of FIG. 2 in accordance with the present invention. The portions of FIG. 2 which are similarly numbered in FIG. 17 may be assumed to the the same as in FIG. 2, and those portions of FIG. 2 which are not shown in FIG. 17 may be assumed to be unchanged, except for the clock source 20 in FIG. 2 which is replaced by the clock source **20*a* in FIG. 17. Also, it is to be noted that only the memory unit #0 delay line circuitry 24*a* is shown in FIG. 17 (corresponding to the memory unit #0 timing control circuit 24** in FIG. 2). The other three memory units #1, #2, and #3 may be considered to be modified in accordance with the present invention in the same manner as shown in FIG. 17 for memory unit #0.

It will be remembered in connection with FIG. 2 that processor clock pulses C are generated independently of the processor delay line 40 in response to oscillator 21 for the normal six microsecond cycle operation, or in response to an oscillator such as **23*a*** for longer cycle times when the processor is to operate in synchronism with slower speed peripheral equipment.

In the modification shown in FIG. 17, a different and more advantageous approach is used to control the generation of processor clock pulses C. A plurality of summing diodes, such as illustrated by the numeral 502 in FIG. 17, are connected at spaced taps along the processor delay line 40 with their outputs connected in parallel to an amplifier-shaper circuit 503 to form a resultant logical sum proposition T which may be considered to be at a true logical level when an input pulse is presented at the input to amplifier-shaper circuit 503. Additionally, the amplifier-shaper circuits 41 located at the input to the processor delay line 40 and between one microsecond sections thereof are designed so as to provide a pulse width at least as great as the maximum delay line time spacing between the summing diodes 502, so that, as long as a pulse exists somewhere between the first and last summing diode taps on the processor delay line 40, the resultant sum proposition T will be at a true logical level. This resultant sum proposition T is passed through an OR gate 504, and when true, is capable of inhibiting the generation of a new pulse by a pulse generator 505, which may be a blocking oscillator, for example. It will thus be understood that after generating a pulse, the pulse generator 505 will not be able to generate a new pulse until the trailing edge of the old pulse in the processor delay line 40 passes the last summing diode. Typically, the summing diodes 502 may be spaced along the 6 microsecond processor delay line at 0.2 microsecond intervals, and the pulse width provided by the amplifier-shaper circuits 41 may typically be 0.25 microsecond. The last summing diode tap is typically provided at 0.5 microsecond from the end of the processor delay line 40 to obtain a normal cycle period of 6 microseconds considering inherent circuit delays. Thus, if such an arrangement is allowed to free-run, a processor clock pulse C will automatically be produced by the pulse generator 505 every 6 microseconds without the need for a separate oscillator, such as the oscillator 21 required in FIG. 2.

The above described arrangement of FIG. 17 for generating the processor clock pulses C has the further advantage of permitting convenient synchronization of the processor with slower operating peripheral equipment (such as is accomplished in FIG. 2 by the provision of oscillator 23*a*, operating with single shot 31 and signals $HLC_1$ and $HLC_1'$). In FIG. 17, such synchronized operation between the processor and a slower operating peripheral unit is provided by employing a single shot 506 which, if $HLC_1$ is true (indicating operation with a peripheral), will permit the single shot 506 to be triggered (via amplifier-shaper circuit 507 and AND gate 508) when a pulse in the processor delay line 40 reaches the last tap thereon at about 0.5 microsecond from the end of the processor delay line. The unprimed output SS of the single shot 506, will then be switched to a true logical level and will act via OR gate 504 to inhibit the generation of a new pulse by the pulse generator 505 for an additional predetermined time period after the inhibiting action of the proposition T disappears, so as to thereby provide the desired slower processor operating rate for cooperation with a peripheral. For example, if a 100 kc. rate is desired for synchronism with a peripheral, the "on" time of the single shot 506 will be adjusted so that the pulse generator 505 generates a new pulse every 10 microseconds. For each different peripheral operating rate, another single shot may be provided and adjusted for an appropriate "on" time, as just described for single shot 506.

The operation of the processor with a peripheral unit ordinarily involves the transfer of data from the main memory to the peripheral and/or vice versa. Using either the timing control system of FIG. 2 or the just described portion of FIG. 17 involving the single shot 506, operation is such that the processor operating rate is slowed up to the rate of the slower operating peripheral unit and data is transferred therebetween at this rate.

In accordance with the present invention, a significant improvement in processor-peripheral cooperation is made possible by providing additional means which permit one or more peripheral units to use the main memory whenever the processor does not require such use during its normal operation. Also, in accordance with the present invention, the peripherals are given priority over the processor for use of the main memory, and are permitted to initiate a memory cycle at the first possible opportunity, even in the middle of a processor cycle which is not using the memory. In such an arrangement, the processor is able to proceed at almost full speed, since peripherals are normally relatively slow operating devices which require only intermittent use of the main memory at a relatively low average rate as compared to the normal processor operating rate. It has been found that such operation in accordance with the invention not only provides greater operational flexibility, but also, because much more efficient use is made of the main memory, a significant increase in the overall speed capability of the computer is obtained.

FIGS. 17 and 18 illustrate the manner in which the above described operation of the present invention may be applied to a computer system of the type disclosed in the aforementioned copending application previously described herein in connection with FIGS. 1–16. It will be understood that the additional structure shown in FIG. 17 for use in the present invention may be included in the processor itself, or in a separate control unit, or in one or more of the peripherals. It will also be understood that although only two peripherals P–1 and P–2 are indicated in FIG. 18 for sharing the use of the main memory units #0, #1, #2, and #3 with the processor, such a showing is only exemplary and more or less peripherals may be included without departing from the scope of the invention. It will further be understood that, in order not to obscure the present invention, FIG. 18 illustrates only those portions and signals of the two exemplary peripherals P–1 and P–2 which are pertinent to the present invention. It will be appreciated that the remaining portions of the peripherals may be provided in various ways within the skill of those in the art, depending upon the nature of each peripheral.

Now considering FIG. 18 in more detail, it will be seen that the pertinent portions of the peripherals P–1 and P–2 include respective L registers $P_1L$ and $P_2L$, and respective M registers $P_1M$ and $P_2M$, which correspond to and are able to perform the same respective addressing and input-output functions with respect to the main memory as the original main memory L register and M register which were previously described in connection with FIG. 6. There are thus three pairs of respective M and L registers in FIG. 18, as well as a respective pair of control gates for each (gates 600 and 610 for the L and M registers of the processor, gates 601 and 611 for the $P_1L$ and $M_1L$ registers of peripheral P–1, and gates 602 and 612 for the $P_2L$ and $P_2M$ registers of peripheral P–2), whereby each L, M register pair is capable of independent operation with the main memory units. By appropriate control of these control gates 600–602 and 610–612 in response to signals JM–1, JM–1′, JM–2, and JM*2′ (the derivation of which will become evident hereinafter), only one respective L register and M register pair is permitted to cooperate with the main memory units at any one time, depending on whether peripheral P–1, P–2 or the processor is given access to the main memory. The manner in which either the processor, P–1 or P–2 gains access to the memory will shortly be described in connection with FIG. 17, but at this point it is sufficient to note that signal JM–1 in FIG. 18 will be at a true logical level when peripheral P–1 is given access to the main memory, signal JM–2 will be at a true logical level when peripheral P–2 is given access to the main memory, and both JM–1′ and JM–2′ will be at true logical levels when the processor is given access to the main memory. For example, when peripheral P–1 is given access to the main memory, then, only signal JM–1 would be at its true logical level to cause the respective P–1 gates 601 and 611 in FIG. 18 to be enabled to permit the $P_1L$ register and the $P_1M$ register of peripheral P–1 to cooperate with the main memory units #0, #1, #2, and #3 during a memory cycle in the same manner as described for the original L and M registers in connection with FIG. 6.

Still referring to FIG. 18, it will be seen that also illustrated therein are other pertinent portions of the peripherals P–1 and P–2, these being respective request flip-flops 621 and 622, each of which is triggered to the true state when its respective peripheral requests use of the main memory; respective transfer flip-flops 631 and 632, each of which is triggered to a true state when data is to be transferred from the peripheral PM register to the main memory, and to a false state when data is to be transferred from the main memory to the peripheral PM registers; and respective memory pulse generators 641 and 642, each of which is capable of providing a memory initiation pulse ($P_1C_m$ or $P_2C_m$) to initiate a memory cycle when its respective peripheral is given the go-ahead to begin a memory cycle as indicated by its respective signal JM–1 or JM–2 becoming true.

As far as the transfer of data between each pair of PL and PM registers and other portions of each respective peripheral unit is concerned, it is sufficient for the purposes of the present invention to note that, prior to the triggering of each respective peripheral request flip-flop (621 or 622) to its true state (such as by way of respective lines $_1p_1$ and $_1p_2$ in FIG. 18) to request use of the main memory, the respective peripheral transfer flip-flop will already have been set (such as by way of lines ${}_0p_1f_2$ and ${}_1p_1f_2$ for transfer flip-flop 631 and lines ${}_0p_2f_2$ and ${}_1p_2f_2$ for transfer flip-flop 632) in accordance with the direction of data transfer, and the respective PL register will already have been set (such as by way of respective lines $p_1l_{1-18}$ or $p_2l_{1-18}$) to the address in memory which is to be accessed during such memory use. Also, if during access of the main memory by a selected peripheral, the desired direction of data transfer (as determined by the state of the respective transfer flip-flop 631 or 632) is from the selected peripheral to the main memory, it can be considered that the peripheral PM register will already have been set (such as by way of respective lines $p_1m_{1-13}$ or $p_2m_{1-13}$) by other portions of the peripheral in accordance with the data to be transferred to the selected main memory address.

In order to prevent, during the read portion of a memory cycle, any changing of the settings of the selected PM register which are to be transferred to the selected main memory address during the write portion of the memory cycle, the primed output signal ($P_1F_2'$ or $P_2F_2'$) of the respective transfer flip-flop 631 or 632 (which signal is at a false logical level when data is to be transferred from the peripheral to the main memory) is used to inhibit generation of the strobe pulse $Qm$ at the output of AND gate 71*a* in FIG. 17 in the same manner as the primed output $F_2'$ of flip-flop F2 (FIG. 1) performs this operation in the timing control system of the aforementioned patent application shown in FIG. 2.

On the other hand, if the desired direction of data transfer is from the selected main memory address to a selected peripheral PM register, then, prior to the triggering of each respective request flip-flop 621 or 622, the respective PM register will already have been cleared (such as by respective clear pulses $P_1Rm$ or $P_2Rm$) in preparation for receiving data from the selected main memory address during the read portion of the memory cycle. During the write portion of the memory cycle, the data read out into the selected peripheral PM register will automatically be written back at the same memory address selected by the respective peripheral PL register in the same manner as previously described in connection with FIG. 6.

It will of course be understood that, between periods of access of the main memory by each peripheral, each may make use of the settings of its respective PM register by way of respective output lines ($P_1M_{1-13}$ for peripheral P–1 and $P_2M_{1-13}$ for peripheral P–2), and may provide new settings for its respective PL and PM register by way of respective input lines ($p_1l_{1-18}$ and $p_1m_{1-13}$ for peripheral P–1 and $p_2l_{1-18}$ and $p_2m_{1-13}$ for peripheral P–2). Obviously, in the case of a peripheral which is able to receive and output data at a relatively high rate, care must be taken to assure that such a peripheral will be able to gain access to the memory at a sufficient rate to prevent loss of data. It will be understood that each peripheral may include one or more types of storage devices, such as a plurality of tape handlers, for example, which themselves share use of the respective PL and PM registers of their respective peripheral.

*Memory sharing control circuitry*

Having generally explained how each peripheral and the processor may cooperate with the main memory independently of one another, it will next be explained by considering the typical series of operating periods illustrated in FIGS. 19 and 20 how the structure of FIGS. 17 and 18 achieves selection among the three main memory users—that is, the processor and peripherals P–1 and P–2—and how the processor is affected by such sharing.

Referring first to FIG. 19 to obtain an overall view of the sharing of the main memory by the processor and peripherals P–1 and P–2, operation will be described during a typical series of operating periods $T_1$–$T_{10}$. For each of the peripherals P–1 and P–2, a solid horizontal line bounded by a "dot" at each end indicates the period for which each peripheral is accessing the main memory during a memory cycle. For the processor, each solid horizontal line bounded by a "dot" at each end corresponds to a 6 microsecond processor cycle, an "*m*" designation indicating that a memory processor operation block is performed (that is, an operation block in which the processor accesses the main memory), and a "no-*m*" designation indicating that a no-memory processor operation block is performed (that is, an operation block in which the processor does not access the main memory). The vertical arrows 801–805 in the peripheral graphs of FIG. 19 indicate the points of time at which the respective peripherals request access to the main memory—that is, each arrow represents the time at which a respective peripheral request flip-flop (621 or 622 in FIG. 18) is triggered to the true state to request access to the memory.

Referring next to FIG. 20 along with FIG. 19, it is to be noted that FIG. 20 represents the same typical series of operating periods $T_1$–$T_{10}$, and its purpose is to show the states and time relationships of various pertinent signals and pulses of FIGS. 17 and 18 during this typical series of operating periods $T_1$–$T_{10}$. A "true" logical level of a signal is indicated in FIG. 20 by a negative-going signal, and a "false" logical level by a positive-going signal.

Now considering FIGS. 19 and 20 along with FIGS. 17 and 18, it will be seen that period $T_1$ is one which involves access of the main memory by the processor. To indicate such a situation, an MA flip-flop is provided as shown in FIG. 17. If a processor memory cycle is to be performed (as indicated by signal $F_1'$ being true), flip-flop MA is triggered to the true state (via AND gate 510) in response to the occurrence of a newly generated clock pulse C. The states of signals MA′ and $F_1'$ during period $T_1$ are illustrated in FIG. 20 where it will also be noted that the signal MA′ becomes true approximately 0.5 microsecond from the end of the cycle as a result of the processor delay line pulse 511 in FIG. 17 being fed from the last delay line tap, via amplifier-shaper circuit 507, to switch flip-flop MA to the false state. Since the next processor cycle $T_2$ is also a memory cycle, as indicated in FIG. 19, the signal $F_1'$ is caused to remain true during logical clock pulse $C_L$ occurring during $T_1$.

Continuing with description of FIGS. 19 and 20 it will noted that, at about 4 microseconds in the $T_1$ period, peripheral P–1 requests use of the memory (as indicated by the arrow 801 in FIG. 19, and by the signal $P_1$ becoming true during $T_1$ in FIG. 20). As will be understood from FIG. 17, when $P_1$ becomes true, it will be fed through OR gate 513 and a 0.5 microsecond delay circuit 515 to switch a control flip-flop 517 to the true state, causing its unprimed output signal CN (which is fed to AND gates 519 and 520) to become true, as illustrated in the signal CN graph of FIG. 20. As a result, when signal MA′ is switched true near the end of $T_1$, signal MA′, $P_1$, CN and JM–2′ will then all be at a true logical level (as will be understood from FIG. 20) and will act through AND gate 519 in FIG. 17 to switch a JM–1 flip-flop 661 to the true state.

The switching of flip-flop JM–1 true initiates a P–1 memory cycle during the next period $T_2$ by activating the P–1 memory pulse generator 641 in FIG. 18 to produce a memory initiation pulse $P_1C_m$. As will be seen from FIG. 17, and as illustrated in FIG. 20, the leading edge of the true signal JM–1 is employed to return both the P–1 request flip-flop 621 (FIG. 18) and the control flip-flop 517 (FIG. 17) to its false state. The thus produced memory initiation pulse $P_1C_m$ is fed to the memory delay line selected by the $P_1L$ register signals $L_{17}$, $L_{17}'$, $L_{18}$, and $L_{18}'$ via AND gate 526 and OR gates 527 and 528, as illustrated in FIG. 17 for the memory unit #0 delay line. The delay between MA' becoming true at the end of a processor memory cycle and the generation of a peripheral memory initiation pulse such as $P_1C_m$ is preferably chosen, as illustrated in FIGS. 19 and 20, so that the peripheral memory cycle is initiated at approximately the same time as the next processor clock C would be generated by pulse generator 505 in FIG. 17, if the next processor cycle were to be permitted to occur immediately following the preceding one.

However, a processor cycle is not permitted to occur during the next period $T_2$, since signal $F_1'$ in FIG. 20 indicates the processor requires the memory during the next cycle $T_2$ for which peripheral P–1 has also requested use of the memory. Thus, since peripheral P–1 has priority over the processor, a new processor cycle is inhibited until the peripheral P–1 memory cycle which is initiated by pulse $P_1C_m$ and takes place during period $T_2$ is completed.

It will be understood with reference to FIG. 17 that a new processor cycle may conveniently be inhibited whenever a peripheral requests use of the memory for the same period by feeding a true logical level signal 530*a* (from AND gate 530 in FIG. 17) to OR gate 504 to continue to inhibit generation of a new processor pulse after the proposition T becomes false until the peripheral-initiated memory cycle is completed. As shown in FIG. 17, this signal 530*a* is obtained by summing the signals $P_1$, $P_2$, JM–1, and JM–2 in an OR gate 529, the output of which is fed to AND gate 530 along with signal $F_1'$, signal $F_1'$ being true when the next processor cycle is one which requires access to the memory. The end of the peripheral-initiated memory cycle occurring during period $T_2$ is indicated by signal JM–1 being switched to its false logical level as a result of flip-flop JM–1 being switched false (via OR gate 532 in FIG. 17) by a pulse P*m'* derived from a tap near the end of the selected memory delay line.

It should now be evident that, during period $T_2$, the processor will wait while peripheral $P_1$ gains access to the main memory. Since transfer flip-flop 631 in FIG. 18 was turned falsed uring $T_1$ to make signal $P_1F_2'$ true and thereby permit a strobe pulse to be generated during the memory cycle (via AND gate 71*a* in FIG. 17) a transfer of data from the main memory to P–1 will be performed during $T_2$. More specifically, pulse $P_1C_m$ is applied to a selected one of the memory delay lines (via AND gate 526 and OR gates 527 and 528 in FIG. 17) to initiate a memory cycle during which data at the main memory address selected by the $P_1L$ register (which is applied to the main memory via gates 601 in FIG. 18) is read out into the $P_1M$ register (via gates 611) during the read portion of the memory cycle. During the write portion of the memory clcle, the data thus transferred into the $P_1M$ register is written back into the same selected address in the main memory (also via gates 611).

Since no peripheral requests access to the memory during the next period $T_3$, signals $P_1$, $P_2$ JM–1 and JM–2 will all be false at the end of $T_2$ to cause signal 530*a* to become false and thereby allow generator 505 to generate a new processor pulse to initiate the processor memory cycle shown occurring during period $T_3$ in FIGS. 19 and 20.

It will be seen from FIGS. 19 and 20 that, at about 2 microseconds in period $T_3$, peripheral P–2 requests use of the memory, as indicated by the arrow 802 in FIG. 19, and by signal $P_2$ switching to its true logical level in FIG. 20. In a like manner as described for peripheral P–1 in period $T_1$, at 0.5 microsecond after signal $P_2$ is switched true, signal CN of control flip-flop 517 in FIG. 17 will become true. Then, when signal MA' becomes true 0.5 microsecond from the end of the processor cycle in period $T_3$, the JM–2 flip-flop 662 of peripheral P–2 will be switched true (via AND gate 520), causing memory generator 642 in FIG. 18 to generate a memory pulse $P_2C_m$ that will initiate a memory cycle for peripheral P–2 during the next period $T_4$. However, unlike the waiting of the processor which occurred during period $T_2$ because both the processor and peripheral P–1 requested use of the main memory during $T_2$, the processor does not require access to the memory during the next period $T_4$ (as indicated by signal $F_1'$ being switched false at the logical pulse occurring during $T_3$) and, therefore, the processor can proceed to perform its no-memory cycle during $T_4$ (as illustrated in FIGS. 19 and 20) while peripheral P–2 is using the memory during the same period $T_4$. In this connection, it will be noted in FIG. 20 that the false condition of Signal $F_1'$ at the end of period $T_3$ maintains AND gate 530 in FIG. 17 disabled to prevent either signal $P_2$ or JM–2 from inhibiting generation of the processor clock pulse which initiates the no-memory processor cycle occurring during period $T_4$.

At this point in the description it may be noted that the main purpose of the 0.5 microsecond delay circuit 515 in FIG. 17 is to prevent ambiguity as to whether the processor or a peripheral will gain access to the main memory when both request use for the same cycle. Such an ambiguity could occur if a peripheral should request use of the memory at a time too close to the end of a processor cycle to reliably prevent inhibiting the pulse generator 505 from generating the next processor cycle. The manner in which such an ambiguity is prevented will be understood from the following considerations. Since the 0.5 microsecond delay circuit 515 provides for a minimum delay of at least 0.5 microsecond, if $P_1$ (for example) becomes true within 0.5 microsecond of the end of the cycle, the control flip-flop 517 in FIG. 17 will not be triggered true to permit triggering of the JM–1 flip-flop until 0.5 microsecond later. Thus, if signal $P_1$ did not succeed in preventing pulse generator 505 from initiating the next processor clock pulse, a processor cycle will already have been initiated to switch signal MA' false when signal CN becomes true, so that flip-flop JM–1 will remain false to prevent peripheral P–1 from initiating a memory cycle until MA' becomes true at the end of the just initiated processor cycle. On the other hand, if in the above example, the true state of signal $P_1$ does succeed in inhibiting generation of the next processor clock pulse, then no processor cycle will be initiated and signal MA' will remain true, so that when CN becomes true 0.5 microsecond after $P_1$, flip-flop JM–1 will be switched true to initiate a memory cycle for its respective peripheral. In such a case, the processor which also desired access to the memory during its next cycle, will have to wait until the memory is free, such as occurred, for example, during period $T_2$ in FIGS. 19 and 20.

Now continuing with the description of the typical series of operations illustrated in FIGS. 19 and 20, it will be remembered from the previous discussion that, during period $T_4$, the processor performs a no-memory cycle, while concurrently peripheral P–2 performs a memory cycle. Since the peripheral P–2 transfer flip-flop 632 in FIG. 18 was switched false during period $T_3$ (as indicated in FIG. 20 by signal $P_2F_2'$ being switched to its true logical level during $T_3$), the memory operation occurring during $T_4$ will be one in which data is transferred, during the write portion of the memory cycle, from the $P_2M$ register (via gates 612 in FIG. 18) to the main memory at the address selected by the $P_2L$ register (which address is applied to the main memory via gates 602 in FIG. 18). It is to be noted that, during the read portion of the peripheral P–2 memory cycle occurring during $T_4$, the data in the $P_2M$ register (which is to be written into the selected address of the main memory during the write portion of the memory cycle) will not be disturbed, since the false state of signal $P_2F_2'$ during $T_4$ will prevent a strobe pulse $Q_m$ from being generated at the output of AND gate 71*a*.

As illustrated in FIGS. 19 and 20, at the end of the peripheral P–1 memory cycle performed during period $T_4$ another no-memory processor cycle is initiated by the processor which is performed during period $T_5$. Since no request for use of the main memory is made by peripheral P–1 or P–2 during $T_4$, the main memory remains inactive at the beginning of $T_5$. However, before 2 microseconds have elapsed in period $T_5$, peripheral P–1 requests use of the main memory as indicated by the arrow 803 in FIG. 19 and by signal $P_1$ becoming true in period $T_5$ in FIG. 20. Since the main memory is not in use at this time because the processor is performing a no-memory operation block, signal MA′ in FIG. 20 will be true to permit flip-flop JM–1 in FIG. 17 to directly initiate a memory cycle (which is initiated at about 2 microseconds in period $T_5$ as shown in FIGS. 19 and 20), even though the processor is in the middle of its cycle. It will be noted in FIG. 20 that because the peripheral P–1 transfer signal $P_1F_2'$ is true during the P–1 memory cycle, the direction of data transfer during this P–1 memory cycle initiated in the middle of $T_5$ will be from the main memory address selected by the $P_1L$ register to the $P_1M$ register.

At the end of period $T_5$, the processor cycle will be over. However, an additional 2 microseconds is required to complete the memory cycle initiated by peripheral P–1, which 2 microsecond period is indicated as $T_6$ in FIGS. 19 and 20. Since the next processor cycle requires use of the main memory (as indicated by signal $F_1'$ having been switched true at the logical clock in period $T_5$), signal 530*a* at the output of AND gate 530 in FIG. 17 will remain true during $T_6$ to inhibit the generation of a new processor clock pulse until the memory cycle is over at the end of $T_6$. Period $T_7$ in FIGS. 19 and 20 indicates the processor memory cycle which is performed directly after the completion of the peripheral P–1 memory cycle at the end of period $T_6$.

As shown in FIGS. 19 and 20, since no request for use of the memory is made by either peripheral P–1 or P–2 during period $T_7$, the next processor cycle (which is also a memory cycle since signal $F_1'$ remains true during $T_7$) is directly initiated and performed during the next period $T_8$ following completion of the previous cycle at the end of period $T_7$. As also illustrated in FIGS. 19 and 20, at about 2 microseconds in period $T_8$, peripheral P–2 requests use of the memory (as indicated by arrow 804 in FIG. 19 and signal $P_2$ in FIG. 20), and at about 4 microseconds in period $T_8$, peripheral P–1 likewise requests use of the memory (as indicated by arrow 805 in FIG. 19 and signal $P_2$ in FIG. 20). Since the processor is using the memory during $T_8$, the peripherals must wait until the end of period $T_8$ before it is possible for either to gain access to the memory. In order to provide an unambiguous choice as to which peripheral will gain access to the main memory when both request same, as during period $T_8$, peripheral P–1 is given priority over P–2. It will be understood that such priority of P–1 over P–2 is achieved because the primed signal $P_1'$ from the peripheral P–1 request flip-flop 621 in FIG. 18 is fed to AND gate 520 in FIG. 17, while no corresponding $P_2'$ signal is fed to AND gate 519 in FIG. 17. Thus, only flip-flop JM–1 will be triggered true at the end of period $T_8$, and peripheral P–1 will therefore gain access to the memory during the next period $T_9$.

It is to be noted in FIGS. 19 and 20 that because signal $F_1'$ is switched false by the logical clock pulse occurring during period $T_8$, a no-memory processor cycle is indicated as the next operation to be performed. Consequently the processor is able to perform its no-memory cycle during $T_9$, at the same time that peripheral P–1 is performing a memory cycle.

Now considering operation in the last exemplary operating period $T_{10}$ in FIGS. 19 and 20, it will be understood that signal $P_2$ (which first became true at about 2 microseconds in $T_8$) remains true during period $T_9$. Thus, when the memory cycle initiated by peripheral P–1 is over at the end of $T_9$, a P–2 memory cycle is directly initiated and performed during the next period $T_{10}$, even though the processor also desires use of the memory during $T_{10}$. Peripheral P–2 gains priority over the processor because signal $P_2$, acting through AND gate 530 in FIG. 17, continues to inhibit the generation of a new processor cycle after signal JM–1 becomes false at the end of $T_9$. Since transfer flip-flop signal $P_2F_2'$ is false during $T_{10}$, and will therefore prevent a strobe pulse Q*m* from being generated, the direction of data transfer during the P–2 memory cycle performed during $T_{10}$ is from peripheral P–2 to the main memory. If the processor did not require use of the main memory during $T_{10}$, which of course is contrary to the situation illustrated in FIGS. 19 and 20, then the processor would perform a no-memory cycle during $T_{10}$ concurrently with the peripheral main memory cycle performed by peripheral P–2 during $T_{10}$.

While the foregoing disclosure has been primarily concerned with a particular exemplary embodiment, it is to be understood that the invention is susceptible of many modifications in construction and arrangement as well as a variety of related uses. The present invention, therefore, is not to be considered as limited to the specific disclosure provided herein, but is to be considered as including all modifications and variations coming within the scope of the invention as defined in the appended claims.

What is claimed is:

1. In a computer system, a processor capable of processing data in a plurality of operating cycles, said processor including a randomly accessible memory capable of being selectively chosen for access by said processor in any one or more of said operating cycles, said processor including means operable in each operating cycle to provide a processor request signal indicating whether or not the processor requires access to the memory during the next operating cycle, said processor also including timing means for initiating a processor cycle and for providing timing signals during each initiated processor cycle, at least one peripheral unit including means for providing a peripheral request signal requesting access to said memory, said peripheral unit being capable of randomly accessing said memory independently of said processor to permit data to be transferred therebetween, the period of an operating cycle of said processor being relatively small with respect to the period between transfers of data by said peripheral unit, first control means coupled to said timing means and responsive to said processor and peripheral request signals for inhibiting generation of a new processor cycle when both said processor and said peripheral unit request use of the memory for the same period, and second control means for initiating access of said memory by said peripheral unit in response to a request for same whenever said processor is not making use of said memory.

2. In a computer system, a processor capable of processing data in a plurality of operating cycles, said processor including a randomly accessible memory capable of being selectively chosen for access by said processor in any one or more of said operating cycles, said processor including means operable in each operating cycle to provide a processor request signal indicating whether or not the processor requires access to the memory during the next operating cycle, said processor also including timing means for initiating a processor cycle and for providing timing signals during each initiated processor cycle, at least first and second peripheral units each including means for providing a peripheral request signal requesting access to said memory, each peripheral unit being capable of randomly accessing said memory independently of one another and of said processor, the period of an operating cycle of said processor being relatively small with respect to the period between transfers of data by a peripheral unit, first control means coupled to said timing means and responsive to said processor and peripheral request signals for inhibiting generation of a new processor cycle when said processor and at least one peripheral unit request use of the memory for the same period, second control means for giving one peripheral unit priority over the other for access to said memory, third control means for initiating access of said memory by a peripheral unit whenever said processor or the other peripheral unit is not making use of same, and means cooperating with said first control means for permitting generation of a new processor cycle after access of said memory by a peripheral unit.

3. In a computer system, a processor capable of processing data in a plurality of operating cycles, processor timing means for initiating a processor cycle and for providing timing signals during each initiated processor cycle, said processor timing means including a delay line, a plurality of tapped points along said delay line from which said timing signals are derived, pulse generator means for applying a pulse to said delay line to initiate a processor cycle, a plurality of summing diodes located at spaced points along said delay line, amplifier-shaper circuit means cooperating with said delay line to control the amplitude and shape of a pulse propagated therealong, and means summing the outputs of said summing diodes and applying the summed output thereof to said pulse generator means, the spacing of said diodes and the shaping provided by said amplifier-shaper circuit means being such that an output signal appears at the summed output of said diodes when a pulse is being propagated in said delay line, said output signal being chosen in conjunction with said pulse generator to inhibit the generation of a new pulse thereby.

4. The invention in accordance with claim 3, wherein means are provided operating in parallel with said output signal for producing a signal which will also inhibit said pulse generator.

5. The invention in accordance with claim 3, wherein means are provided operating in parallel with said output signal for delaying the generation of a new pulse by said pulse generator for a predetermined time after said output signal falls so as to provide a slower operating rate for said processor for use with a slower operating peripheral unit.

6. In a computer system, a processor capable of processing data in a plurality of operating cycles, said processor including a randomly accessible memory capable of being selectively chosen for access by said processor in any one or more of said operating cycles, said processor including means operable in each operating cycle to provide a processor request signal indicating whether or not the processor requires access to the memory during the next operating cycle, a processor address register and a processor input-output register cooperating with said memory to permit access of a selected address in said memory in accordance with said processor address register, at least one peripheral unit including means for providing a peripheral request signal requesting access to said memory, said peripheral unit also including a peripheral address register and a peripheral input-output register capable of cooperating with said memory in the same manner as said processor address register and said processor input-output register, the period of an operating cycle of said processor being relatively small with respect to the period between transfers of data by said peripheral unit, means for gating said registers so as to permit either the processor or said peripheral unit to access said memory independently of one another, first control means responsive to said processor and peripheral request signals for inhibiting generation of a new processor cycle when both said processor and said peripheral unit request use of the memory for the same period, and second control means for initiating accessof said memory by said peripheral unit in response to a request for same whenever said processor is not making use of said memory.

7. In a computer system, a processor capable of processing data in a plurality of operating cycles, said processor having processor timing means for initiating a processor cycle and for providing timing signals during each initiated processor cycle, said processor timing means including a delay line, a plurality of tapped points along said delay line from which said timing signals are derived, pulse generator means for applying a pulse to said delay line to initiate a processor cycle, a plurality of summing diodes located at spaced points along said delay line, amplifier-shaper circuit means cooperating with said delay line to control the amplitude and shape of a pulse propagated therealong, means summing the outputs of said summing diodes and applying the summed output thereof to said pulse generator means, the spacing of said diodes and the shaping provided by said amplifier-shaper circuit means being such that an output signal appears at the summed output of said diodes when a pulse is being propagated in said delay line, said output signal being chosen in conjunction with said pulse generator to inhibit the generation of a new pulse thereby, said processor also including a randomly accessible memory capable of being selectively chosen for access by said processor in any one or more of said operating cycles, a processor address register and a processor input-output register cooperating with said memory to permit accessing of a selected address in said memory in accordance with said processor address register, at least one peripheral unit including a peripheral address register and a peripheral input-output register capable of cooperating with said memory in the same manner as said processor address register and said processor input-output register, means for gating said registers so as to permit either the processor or said peripheral unit to access said memory independently of one another, and means cooperating with said processor timing means and said peripheral unit for permitting said peripheral unit to gain access to said memory whenever said memory is not being used by said processor and for providing a signal to said pulse generator to inhibit generation of a new pulse thereby when both said processor and said peripheral unit request use of said memory for the same period.

8. In a computer system, a processor capable of processing data in a plurality of operating cycles, said processor including a randomly accessible memory capable of being selectively chosen for access by said processor in any one or more of said operating cycles, said processor including means operable in each operating cycle to provide a processor request signal indicating whether or not the processor requires access to the memory during the next operating cycle, said processor including processor memory access indicating means for indicating when the processor is using the memory and processor memory request indicating means for indicating whether the processor requests access to the memory during the next processor cycle, at least one peripheral unit including peripheral request indicating means for indicating when said peripheral unit requests access to said memory, the period of an operating cycle of said processor being relatively small with respect to the period between transfers of data by said peripheral unit, means coupled to said processor memory request indicating means and said peripheral request indicating means for inhibiting generation of a new processor cycle when both said processor and said peripheral unit request access to the memory for the same period, and means coupled to said peripheral request indicating means and said processor memory access indicating means for permitting said peripheral unit to access said memory independently of said processor when said processor is not accessing the memory.

9. In a computer system, a processor capable of processing data in a plurality of self-sequencing operating cycles of substantially equal duration during each of which any one of the possible functions performable by said processor during a single cycle from the simplest to the most complex can be performed, said processor including timing means for initiating a processor cycle and for providing timing control signals during each initiated processor cycle, said processor also including a randomly accessible memory capable of being selectively chosen for access by said processor in any one or more of said operating cycles, said processor including means operable in each operating cycle to provide a processor request signal indicating whether or not the processor requires access to the memory during the next operating cycle, means including processor address means and processor input-output means for cooperating with said memory to permit performance of a memory cycle during which a selected address in memory is accessed in accordance with said processor address means, said processor further including processor memory access indicating means for indicating when the processor is using the memory and processor memory request indicating means for indicating whether the processor requests access to the memory during the next processor cycle, at least one peripheral unit including peripheral address means and peripheral input-output means capable of cooperating with said memory in the same manner as said processor address means and said processor input-output means, the period of an operating cycle of said processor being relatively small with respect to the period between transfers of data by said peripheral unit, gating means for gating said address means and said input-output means so as to permit either the processor address and input-output means or the peripheral address and input-output means to access said memory independently of one another, said peripheral unit also including peripheral request indicating means for indicating when said peripheral unit requests access to said memory, means coupled to said processor memory request indicating means and said peripheral request indicating means for inhibiting generation of a new processor cycle when both said processor and said peripheral unit request access to the memory for the same period, and means coupled to said peripheral request indicating means and said processor memory access indicating means for permitting said peripheral unit to access said memory via said gating means when said processor is not accessing the memory.

10. In a computer system, a processor capable of processing data in a plurality of self-sequencing operating cycles of substantially equal duration during each of which any one of the possible functions performable by said processor during a single cycle from the simplest to the most complex can be performed, said processor including a randomly accessible memory capable of being selectively chosen for access by said processor in any one or more of said operating cycles, said processor including means operable in each operating cycle to provide a processor request signal indicating whether or not the processor requires access to the memory during the next operating cycle, means cooperating with said memory to provide access thereto in discrete memory cycles each of duration of the same order as a processor cycle, first indicating means for indicating when said processor is accessing said memory during a processor cycle, second processor indicating means for indicating when the next cycle of said processor requires access of said memory, a least one peripheral unit including means for accessing said memory independently of said processor, said peripheral unit also including peripheral request indicating means, means coupled to said first processor indicating means and said peripheral request indicating means for permitting said peripheral to access said memory independently of said processor when said processor is not accessing the memory, the period of an operating cycle of said processor being relatively small with respect to the period between transfers of data by said peripheral unit, and means coupled to the first and second processor indicating means and said peripheral request indicating means for inhibiting the performance of the next cycle by said processor when both said processor and said peripheral unit request access to the memory for the same period, the next processor cycle being inhibited until the peripheral unit completes a memory cycle.

11. In a computer system, a processor capable of processing data in a plurality of self-sequencing operating cycles of substantially equal duration during each of which any one of the possible functions performable by said processor during a single cycle from the simplest to the most complex can be performed, processor timing means including a delay line, a plurality of tapped points along said delay line from which timing signals are derived, pulse generator means for applying a pulse to said delay line to initiate a processor cycle, a plurality of summing diodes located at spaced points along said delay line, amplifier-shaper circuit means cooperating with said delay line to control the amplitude and shape of a pulse propagated therealong, means summing the outputs of said summing diodes and applying the summed output thereof to said pulse generator means to inhibit the generation of the next pulse thereby until the previous pulse propagates to the end of said delay line, a randomly accessible memory capable of being selectively chosen for access by said processor in any one or more of said operating cycles, means including processor address means and processor input-output means for cooperating with said memory to permit performance of a memory cycle during which a selected address in memory is accessed in accordance with said processor address means, processor memory access indicating means for indicating when the processor is using the memory, processor memory request indicating means for indicating whether the processor requests access to the memory during the next processor cycle, at least one peripheral unit including peripheral address means and peripheral input-output means capable of cooperating with said memory in the same manner as said processor address means and said processor input-output means, gating means for gating said address means and said input-output means so as to permit either the processor address and input-output means or the peripheral address and input-output means to access said memory independently of one another, said peripheral unit also including peripheral request indicating means for indicating when said peripheral unit requests access to said memory, means coupled to said processor memory request indicating means and said peripheral request indicating means for inhibiting generation of a new processor cycle when both said processor and said peripheral unit request access to the memory for the same period, and means coupled to said peripheral request indicating means and said processor memory access indicating means for permitting said peripheral unit to access said memory via said gating means when said processor is not accessing the memory.

References Cited

UNITED STATES PATENTS

| | | | |
|---|---|---|---|
| 3,142,043 | 7/1964 | Schrimpf | 340—172.5 |
| 3,222,647 | 12/1965 | Strachey | 340—172.5 |
| 3,242,467 | 3/1966 | Lamy | 340—172.5 |
| 3,263,219 | 7/1966 | Brun | 340—172.5 |

ROBERT C. BAILEY, *Primary Examiner.*

I. S. KAVRUKOV, *Assistant Examiner.*